(12) United States Patent
Kribitz

(10) Patent No.: US 10,407,244 B2
(45) Date of Patent: Sep. 10, 2019

(54) BELT TURNING STATION AND METHOD

(71) Applicant: SANDVIK INTELLECTUAL PROPERTY AB, Sandviken (SE)

(72) Inventor: Gerald Kribitz, Leoben (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/735,985

(22) PCT Filed: Jun. 15, 2015

(86) PCT No.: PCT/EP2015/063300
§ 371 (c)(1),
(2) Date: Dec. 13, 2017

(87) PCT Pub. No.: WO2016/202352
PCT Pub. Date: Dec. 22, 2016

(65) Prior Publication Data
US 2018/0178984 A1   Jun. 28, 2018

(51) Int. Cl.
*B65G 21/14* (2006.01)
*B65G 15/60* (2006.01)

(52) U.S. Cl.
CPC ............. *B65G 21/14* (2013.01); *B65G 15/60* (2013.01)

(58) Field of Classification Search
CPC ...... B65G 21/14; B65G 15/60; B65G 41/005; B65G 21/12
USPC ....................................................... 198/839
See application file for complete search history.

(56) References Cited

U.S. PATENT DOCUMENTS

| | | | |
|---|---|---|---|
| 2,733,806 A * | 2/1956 | Lanier, Jr. .............. | B65G 21/14 198/303 |
| 3,251,455 A | 5/1966 | Lorvi | |
| 6,131,726 A | 10/2000 | Hovsto et al. | |
| 6,863,174 B1 | 3/2005 | Trieb | |
| 2010/0181166 A1 | 7/2010 | Hishinuma | |

FOREIGN PATENT DOCUMENTS

| | | |
|---|---|---|
| GB | 2167030 A | 5/1986 |
| JP | H085143 Y2 | 2/1996 |
| WO | 2014191195 A1 | 12/2014 |

* cited by examiner

*Primary Examiner* — Gene O Crawford
*Assistant Examiner* — Lester Rushin, III
(74) *Attorney, Agent, or Firm* — Corinne R. Gorski

(57) ABSTRACT

A mountable construction in the form of a deflection device for a belt for continuously conveying material includes a first support frame arranged in a first direction and a second support frame arranged in a second direction, the support frames being coupleable with each other. First and second belt deflectors are arranged in connection to the support frames, wherein the first belt deflector is arranged substantially vertical and the second belt deflector is arranged substantially horizontal. A connection module couples the second support frame with the first support frame, the connection module being arranged such that the second support frame is coupleable to the first support frame at a variable or different horizontal angle. A method for deflecting a belt is also provided.

19 Claims, 54 Drawing Sheets

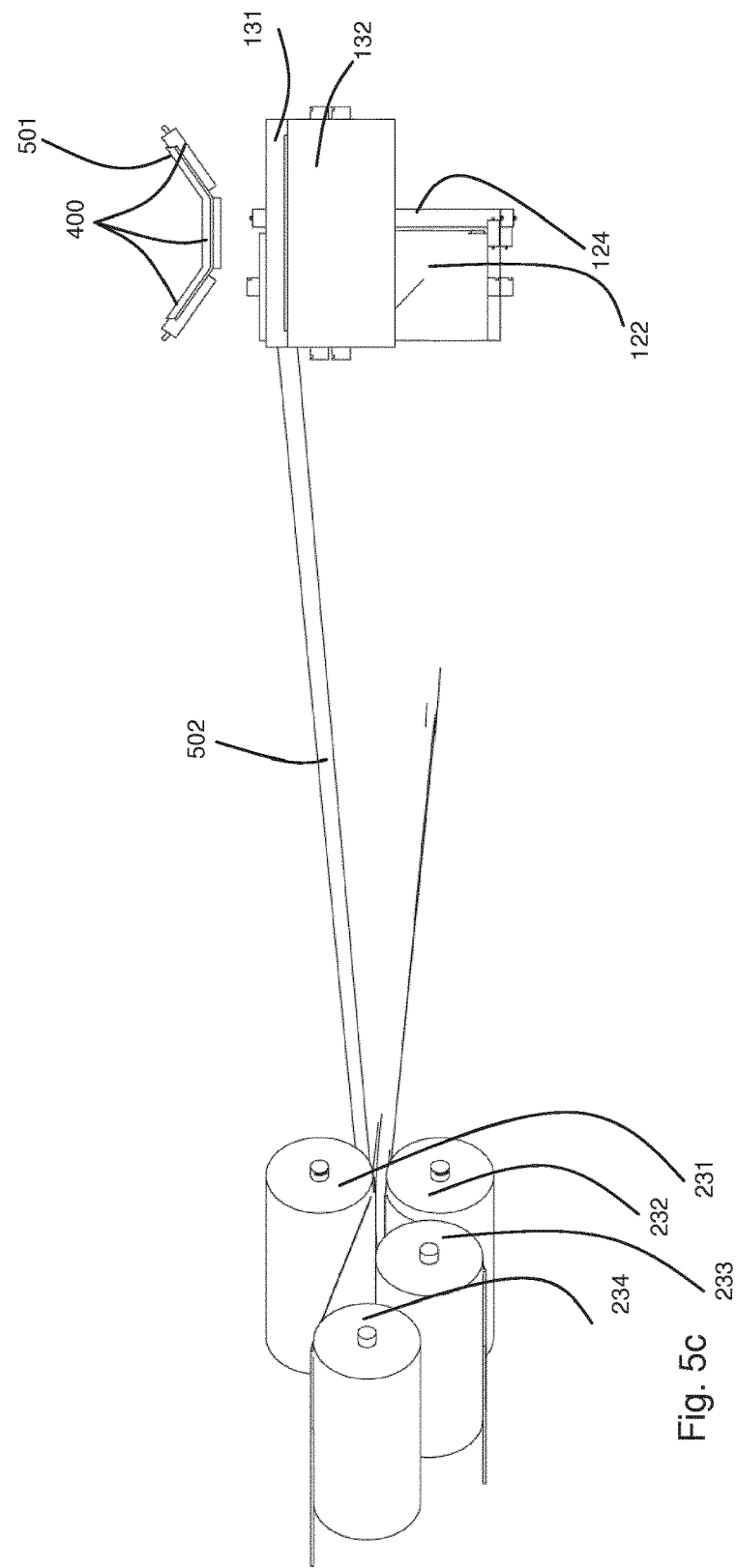

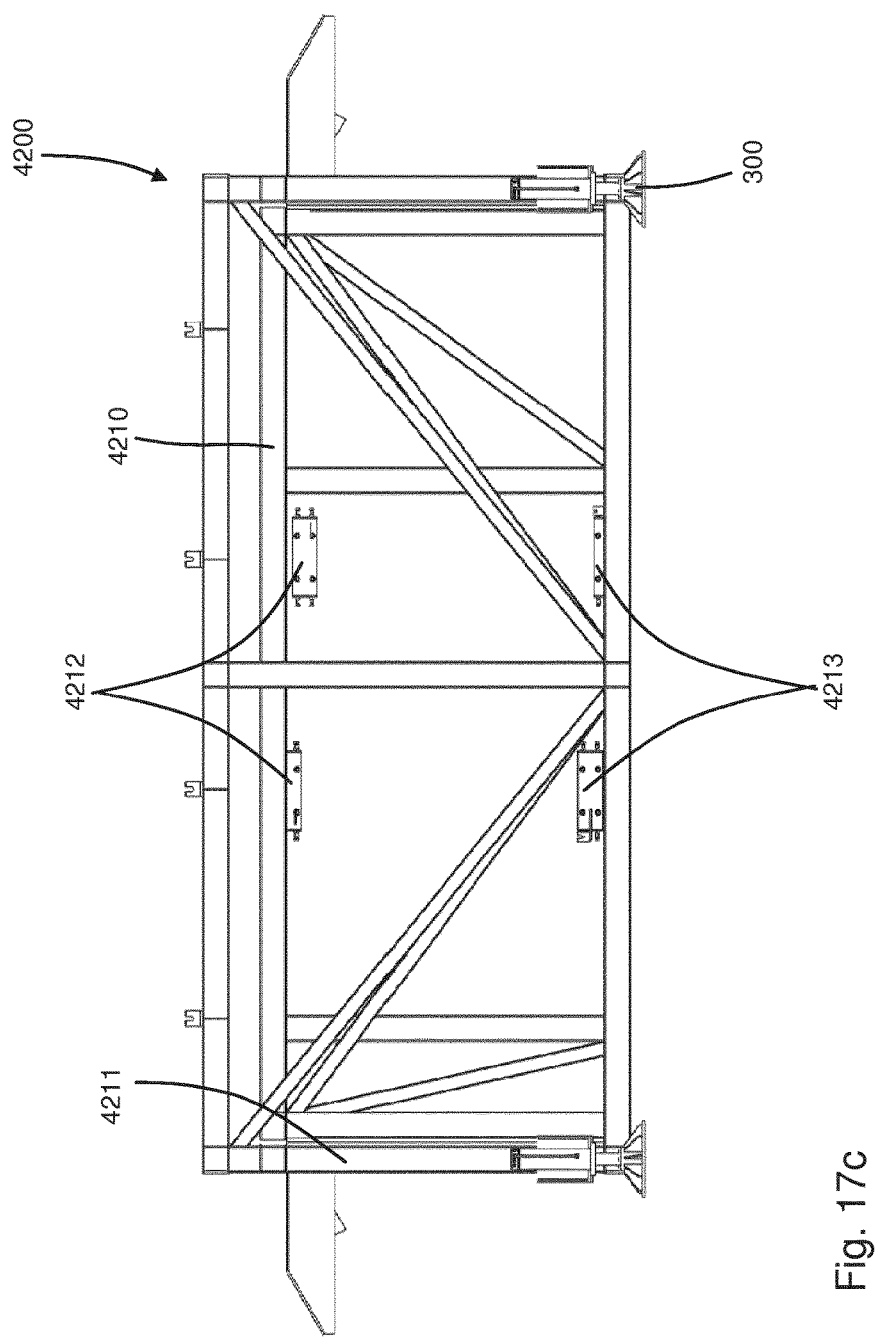

BELT TURNING STATION AND METHOD

RELATED APPLICATION DATA

This application is a § 371 National Stage Application of PCT International Application No. PCT/EP2015/063300 filed Jun. 15, 2015.

FIELD OF INVENTION

The invention relates to a mountable construction in the form of a deflection device for a belt for continuously conveying material, in particular for continuously conveying fragmented material. Further, the invention relates to a method for deflecting a belt for continuously conveying material, in particular for continuously conveying fragmented material.

BACKGROUND ART

Deflection devices are known, for example, from U.S. Pat. No. 3,251,455, WO 2014/191195 A1, U.S. Pat. No. 6,131,726 or 6,863,174 B1. U.S. Pat. No. 3,251,455 discloses an extensible belt conveyor system and in particular a transfer arrangement for such a system, comprising transfer pulleys and related apparatus whereby the return reach of belt in the conveyor section is transferred into and out of the storage section. WO 2014/191195 A1 discloses a deflection device for a belt conveyor between a first stretch section and a second stretch section running transversely to it, comprising at least one turning device and a second turning device for the conveyor belt, the first and second turning devices comprise at least one vertical deflection roller for the conveyor belt, in order to turn the conveyor belt from a horizontal plane into a vertical plane. U.S. Pat. No. 6,131,726 discloses a belt steering assembly for centering of conveyor belts comprising a mechanism with steering rollers and guide rollers. U.S. Pat. No. 6,863,174 B1 discloses a conveyor belt constructed with load-bearing rollers that can be moved along load-bearing cables. However, further improvements are sought.

It is therefore an object of the present invention to provide an improved mountable construction in the form of a deflection device for a belt and a method for deflecting a belt for continuously conveying material. In particular, it is an object of the present invention to provide for a mountable construction in the form of a deflection device for a belt and a method for deflecting a belt for continuously conveying material, which allow for greater flexibility.

SUMMARY OF THE INVENTION

The above-mentioned object is solved by a mountable construction in the form of a deflection device for a belt for continuously conveying material, the mountable construction comprising: a first support frame arranged in a first direction and a second support frame arranged in a second direction; the support frames are coupleable with each other; the mountable construction further comprising first and second belt deflectors being arranged in connection to the support frames, wherein the first belt deflector is arranged substantially vertically and the second belt deflector is arranged substantially horizontally; characterised in that the mountable construction includes a connection module for coupling the second support frame with the first support frame, the connection module being adapted such that the second support frame is coupleable to the first support frame at a variable or different horizontal angle.

A mountable construction in the form of a deflection device for a belt can also be referred to as a belt turning station. A preferred area of application for the mountable construction is underground mining, in particular underground continuous haulage, and further preferably in long wall mining.

The mountable construction comprises first and second support frames, which extend in first and second directions, which can also be referred to as longitudinal directions of the first and second support frames. The first and second directions can also be referred to substantially the directions in which a belt can be guided through the first and second support frames, respectively, or the maximal extending directions of the first and second support frames, respectively. These support frames typically are suitable for supporting the conveyor run and/or return run of a belt for continuously conveying material, in particular fragmented material, wherein the belt typically is an endless conveyor belt. In case only one run, typically the return run, is supported by the first and/or second support frame, the other run, typically the conveyor run, can be suspended from the roof of an underground mining shaft or tunnel. Therefore the mountable construction can be designed either as a version with elements, like brackets, for holding conveyor run idlers integrated or without such elements.

The first support frame preferably has a rear (or first) and a front (or second) end, with which the mountable construction preferably can be arranged at a desired location within a strand or leg of a continuous haulage system. The belt typically is in the form of an endless conveyor belt, preferably extends throughout the whole strand or leg of the continuous haulage system and thus also spans the first support frame. The second support frame preferably has a connection or first end and a take-up or second end. The second support frame typically serves to lead off the belt, typically the return run of an endless conveyor belt, laterally out of a main continuous haulage strand or leg, of which the first support frame preferably is a part. The motivation for this is, for example, to provide for a belt or loop belt take-up system in the continuous haulage system.

In this description, references to "horizontal" and "vertical" refer to a situation, in which the mountable construction is sitting on a horizontal ground. In case the mountable construction is set up on an inclined ground, references to "horizontal" and "vertical" shall be understood to be accordingly inclined.

Preferably, the first and second support frames are coupleable with each other in a horizontal plane. In particular, the coupling of the two support frames with each other in a horizontal plane can be understood in that the two support frames, when coupled with each other, primarily extend in a horizontal plane and have a height, which is perpendicular to such horizontal plane.

Further, it can be preferred that the first and second support frames are coupleable with each other such that the first and second directions of the first and second support frames are inclined relative to each other relating to a horizontal plane. In particular, the first direction of the first support frame and/or the second direction of the second support frame may be inclined, in particularly differently inclined, toward a horizontal plane. For example, the first direction of the first support frame may be angled downwardly by 10 degrees due to a sloping mining shaft, whereas the second direction of the second support frame may be oriented horizontally or angled downwardly by less than 10 degrees, since it is led of from the sloping mining shaft in a sideways direction.

For deflecting the belt, the mountable construction further comprises first and second belt deflectors. Preferably, a belt deflector is a pulley, particularly preferred are symmetrical crowned pulleys, in particular standard, non-segmented, symmetrical crowned pulleys. The belt deflectors or pulleys have the function to change the direction and/or orientation of the belt. Preferably, the belt deflectors can also support the belt. As described below, the mountable construction can further comprise one, two or more third belt deflectors.

The first and second belt deflectors are connected to the support frames, wherein the first belt deflector is arranged substantially vertically and the second belt deflector is arranged substantially horizontally. In a preferred embodiment, the first and second belt deflectors are arranged perpendicular to each other. Preferably, the distance between the second belt deflector and the first belt deflector when the first and second frames are coupled to each other via the connection module is large enough to reduce stress or tension on the belt occurring while changing its orientation between the first and second belt deflectors.

Preferably, when one belt deflector, e.g. a first belt deflector or a second belt deflector or, later on, a third belt deflector, is mentioned herein, also two or more belt deflectors can be deployed instead of only one belt deflector. Therefore, when only one belt deflector is described, the description analogously applies to a plurality of belt deflectors and vice versa.

The substantially vertical/horizontal orientation of the belt deflectors refers to the orientation of the axis about which a deflection of the belt occurs. For example, in case the belt deflectors are pulleys, the first pulleys are arranged with their longitudinal or rotation axes in a substantially vertical orientation and the second pulleys are arranged with their longitudinal or rotation axes in a substantially horizontal orientation.

The mountable construction can comprise one, two, three or more first belt deflectors and/or one, two, three or more second belt deflectors. However, it is particularly preferred that the mountable construction comprises two first belt deflectors, in particular exactly two first belt deflectors, i.e. that no more than two first belt deflectors are needed and/or present in the mountable construction.

The first and second belt deflectors are located on the support frames such that the belt, preferably the return run of an endless conveyor belt, is turned from a substantially horizontal orientation at a front and rear end of the first support frame to a substantially vertical orientation in a center area of the first support frame where the second support frame is coupled to the first support frame and then turned from this substantially vertical orientation to a substantially horizontal orientation at a take-up end of the second support frame.

The first belt deflectors are preferably arranged such that first tangent lines where the belt contacts the belt deflectors are substantially centered with respect to the substantially horizontal orientation of the belt in the first support frame and/or second tangent lines are substantially centered to the substantially horizontal orientation of the belt in the second support frame.

Within a typical mountable construction, the belt enters the mountable construction, leaves it, enters it again and leaves it again. After every last belt deflector, where the belt either enters or leaves the mountable construction, the belt can be guided further outside the mountable construction at any angle useful, regardless if optional adjusting belt deflectors are used or not. This can be realized by different wrap angles around those last belt deflectors. Mostly it will be preferred to guide the belt further parallel to the mountable construction.

Since the belt enters the mountable construction, leaves it, enters it again and leaves it again, two independent belt strands co-exist within the mountable construction. This may cause geometrical problems because, typically, there needs to be a certain backlash between the various belt strands. Preferably, the belt deflectors with their corresponding pulleys and belt strands should be offset a certain distance along their longitudinal axes. Additionally a certain distance is preferred between the lateral surfaces of the belt deflectors. If then an entrance belt deflector and/or an exit belt deflector (also referred to as third belt deflectors) are additionally twisted, additional geometric challenges occur. In order for the system to tolerate various geometric conditions, for certain rotational movements preferred hinge points will be described herein.

In a further preferred embodiment, the first and/or second belt deflectors are arranged in an orientation deviating from a vertical or horizontal orientation, respectively, or are adapted to be changed to such a deviating orientation. In particular, it is preferred that the first belt deflectors are arranged or can be arranged with their longitudinal axes inclined toward a vertical axis, preferably by up to 30 degrees. Further, it is preferred that the second belt deflectors are arranged or can be arranged with their longitudinal axes inclined toward a horizontal axis, preferably by up to 30 degrees. Such an inclined arrangement or adaptability to an inclined arrangement of the first and/or second belt deflectors is particularly preferred in situations, where the mining layout has sloping mining drifts or inclines and the first direction of the first support frame and/or the second direction of the second support frame may be inclined, in particularly differently inclined, toward a horizontal plane.

The mountable construction further includes a connection module, which is preferably arranged at one end of the second support frame, preferably at the end opposite of a take-up end of the second support frame and arranged laterally to the central part of the first support frame. The connection module serves to couple the first and second support frames with each other, directly or indirectly. In particular, the connection module is suitable for coupling the first and second support frames with each other, directly or indirectly.

Preferably, the connection module has a connection direction in a horizontal plane, which preferably is the direction in which a belt can be guided through the connection element. In certain embodiments or situations, the connection direction can be identical with the second direction of the support frame. In other embodiments or situations, the connection direction and the second direction can be angled to each other.

In particular, the connection module serves as an interface via which the first and second support frame can be connected to each other and released from each other. The connection module is adapted such that the second support frame can be coupled to the first support frame at a variable or different horizontal angle, in particular at a specific and/or desired horizontal angle, which is required for a specific area of application, for example for a certain mine layout. The horizontal angle is the angle between the first and second directions or first and second longitudinal directions of the support frames in a horizontal plane.

A variable or different horizontal angle is understood herein as a variable or different horizontal angle or a variable or different range of horizontal angles that can reasonably and technically feasibly included between the first direction of the first support frame and the second direction of the second support frame. In particular, it is preferred that the connection module is adapted such that the second support frame is coupleable to the first support frame at a variable or different horizontal angle in a range of 5 degrees to 170 degrees, the horizontal angle preferably being a multiple of 5 degrees. Preferably, the second support frame is coupleable to the first support frame at a variable or different horizontal angle in a range having a lower end of 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, 170 degrees, or 175 degrees, and an upper end of 175 degrees, 170 degrees, 165 degrees, 160 degrees, 155 degrees, 150 degrees, 145 degrees, 140 degrees, 135 degrees, 130 degrees, 125 degrees, 120 degrees, 115 degrees, 110 degrees, 105 degrees, 100 degrees, 95 degrees, 90 degrees, 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, or 5 degrees, in any reasonable combination thereof. It is particularly preferred that the range is between 25 and 155 degrees.

With such a connection module and its adaptability, it is possible to create a mountable construction, which is flexible with respect to the angle, in which the second support frame deflects from the first support frame and thus the angle under which the belt can be led off from the main conveying direction. This is in particular useful for underground mining applications, where mining layouts depend on various geological and other boundary conditions.

As will be further described below with respect to different preferred embodiments, the adaptability of the connection module to couple the second and first support frames at different horizontal angles can be realized in different ways. For example, the connection module can be exchangeable, such that a variety of different connection modules suitable for a coupling under different angles, can be chosen from to realize a certain, desired angle. Alternatively or additionally, first and second faces of the connection module for coupling the connection module with the first support frame and/or the second support frame can be adapted or adaptable to realize the respective connection at different or variable horizontal angles.

Preferably, the first support frame and the second support frame can remain unchanged or substantially unchanged, when connected with each other via the connection module independent from the horizontal angle included between the two support frames. In this way, a very cost efficient solution for a flexible mountable construction adaptable to variable horizontal angles can be realized.

A preferred embodiment is characterized in that the connection module comprises a first face for coupling the connection module with the first support frame and/or characterized in that the connection module comprises a second face for coupling the connection module with the second support frame.

The first and/or second faces of the connection module preferably have the function to provide interfaces to couple the connection module to the first and second support frames. Preferably, the first face and/or the second face are suitable to directly or indirectly couple the connection module with the first or second support frame, respectively. Further preferably, the first face and/or the second face is/are suitable for creating a releasable connection between the connection module and the first and/or second support frame, respectively. The first face and/or the second face can comprise connection elements for creating the connection between the connection module and the first and/or second support frames, respectively, for example via corresponding connection elements located on the first and/or second support frames. Such connection elements can be in the form of pins, bolts, screws and/or form-locking elements, for example.

The first face and/or second face may be arranged substantially vertical. In particular, the first face and/or the second face can have the form of a frame or grid, i.e. the face does not need to be a continuous surface.

In a further preferred embodiment, the first face is adapted to form a horizontal angle with the connection direction of the connection module and further characterised in that the connection module is exchangeable against another connection module comprising a first face adapted to form a different horizontal angle with the connection direction of the another connection module.

In this embodiment, the first face of the connection module is adapted such that a specific horizontal angle is included between the first face and the connection direction of the connection module. In particular, it is preferred that the first face includes an angle with the connection direction of 45 degrees (or any other reasonable degree) and thus can form a connection with the first support frame in which the connection direction and the first direction include an angle of also 45 degrees (or the corresponding degree to any other reasonable degree, respectively).

Preferably, in this embodiment the horizontal angle under which the connection element is connected to the first support frame via the first face is determined by the horizontal angle included between the first face and the connection direction of the connection element. To create the adaptability of the mountable construction to a variable or different horizontal angle between the first and second support frames, the connection module in this embodiment is exchangeable against another connection module, preferably against any one of a series of further connection modules. Such another connection module preferably also comprises a first face adapted to form a specific horizontal angle with a connection direction of this further connection module. To realize the adaptability of the mountable construction, the horizontal angle of the other or further connection module is different from the horizontal angle of the original connection module such that the exchange of one connection module for the other results in the connections under different horizontal angles.

As will be described further below, regarding the second face for a connection of the connection module with the second support frame, the second face and the connection via this second face can be such that the second direction of the second support frame is identical to the connection direction or such that the second direction is angled to and/or variable to the connection direction.

Additionally or alternatively, it can be preferred that the connection module is adaptable such that its first and/or second face can form different horizontal angles with the second direction of the second support frame. In particular in addition to or alternative to an exchangeability of connection modules having their first faces each at a specific angle with respect to the connection direction, it is also possible that the connection module is variable in the sense that its first and/or second face can form different horizontal angles with the connection direction of the connection module. The range of the variability of the first and/or second face of a given connection module may be limited, for example to +/−15 degrees, or 30 degrees, respectively. For example, the exchangeability of the connection modules may be combined with the variability of each connection module in a certain range of horizontal angles of the first and/or second connection faces. The variability of the first and/or second face of a connection module may be realized, for example, by telescopic and/or pivotable elements, which preferably can be fixed in different positions.

According to a further preferred embodiment, which can be combined with one or more of the previously described embodiments or realized as an alternative to one or more of the previously described embodiments, the first and/or second face is adapted to couple the second support frame to the connection module under different horizontal angles, in particular under a variable or different horizontal angle.

Preferably, the first and/or second face is adapted or adaptable to couple the first and/or second support frame to the connection module under different horizontal angles, in particular under a range of horizontal angles. For example, the connection module may have a first and/or second face, which allows coupling the first and/or second support frame to the connection module within a range of +/−15 degrees, or 30 degrees, respectively. It may be particularly preferred that this range is +/−10 degrees, or 20 degrees, respectively, or +/−5 degrees, or 10 degrees, respectively.

For example, a connection module with a second face allowing to couple the second support frame to the connection module under a certain range of different horizontal angles, may have a first face, which is adapted to couple the connection module to the first support frame under a certain horizontal angle. By combining the exchangeability of the connection module with a certain horizontal angle at the first face and a range of horizontal angles at the second face, a high degree of variability can be achieved.

It can also be preferred that the first and/or second face of the connection module is adapted or adaptable such that the first and/or second support frame can be coupled to the connection module under a variable or different horizontal angle. Again, a variable or different horizontal angle is understood as the range of reasonable and technically feasible angles for such a connection. In particular, for the first and/or second face, a variable or different horizontal angle preferably is in a range of 5 degrees to 170 degrees, the horizontal angle preferably being a multiple of 5 degrees. Preferably, for the first and/or second face, a variable or different horizontal angle preferably is in a range with lower and upper ends as mentioned above.

Further, it is preferred that the first and/or second face of the connection module is curved in a horizontal plane. In particular, a convex curved shape of the first and/or second face in a horizontal plane may be preferred. Further preferably, the first and/or second face of the connection module has the shape of an arc of a circle in a horizontal plane. For example, the first and/or second face may have the shape of a half-circle in a horizontal plane. Further preferably, the first and/or second face of the connection module has the shape of a section of a spherical surface, for example, the shape of a half-spherical surface. In this way, the first and/or second support frame can be connected to the connection module via this half-circular second face in a variable or different horizontal angle.

For example, the adaptability of the substantially horizontal angle under which the second support frame is connected to the first support frame may be referred to as slewing of the second support frame along the ground plane. For this slewing the mountable construction is angled only regarding to the ground surface of the first support frame. This is realized by changing the wrap angle around the first belt deflectors by a connection module as described above. Depending on the embodiment of the connection module and the combination of features realised therein, the connection module may be realised as a constant single angle connection module or as a steplessly variable angular connection module. If a constant single angle connection module is used, additionally the angle can be adjusted steplessly for some degrees, as described above, by a respective adaptation of the second face of the connection module.

Preferably, the axis for the slewing rotation of the second support frame is parallel to the longitudinal axes of the first belt deflectors and further preferably located midway between the longitudinal axes of the two first belt deflectors. Preferably, this rotation axis is valid either if a fix angled connection module or if a steplessly variable angular connection module is used. Further preferably, for keeping the backlash between the two separate belt strands constant, the distance between the first belt deflectors can be adjusted regarding the rotation axis.

In a further preferred embodiment, the first belt deflectors are arranged on the first support frame, wherein preferably the first support frame further comprises a third belt deflector, which is arranged substantially horizontally. The first, substantially vertically arranged belt deflectors can be arranged in a central region of the first support frame with respect to its longitudinal extension, for example. This has the advantage that the deflection of the belt to lead off the belt to the second support frame occurs in the central region of the first support frame. The third belt deflectors preferably are in the form of pulleys and further preferably are arranged on rear and front regions of the first support frame. Further preferably, the distance between the third belt deflectors and the first belt deflectors is large enough to reduce stress or tension on the belt occurring while changing its orientation between the first and third belt deflectors. Further, it is preferred that the third belt deflectors are arranged or can be arranged with their longitudinal axes inclined toward a horizontal axis, preferably by up to 30 degrees. Additionally, the longitudinal axes can be offset in height, with respect to a horizontal plane.

In a further preferred embodiment, the second belt deflectors are arranged on the second support frame. Preferably, the distance between the second belt deflectors and the first belt deflectors when the first and second frames are coupled to each other via the connection module is large enough to reduce stress or tension on the belt occurring while changing its orientation between the first and second belt deflectors. In particular, it is preferred that the second support frame only comprises substantially horizontally arranged belt deflectors, i.e. no vertical arranged belt deflectors.

The arrangement of the first and/or third belt deflectors on the first support frame and the arrangement of the second belt deflectors on the second support frame has the advantage that the belt deflectors are located on the support frames, which preferably do not need to be changed when the angle under which the first and second support frames are coupled to each other, is changed. This facilitates the variability of the mountable construction and further reduces costs. In particular, it can be preferred that the connection module does not comprise belt deflectors, in particular no vertically and/or horizontally arranged belt deflectors. This further reduces the complexity and cost of the connection module and enhances variability.

In a further preferred embodiment, the first belt deflectors are mounted on an adjustment element, which is pivotably connected to the first support frame, the adjustment element further preferably having a connection face for connecting the first face of the connection module thereto. The adjustment element can be, for example, an inner part pivotably mounted in a fixed outer part of a center frame module of the first support frame.

Preferably, the adjustment element can be pivoted about a longitudinal axis, which preferably is parallel to the longitudinal axis of the first support frame. When the adjustment element is pivoted, the first belt deflectors are also pivoted such that their longitudinal axes are inclined compared to the third pulleys of the first support frame.

Further preferably, when the adjustment element is pivoted, the connection face is also pivoted. Since the second support frame is connected preferably via the connection module to the first support frame preferably via the connection face of the adjustment element of the first support frame, a pivoting of the connection face also leads to a pivoting of the second support frame relative to the first support frame about the longitudinal pivoting axis. This can also be referred to as luffing of the second support frame.

The adjustment element preferably is adapted to allow for a pivoting or luffing of the longitudinal axes of the first belt deflectors and/or the longitudinal axis of the second support frame relative to the substantially horizontal plane of the first support frame of at least +/−5°, 10°, 15°, 20°, 25°, 30°, 35°, or 45° and/or of at most +/−75°, 70°, 65°, 60°, 55°, 50°, or 45°.

Preferably, the axis for the luffing rotational movement is positioned parallel to the axis of the first direction of the first support frame. Further preferably, the center of height of the luffing rotational movement should be the middle height between the centers of the first belt deflectors referring to a substantially horizontal plane.

Further preferably, for the mountable construction the third belt deflectors are twisted simultaneously relative to the first belt deflectors. This can be done by the rotation or pivoting of the adjustment element as described above. If the third belt deflectors are left unmoved, the rotation or pivoting of the adjustment element mentioned above results in a luffing movement of the whole second support frame via the connection module connecting the second support frame to the adjustment element of the first support frame via the connection face of the adjustment element.

In a further preferred embodiment, the first belt deflectors are mounted on the first support frame, preferably on the adjustment element, such that the position of the first belt deflectors relative to the first support frame and/or relative to each other can be adjusted along the first direction of the first support frame. In this embodiment, the first belt deflectors can be moved along the longitudinal extension of the first support frame relative to the first support frame and/or relative to each other. Such an adjustment of the position of the first belt deflectors, preferably in a central region of the first support frame, has the advantage that the position of the first belt deflectors can be adjusted to reduce the tension or stress occurring in the belt during its deflection, in particular for horizontal angles at or near the ends of the reasonable and technically feasible ranges. Further, in case the angle along the ground plane changes, the belt performs different wrap angles around the first belt deflectors, which causes a backlash between the two strands of the belt, tangenting the first belt deflectors towards the second belt deflectors located thereon to change. Because a specific backlash distance is preferred, it is preferred that the first belt deflectors are adjustable.

In general, it is particularly preferred that the first support frame is a modular structure and comprises two, three or several frame modules and/or the second support frame is a modular structure and comprises two, three or several frame modules. A modular design of the first and/or second support frames has several advantages. For example, the length of the first and second support frames can be easily adjusted by increasing or reducing the number of frame modules. Further, transport, installation, repair and maintenance of the mountable construction are considerably facilitated by the modular design, in particular in underground mining applications. The frame modules preferably are framework constructions to provide sufficient stability at reasonable weight.

In a preferred embodiment, the second support frame is adapted such that its first and second ends can be twisted relative to each other about a longitudinal axis of the second support frame or the connection module is adapted such that the second support frame can be twisted relative to the connection module about a longitudinal axis of the second support frame and/or the second belt deflector is pivotably and/or tiltable connected to the second support frame and/or the second belt deflector is pivotably and/or tiltable connected relative to the first belt deflector. The second support frame preferably is connected with its first end with the second face of the connection module and with its second end may be connected with a belt take-up system, for example. In mining layout conditions, where two intersecting mining drifts (where the first and second support frame shall be located) have different floor angles (strike-dip), it can be necessary to adjust the orientation of the longitudinal axes of the second belt deflectors with respect to a horizontal orientation. To do so, the part of the second support frame carrying the second belt deflectors can be pivoted about its longitudinal axis. Preferably, this is realised in that an intermediate frame module of the second support frame is divided and its two parts can be turned relative to each other or by a shape of a section of a spherical surface, for example, the shape of a half-spherical surface.

Preferably, the axis for the twisting rotational movement of the second support frame described above is positioned parallel to a plane bisecting the height of the second belt deflectors. Therefore the center of height of the twist rotation should be the middle height between the centers of the first belt deflectors. Additionally, the axis of the twisting rotation should be in line with the midpoint of the line connecting the centers of the first belt deflectors.

As a result of the elements mentioned above, the second belt deflectors of the second support frame can be pivoted around all directions relatively to the third belt deflectors.

Further, it is preferred that the first and second support frames are coupled with each other such that forces can be transmitted from the first support frame to the second support frame and/or vice versa via a form fit connection. Preferably, also the frame modules are coupled with each other such that forces can be transmitted from one frame module to another within a support frame via a form-fit connection.

In continuous haulage systems, in particular in underground mining applications, considerable forces can take effect on the support frames due to required belt tension.

High belt tension is required, e.g., for conveying high loads and/or when loop belt or belt take-up systems are integrated. It is particularly preferred to allow these high forces to be transmitted via a form-fit. The connection between frame modules and/or first and second support frames and/or the connection module with the first and/or second support frames can, in addition to the form fit, comprise further connection means or connection elements.

In a preferred embodiment, the connection module has a polygonal form in its horizontal plane, in particular a trapezoidal or triangular form, wherein preferably one side of the polygonal form has the shape of an arc of a circle in a horizontal plane. Herein, the polygonal form of the connection module in its horizontal plane comprises shapes in which one or more sides of the polygonal form is/are curved, in particular in the shape of an arc of a circle. Including the height extension of the connection module, one side of the polygonal shape may have the shape of a segment of a spherical surface. Preferably, such a curved side of a polygonal form of the connection module forms the second face of the connection module for connecting the second support frame thereto. In this way, the second support frame can be coupled to the second face of the connection module in a manner so as to enable to adjust the second direction of the second support frame with respect to the connection direction of the connection module.

Additionally or alternatively, further guiding elements for support of the belt can be provided, in particular from beneath and/or above the belt, especially when belt tension is low. Additionally, any kind of belt tracking device can be provided at any position needed.

Further preferably, in connection and parallel to the first and/or second and/or third belt deflectors, support rollers are arranged. The support rollers in connection to and parallel to the belt deflectors are particularly preferred to ensure that the belt does not buckle in case of very low belt tension.

Preferably, the mountable structure may comprise a plurality of levelling elements, which may be in the form of telescopic stands, preferably hydraulic stands. Such levelling elements have the advantage that the mountable construction can be placed on uneven ground by extending the levelling elements to different heights such that the mountable construction can be evenly supported on the ground via the levelling stands.

Further, it may be preferred that the mountable construction, in particular the second support frame, comprises one or more staying elements for staying the mountable construction, in particular the second support frame, in a fixed position relative to the surrounding, in particular a mine drift or tunnel. The staying elements may comprise extendable elements, in particular hydraulic cylinders.

Further, the mountable construction may comprise an activation unit for activating the levelling elements and/or the staying elements. Preferably, the activation unit is a hydraulic unit, which is particularly preferred in case the staying elements comprise hydraulic cylinders and the levelling elements comprise hydraulically extendable stands.

According to a further aspect of the invention, the above-mentioned object is solved by a method for deflecting a belt for continuously conveying material, the method comprising: providing a mountable construction as described above, and coupling the second support frame to the first support frame via the connection module in a variable or different angle in three dimensional space, in particular, in a variable or different horizontal and/or vertical angle and/or angle of rotation.

As to the advantages, preferred embodiments and details of the method and its preferred embodiments, reference is made to the corresponding aspects and embodiments described above.

BRIEF DESCRIPTION OF DRAWINGS

A specific implementation of the present invention will now be described, by way of example only, and with reference to the accompanying drawings in which:

FIG. 3a shows a side view of the mountable construction according to FIG. 1a;

FIG. 4a shows a side view of the mountable construction according to FIG. 1a;

FIG. 5a shows another side view of the mountable construction according to FIG. 1a;

FIG. 5c shows another side view of the conveyor belt arrangement according to FIG. 1c;

FIG. 8 shows a detailed view of section Q of the mountable construction according to FIG. 1a;

FIG. 10b shows a front view of the mine layout according to FIG. 10a;

FIG. 10c shows a back view of the mine layout according to FIG. 10a;

FIG. 10d shows a side view of the mine layout according to FIG. 10a;

FIG. 10e shows another side view of the mine layout according to FIG. 10a;

FIG. 10f shows a three-dimensional depiction of the mine layout according to FIG. 10a;

FIG. 11A shows a top view of the mountable construction of FIG. 11a with the connection module at 45° and all other angles arbitrarily angled;

FIG. 17b shows a front view of the center frame module according to FIG. 17a;

FIG. 17c shows a back view of the center frame module according to FIG. 17a;

FIG. 17d shows a side view of the center frame module according to FIG. 17a;

FIG. 17e shows another side view of the center frame module according to FIG. 17a;

FIG. 17f shows a cross-sectional view A-A as indicated in FIG. 17a;

FIG. 18b shows a front view of the center frame module according to FIG. 18a;

FIG. 18c shows a back view of the center frame module according to FIG. 18a;

FIG. 18d shows a side view of the center frame module according to FIG. 18a;

FIG. 18e shows another side view of the center frame module according to FIG. 18a;

FIG. 18f shows a cross-sectional view B-B as indicated in FIG. 18a;

FIG. 20b shows another side view of the intermediate frame module according to FIG. 20a;

FIG. 20c shows cross-sectional view B-B of the intermediate frame module as indicated in FIG. 20a;

FIG. 20d shows a three-dimensional depiction of the intermediate frame module according to FIG. 20a.

DETAILED DESCRIPTION OF PREFERRED EMBODIMENTS OF THE INVENTION

Figure 1A:
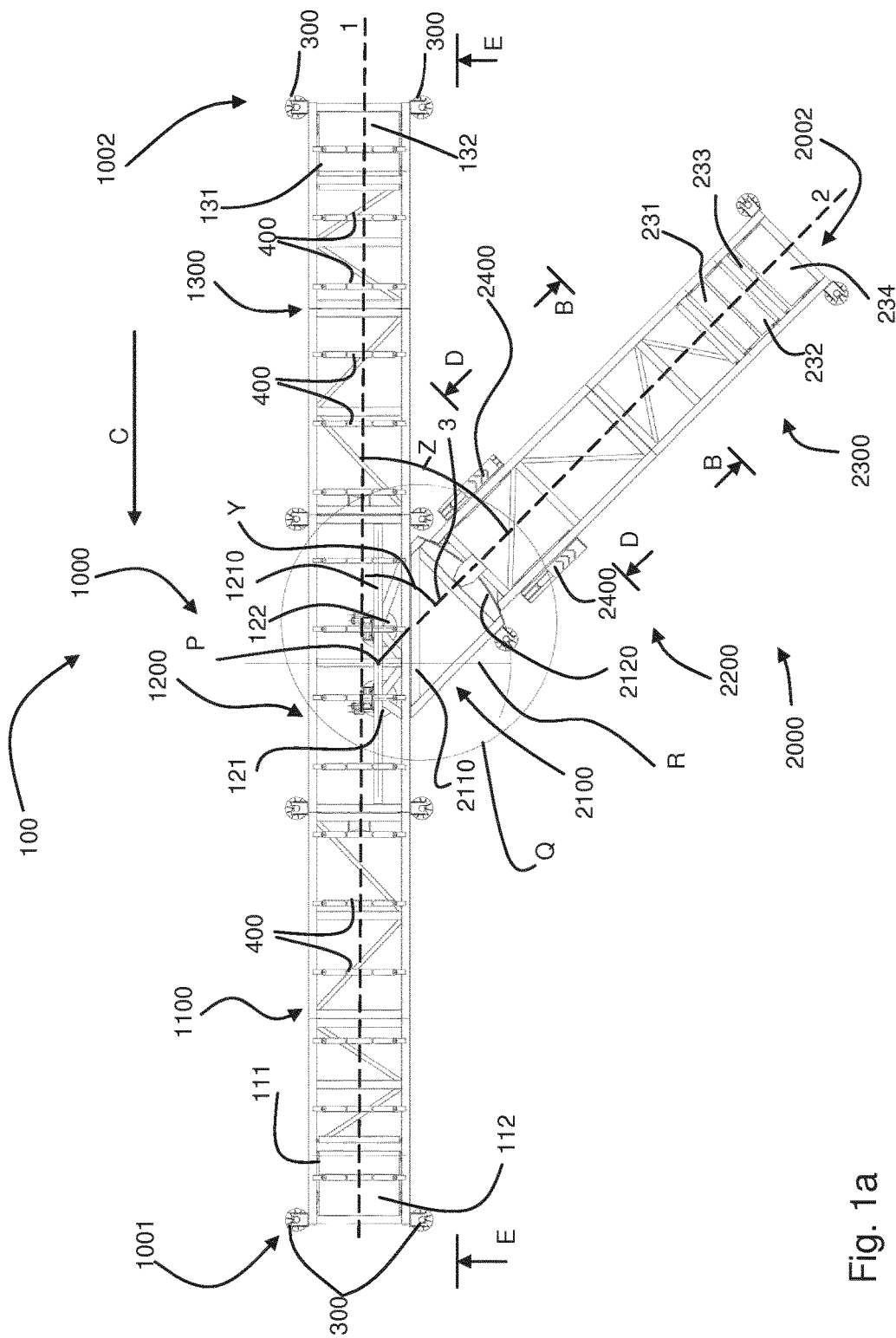
FIG. 1a shows a top view of an exemplary embodiment of a mountable construction.
Figure 1B:
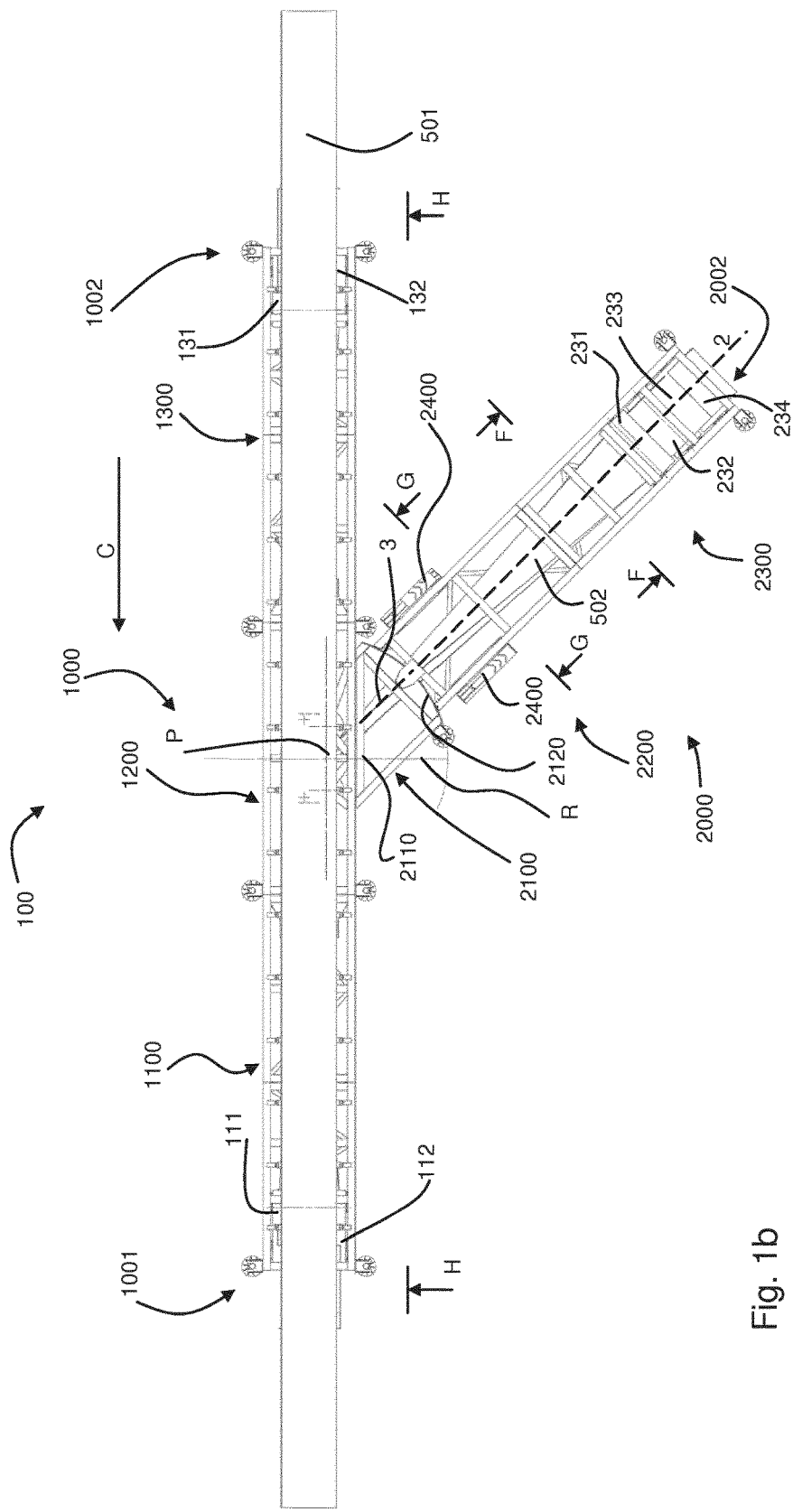
FIG. 1b shows the mountable construction of FIG. 1a with a conveyor belt arrangement.
Figure 1C:
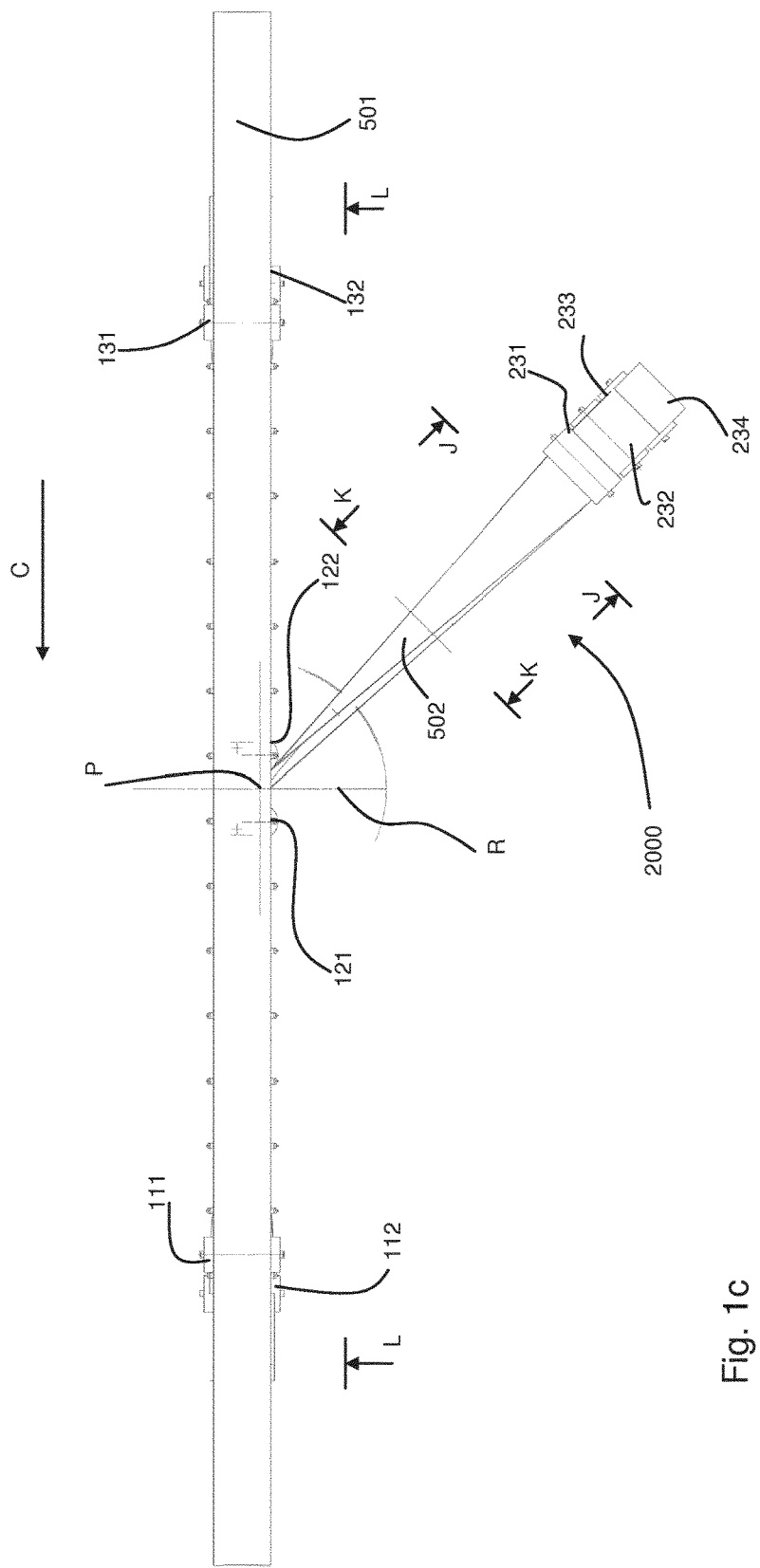
FIG. 1c shows the conveyor belt arrangement of the mountable construction according to FIG. 1b.
Figure 2A:
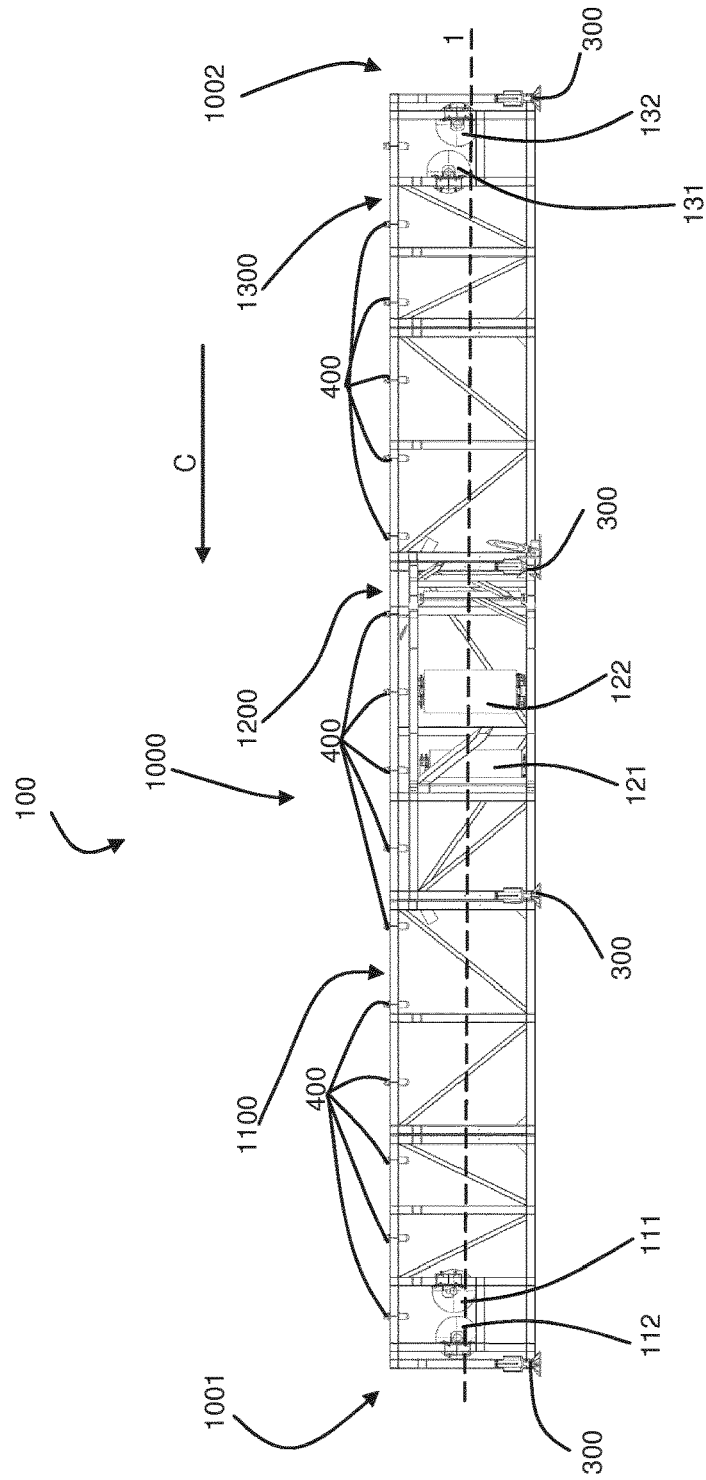
FIG. 2a shows a cross-sectional view of the mountable construction according to FIG. 1a through section E-E.
Figure 2B:
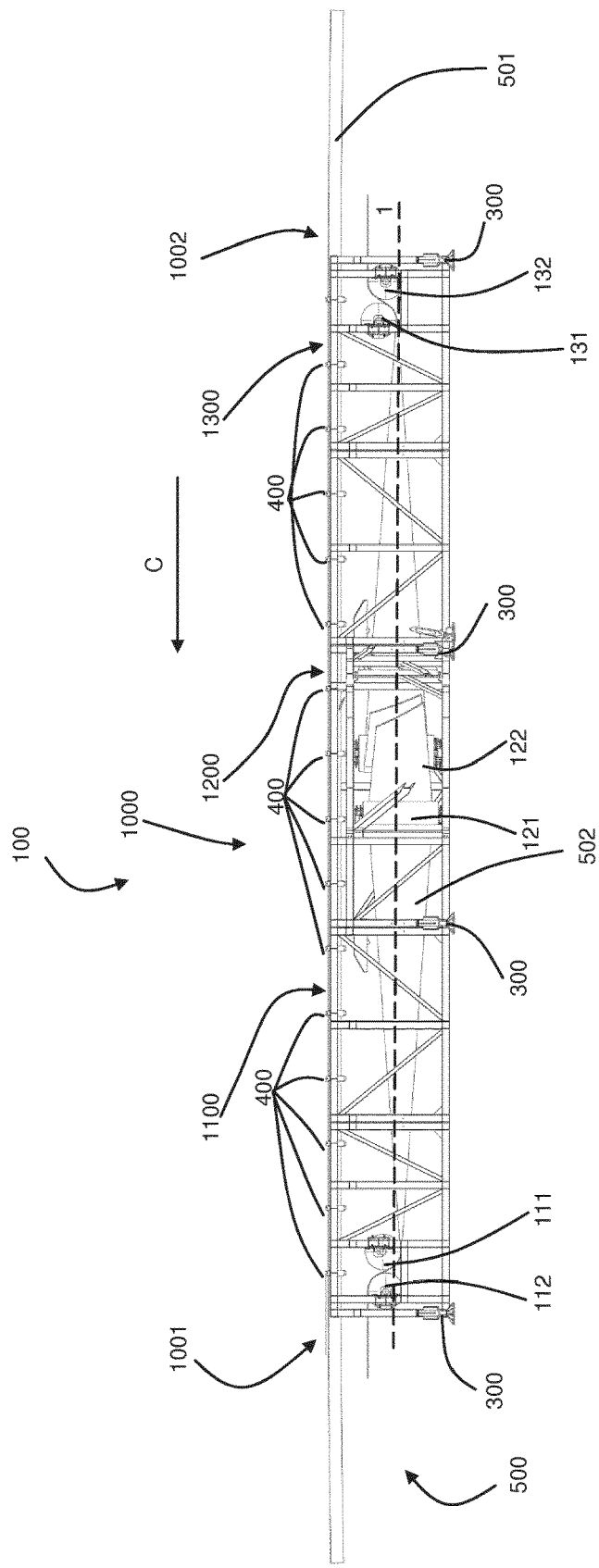
FIG. 2b shows a cross-sectional view of the mountable construction according to FIG. 1b through section H-H.
Figure 2C:
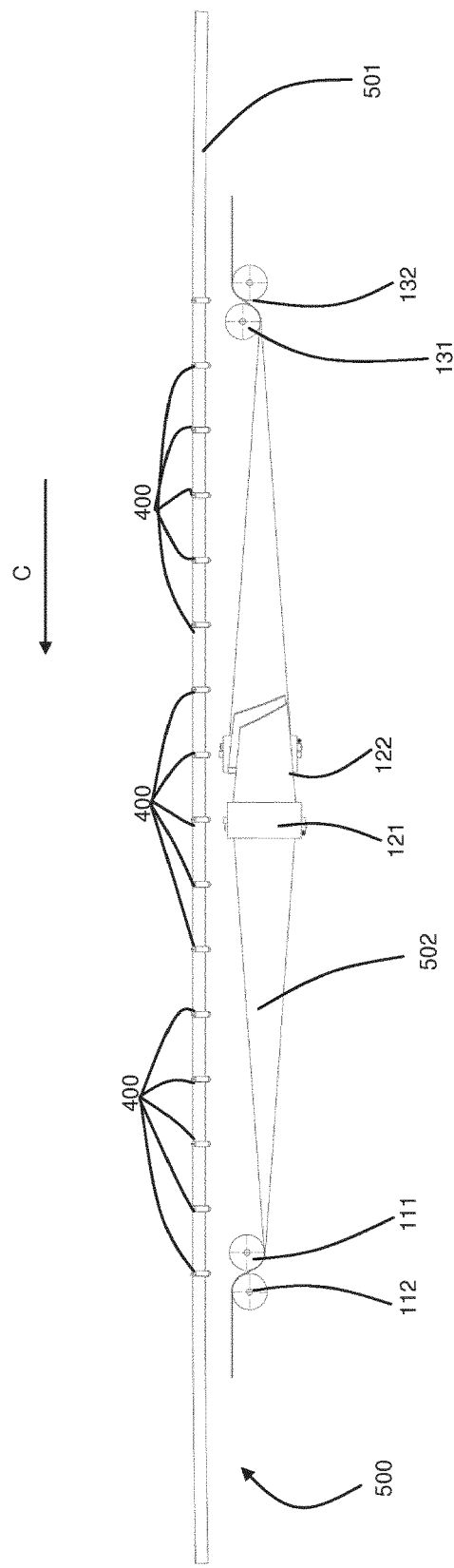
FIG. 2c shows a cross-sectional view of the conveyor belt arrangement according to FIG. 1c through section L-L.
Figure 3A:
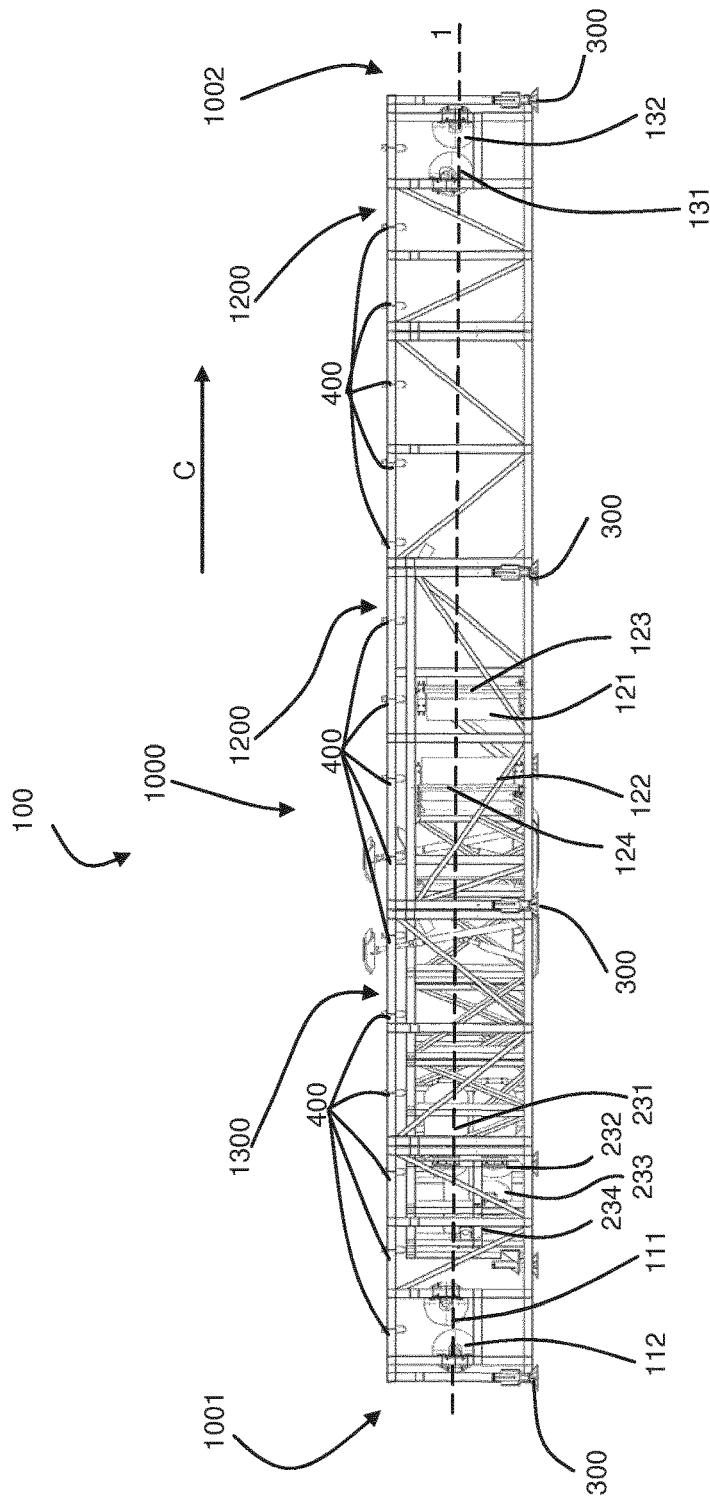
Figure 3B:
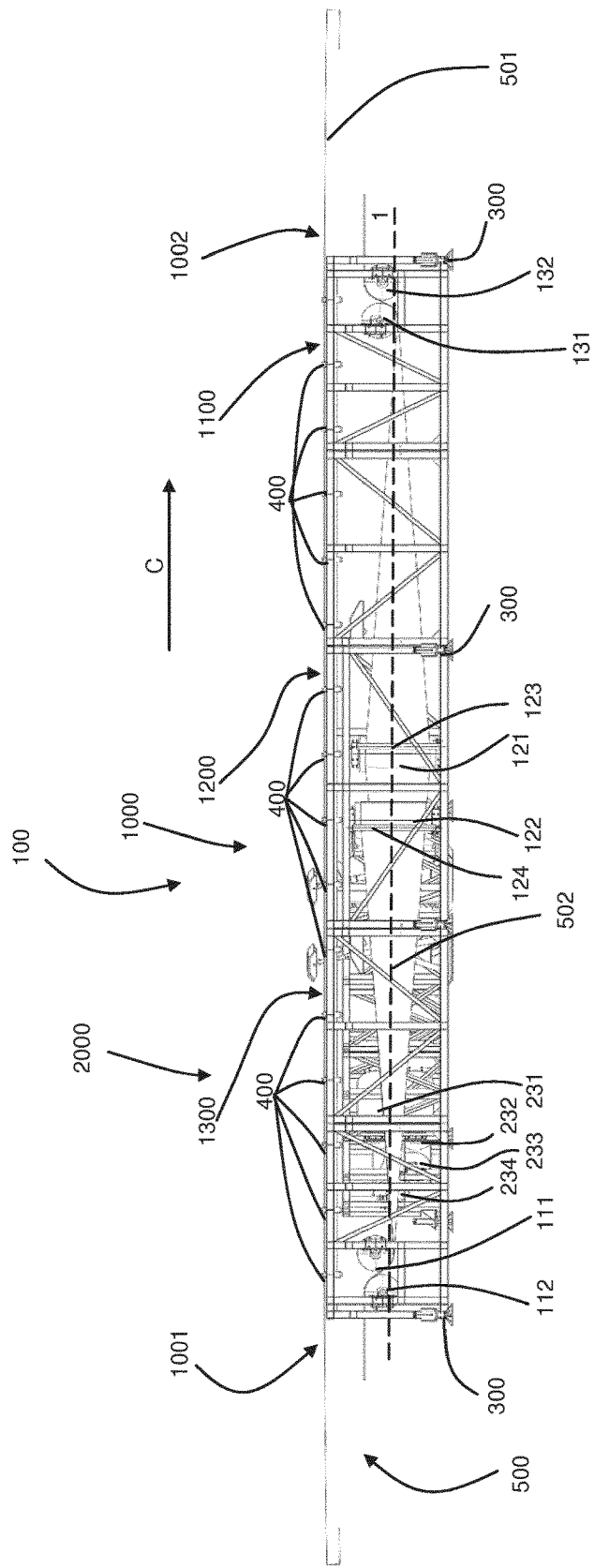
FIG. 3b shows a side view of the mountable construction according to FIG. 1b.
Figure 3C:
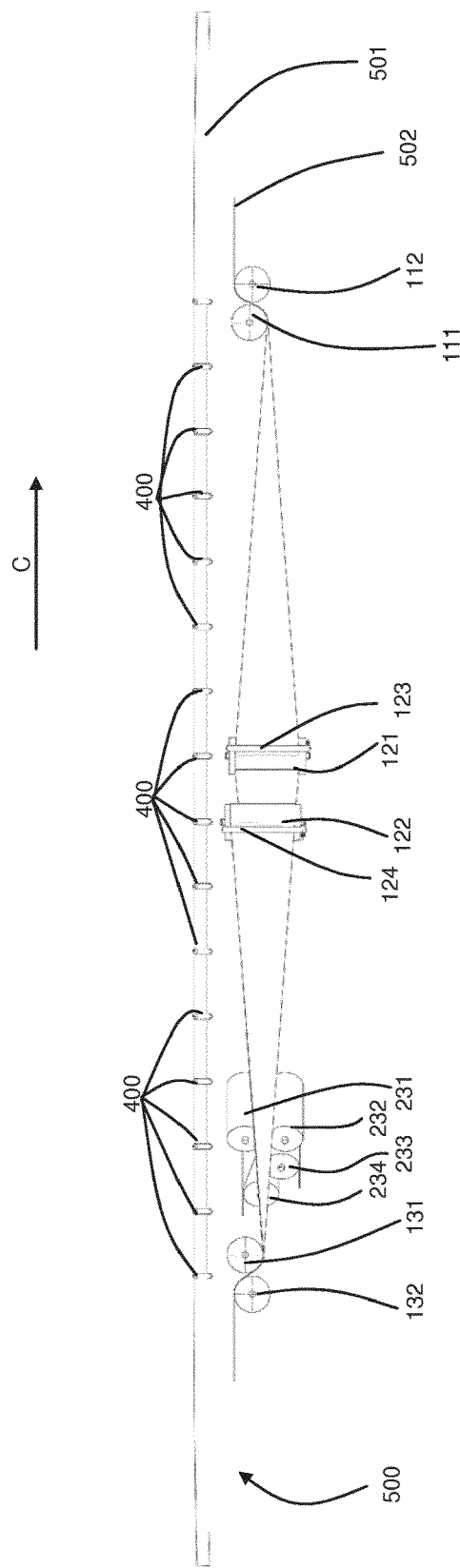
FIG. 3c shows a side view of the conveyor belt arrangement according to FIG. 1c.
Figure 4A:
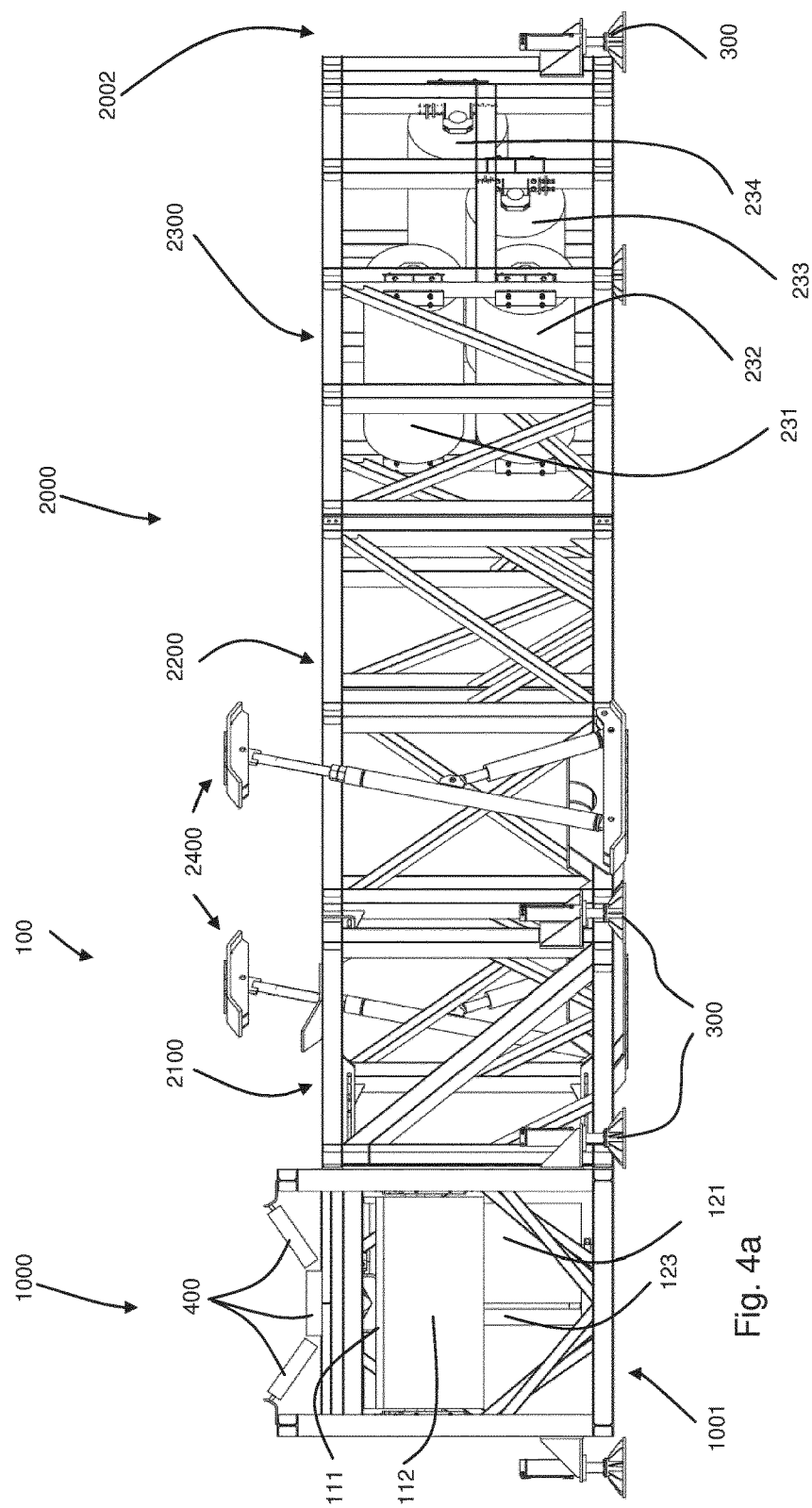
Figure 4B:
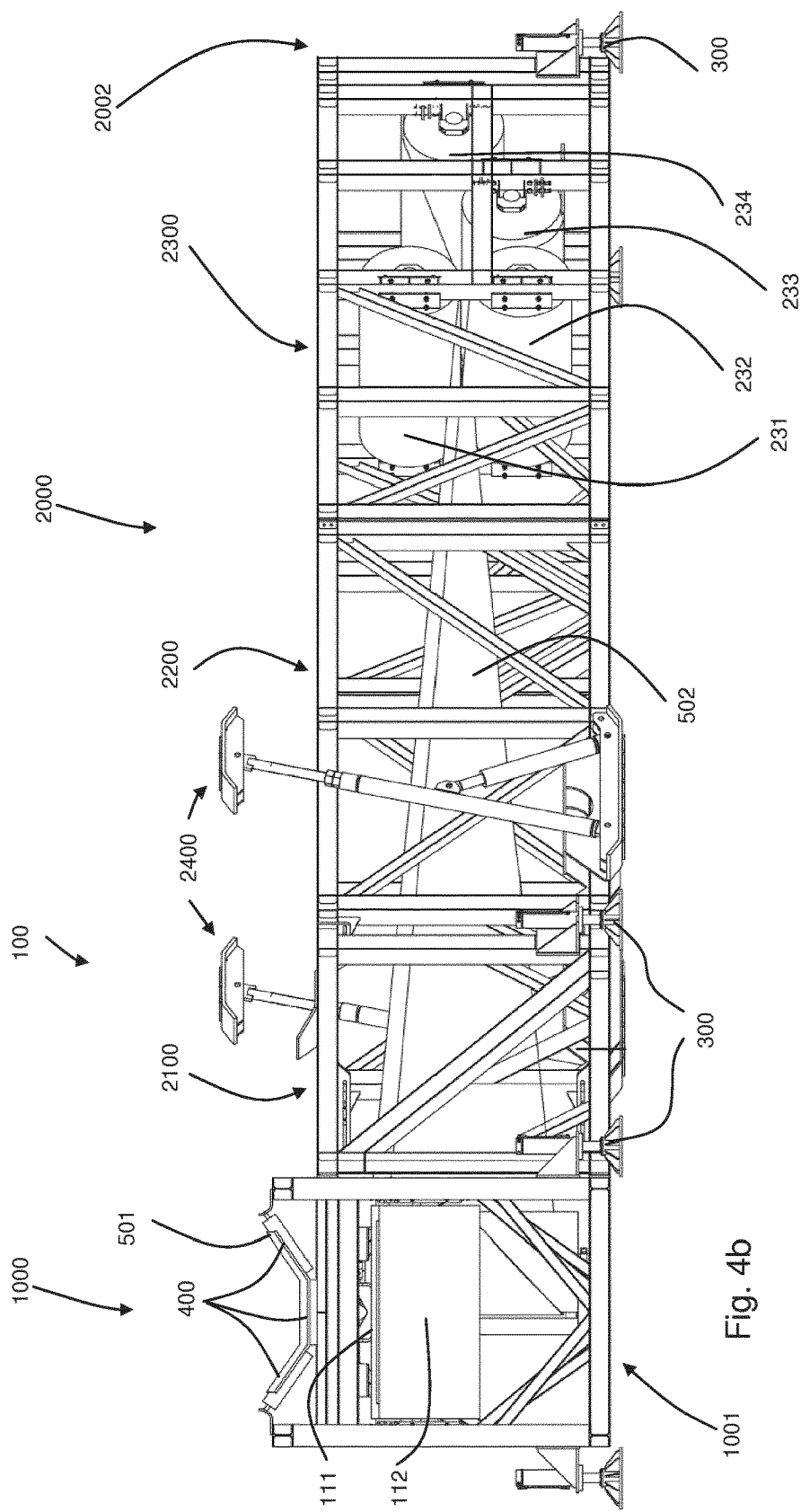
FIG. 4b shows a side view of the mountable construction according to FIG. 1b.
Figure 4C:
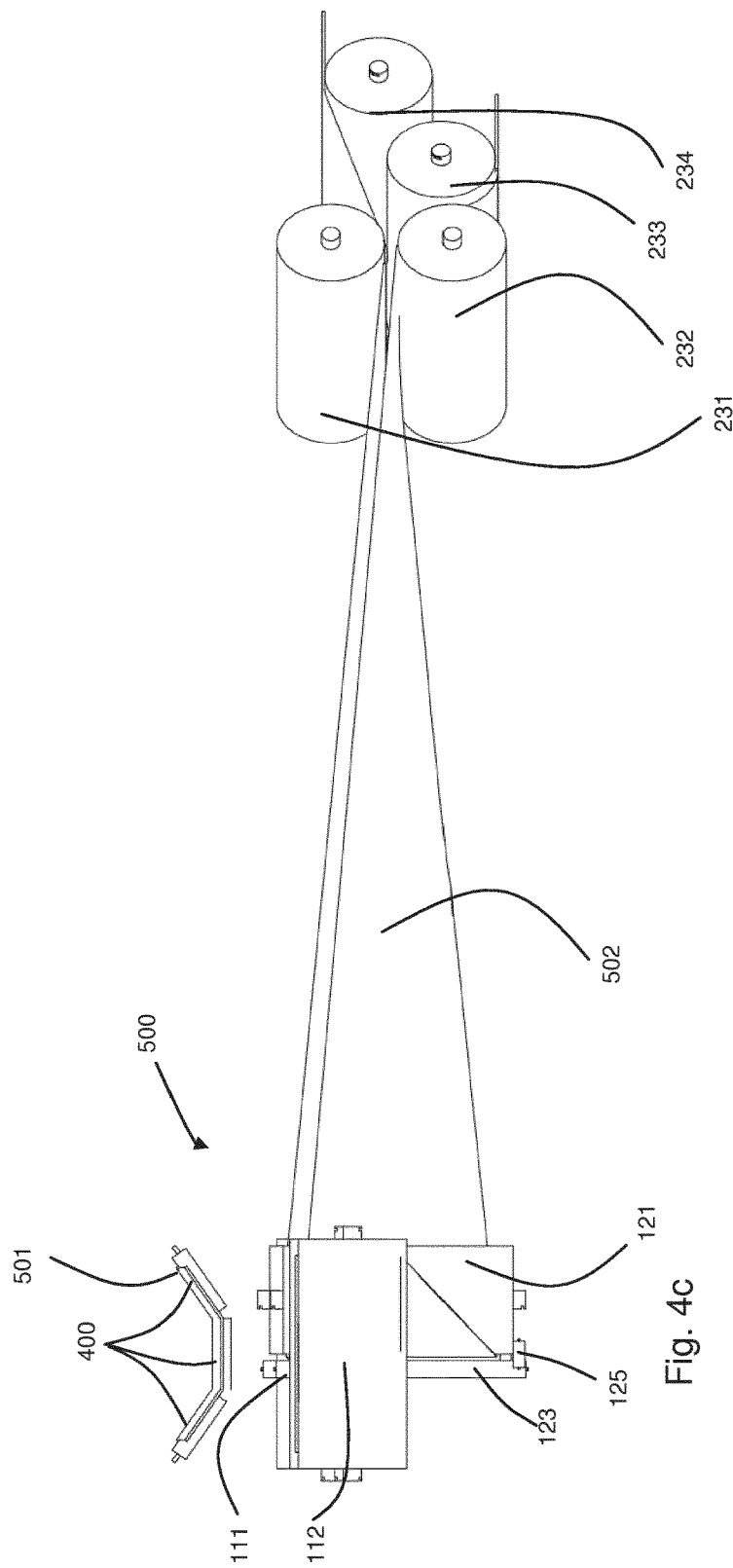
FIG. 4c shows a side view of the conveyor belt arrangement according to FIG. 1c.
Figure 5A:
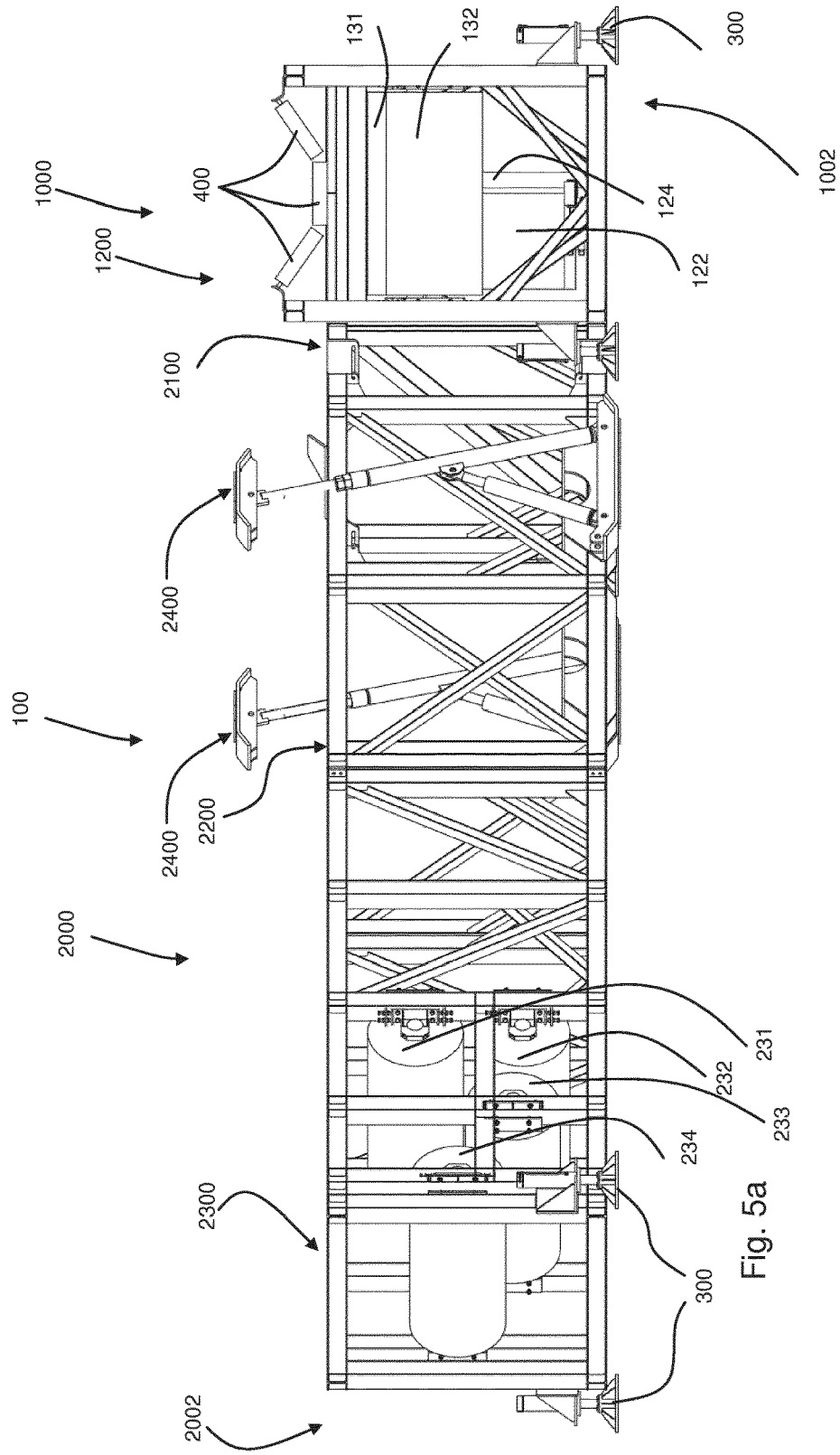
Figure 5B:
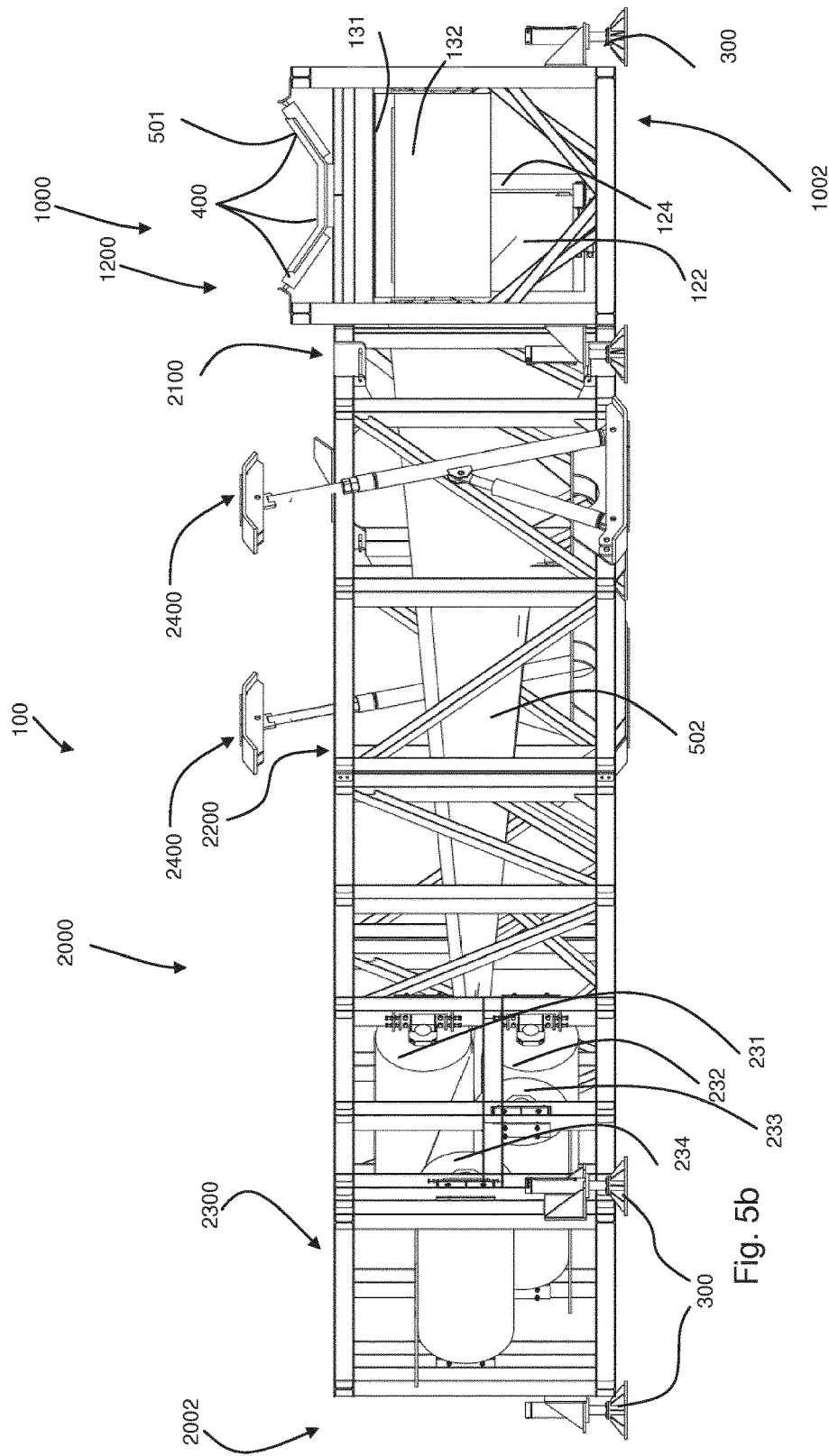
FIG. 5b shows another side view of the mountable construction according to FIG. 1b.
Figure 6A:
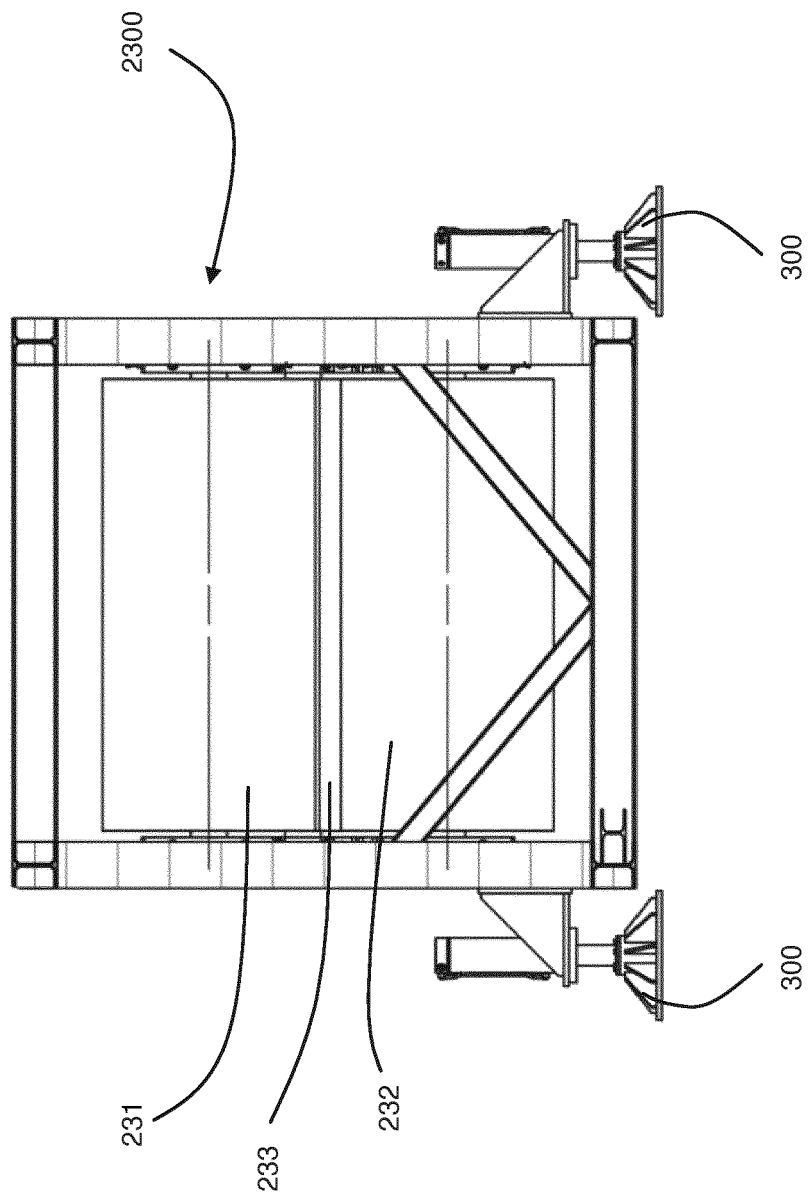
FIG. 6a shows a cross-sectional view of the mountable construction according to FIG. 1a through section B-B.
Figure 6B:
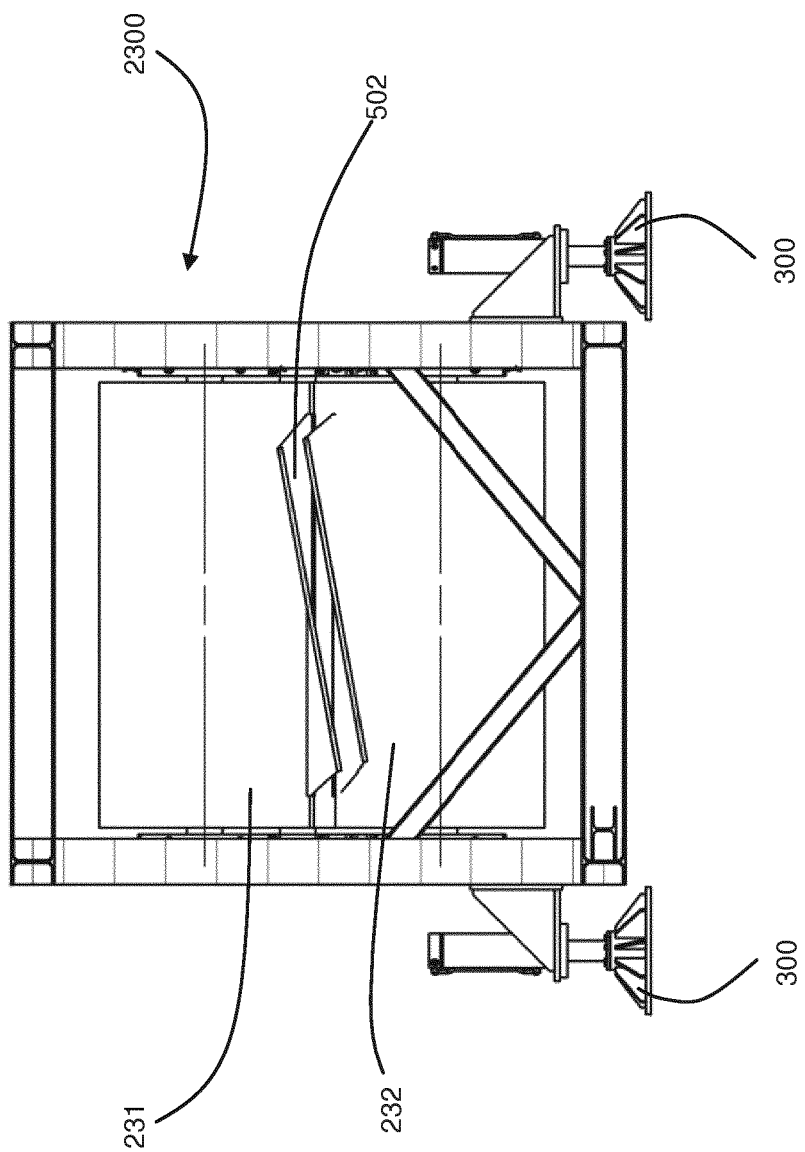
FIG. 6b shows a cross-sectional view of the mountable construction according to FIG. 1b through section F-F.
Figure 6C:
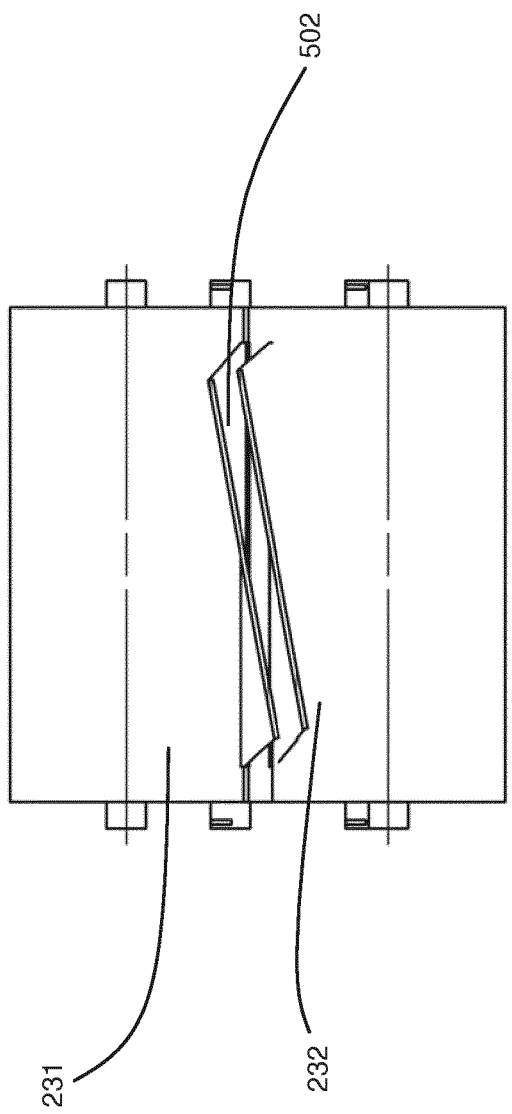
FIG. 6c shows a cross-sectional view of the conveyor belt arrangement according to FIG. 1c through section J-J.
Figure 7A:
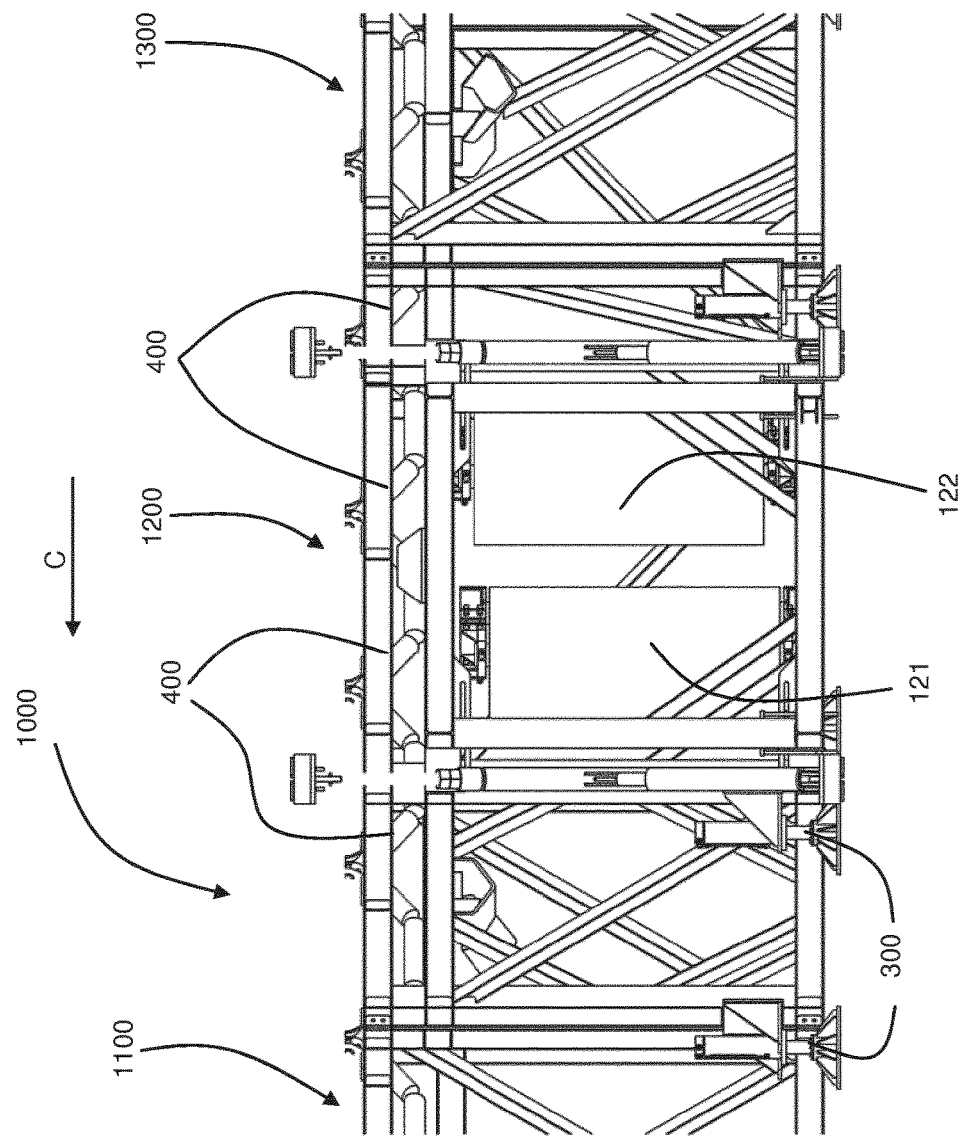
FIG. 7a shows a cross-sectional view of the mountable construction according to FIG. 1a through section D-D.
Figure 7B:
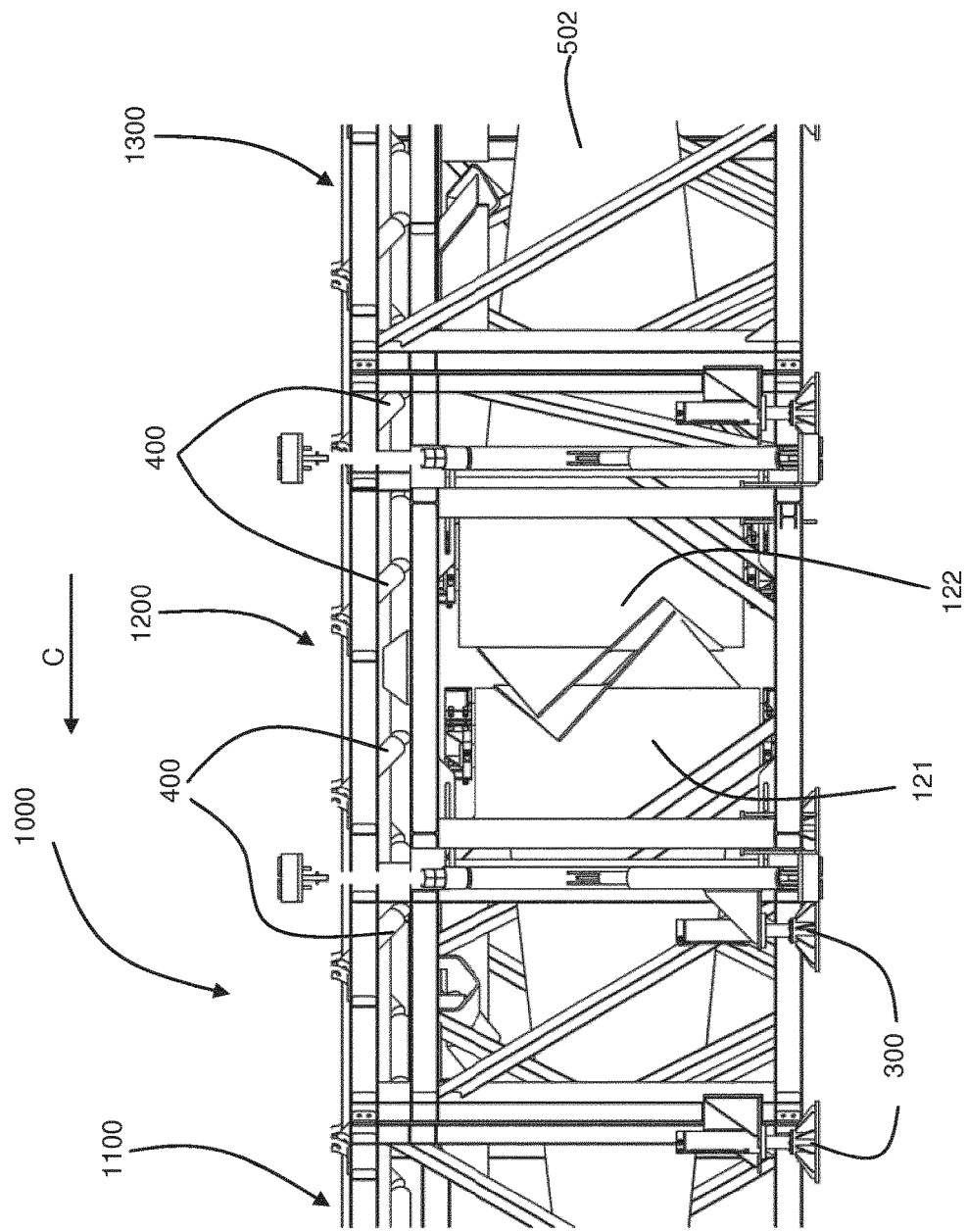
FIG. 7b shows a cross-sectional view of the mountable construction according to FIG. 1b through section G-G.
Figure 7C:
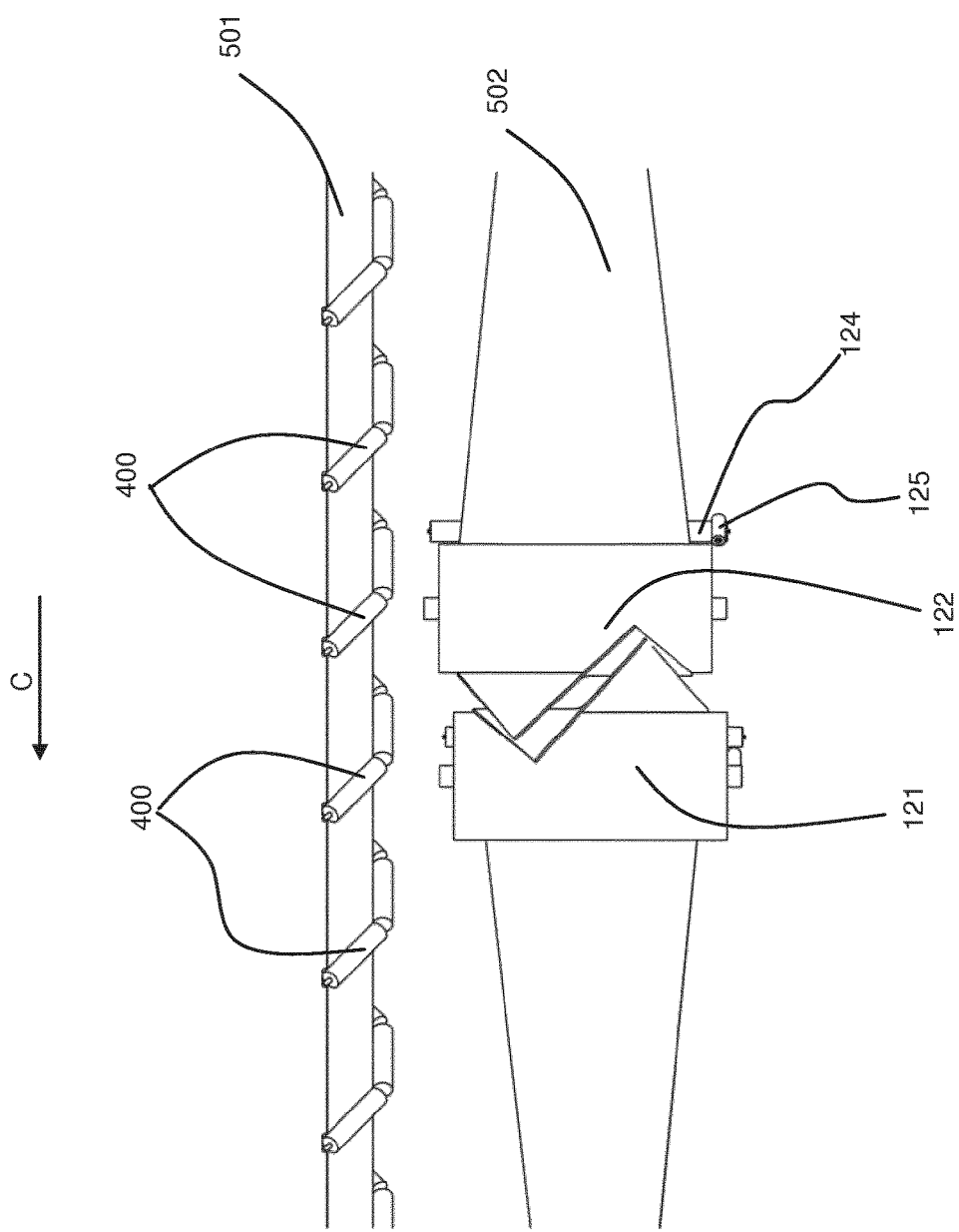
FIG. 7c shows a cross-sectional view of the conveyor belt arrangement according to FIG. 1c through section K-K.
Figure 8:
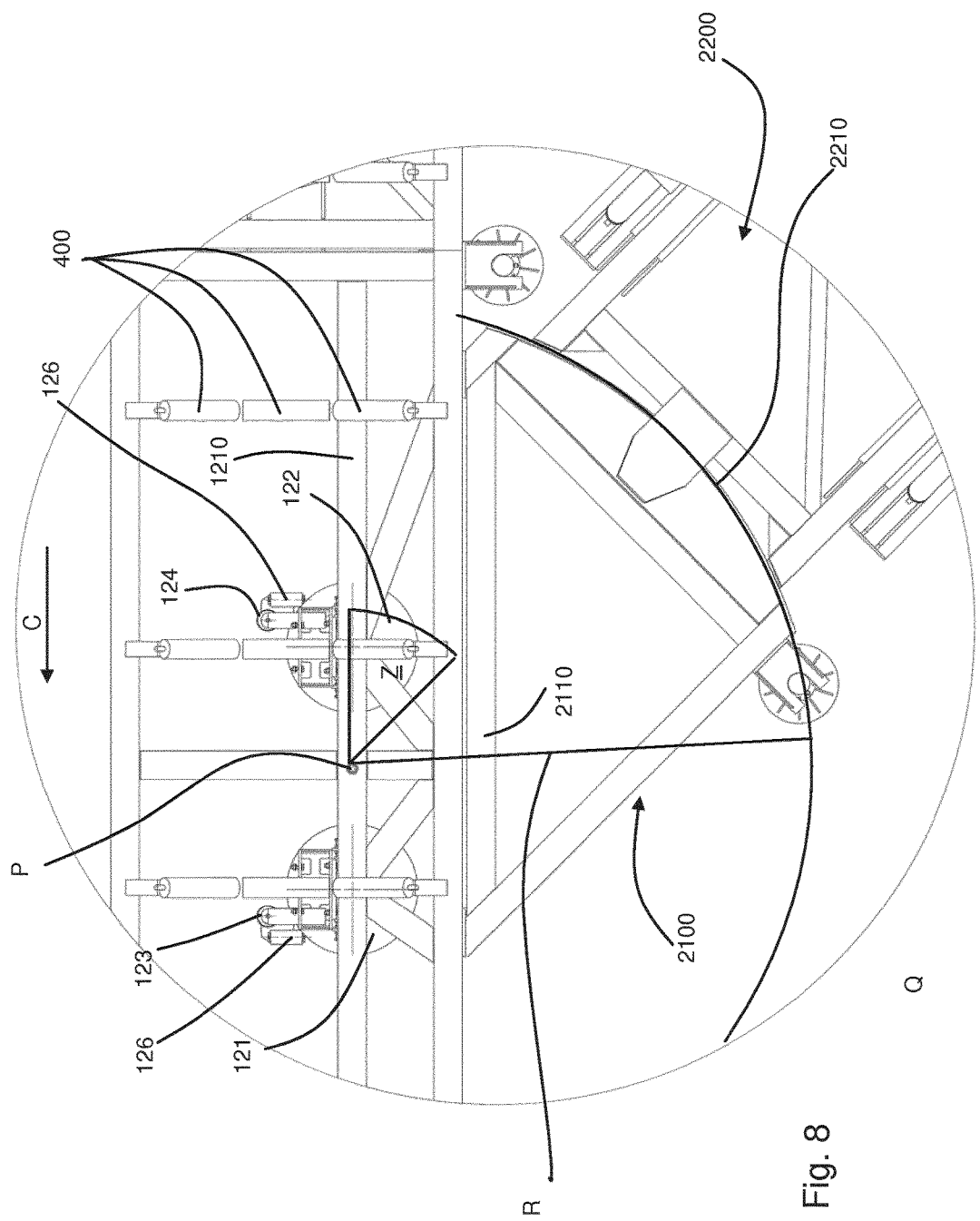
Figure 9:
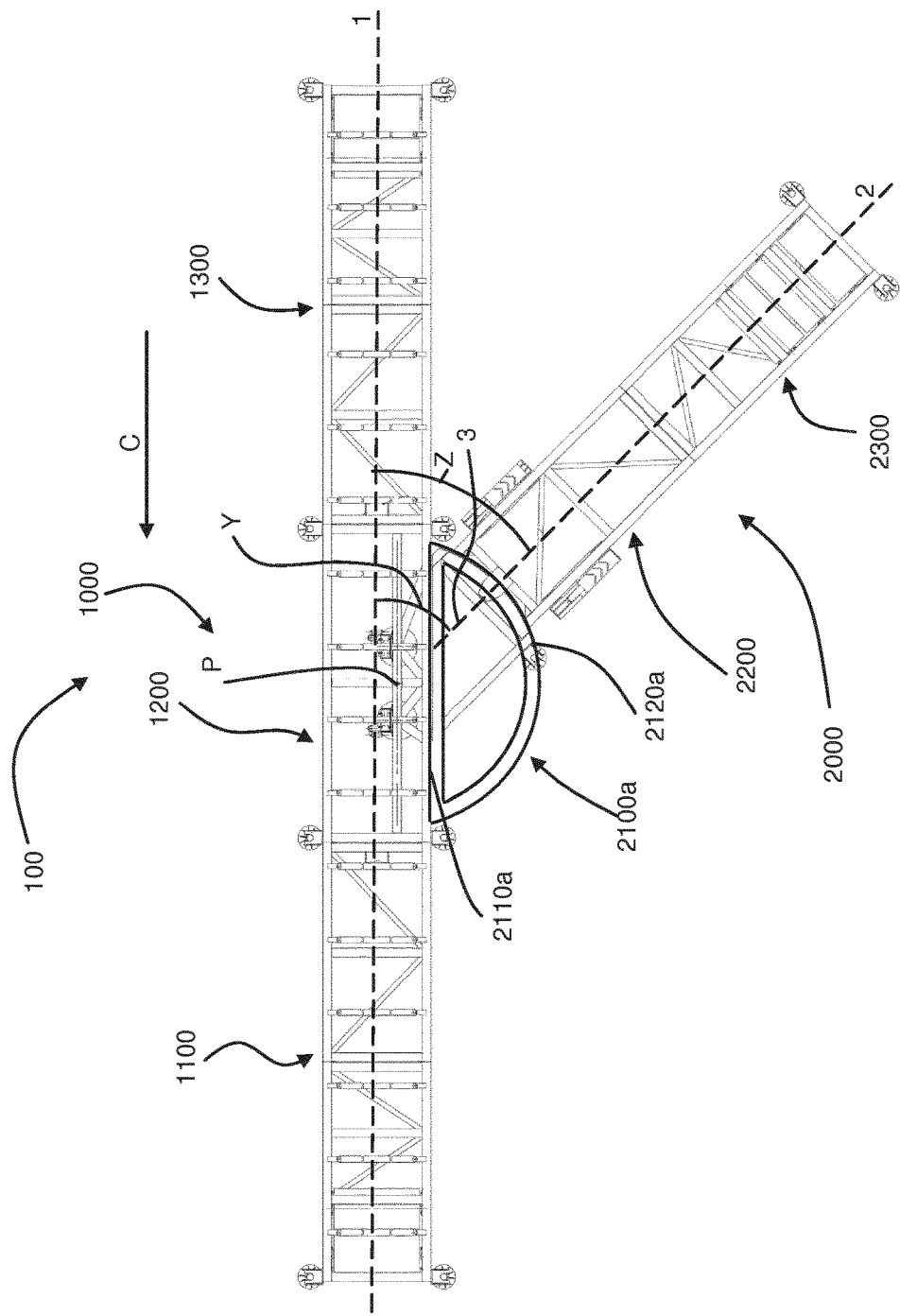
FIG. 9 shows a top view of a further exemplary embodiment of a mountable construction.
Figure 10A:
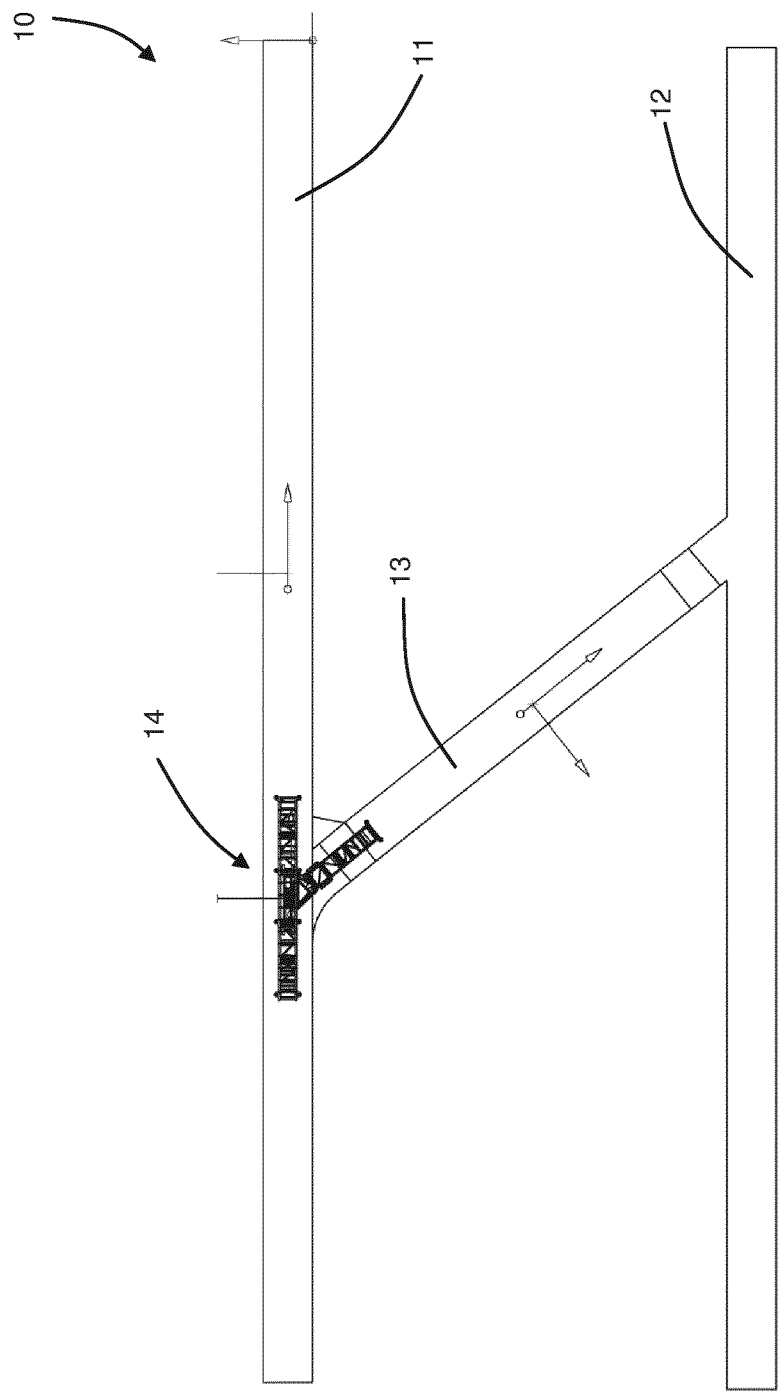
FIG. 10a shows a top view of a schematic underground mine layout.
Figure 10B:
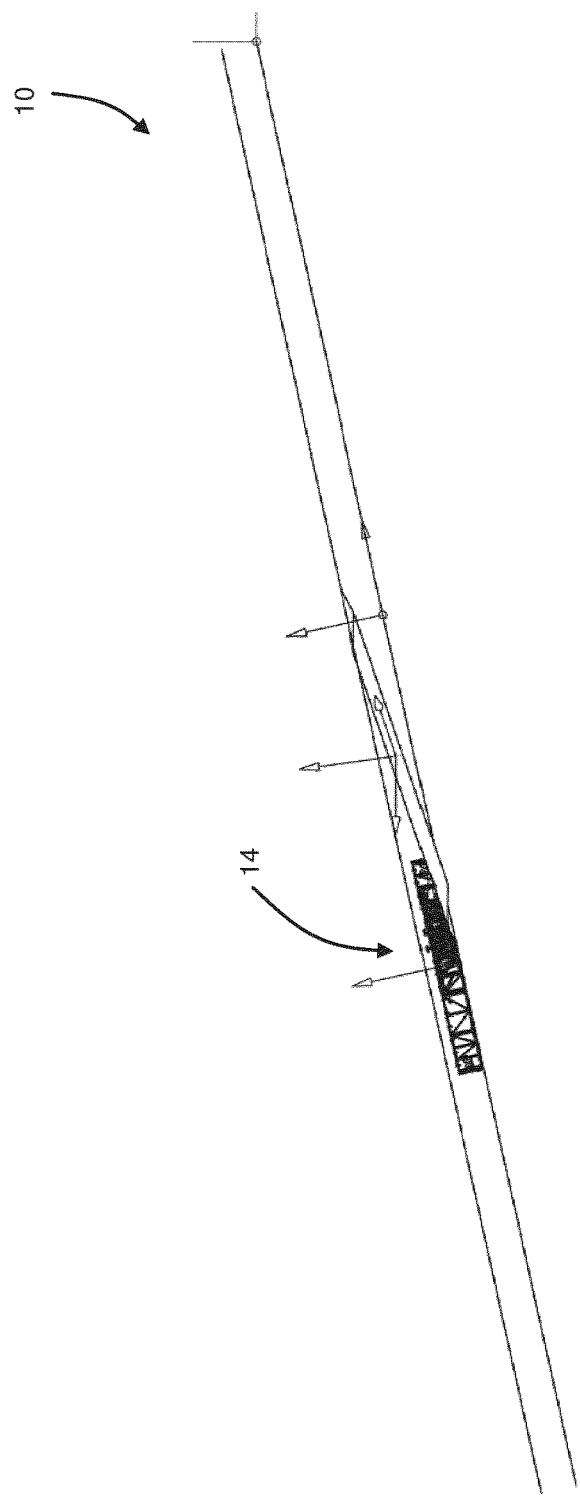
Figure 10C:
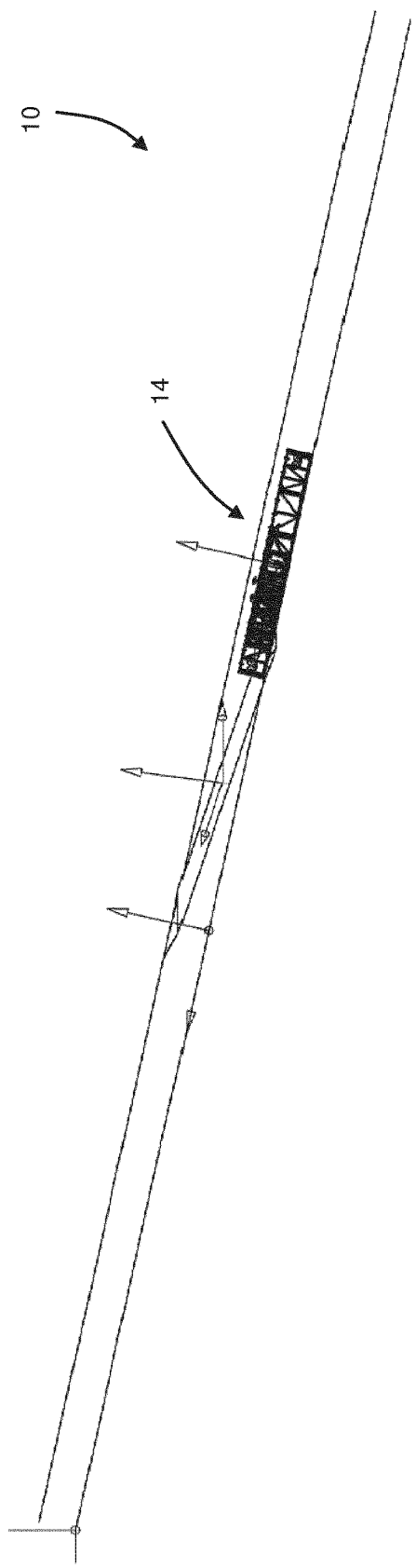
Figure 10D:
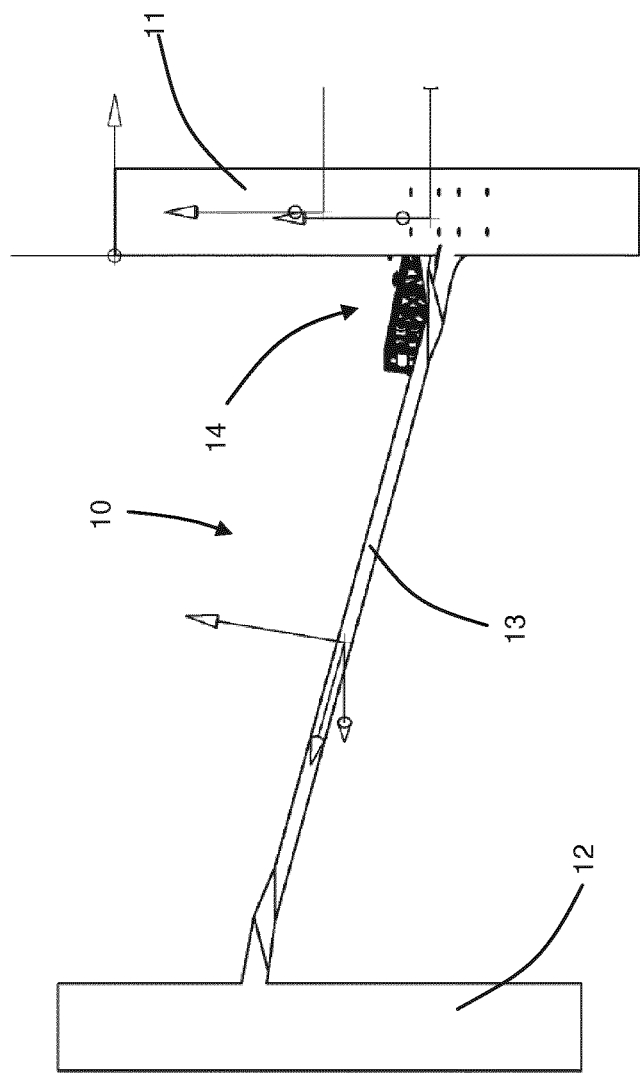
Figure 10E:
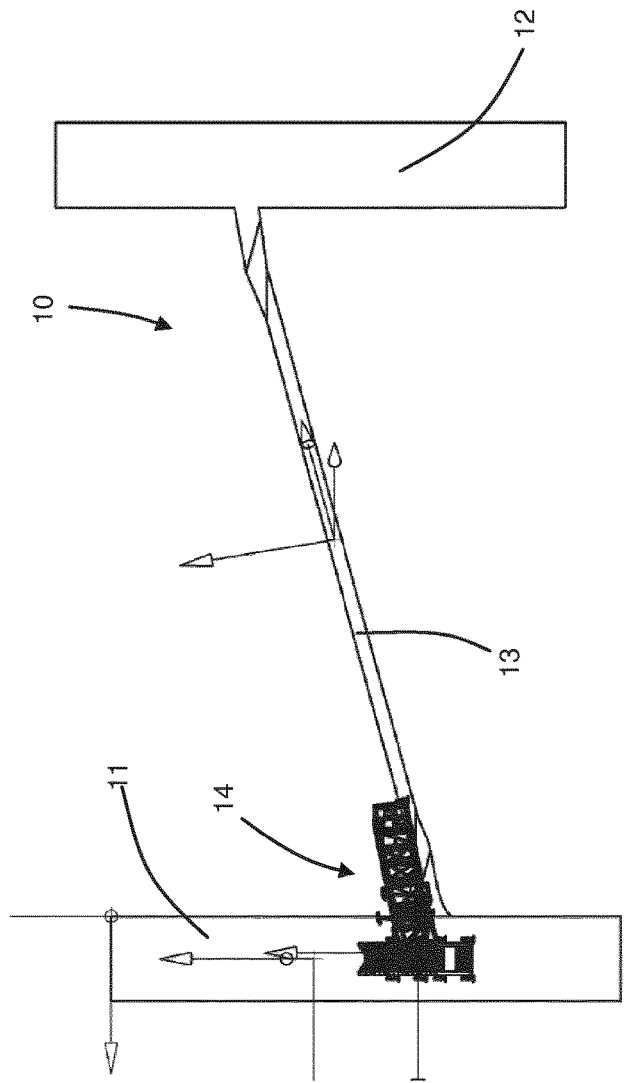
Figure 10F:
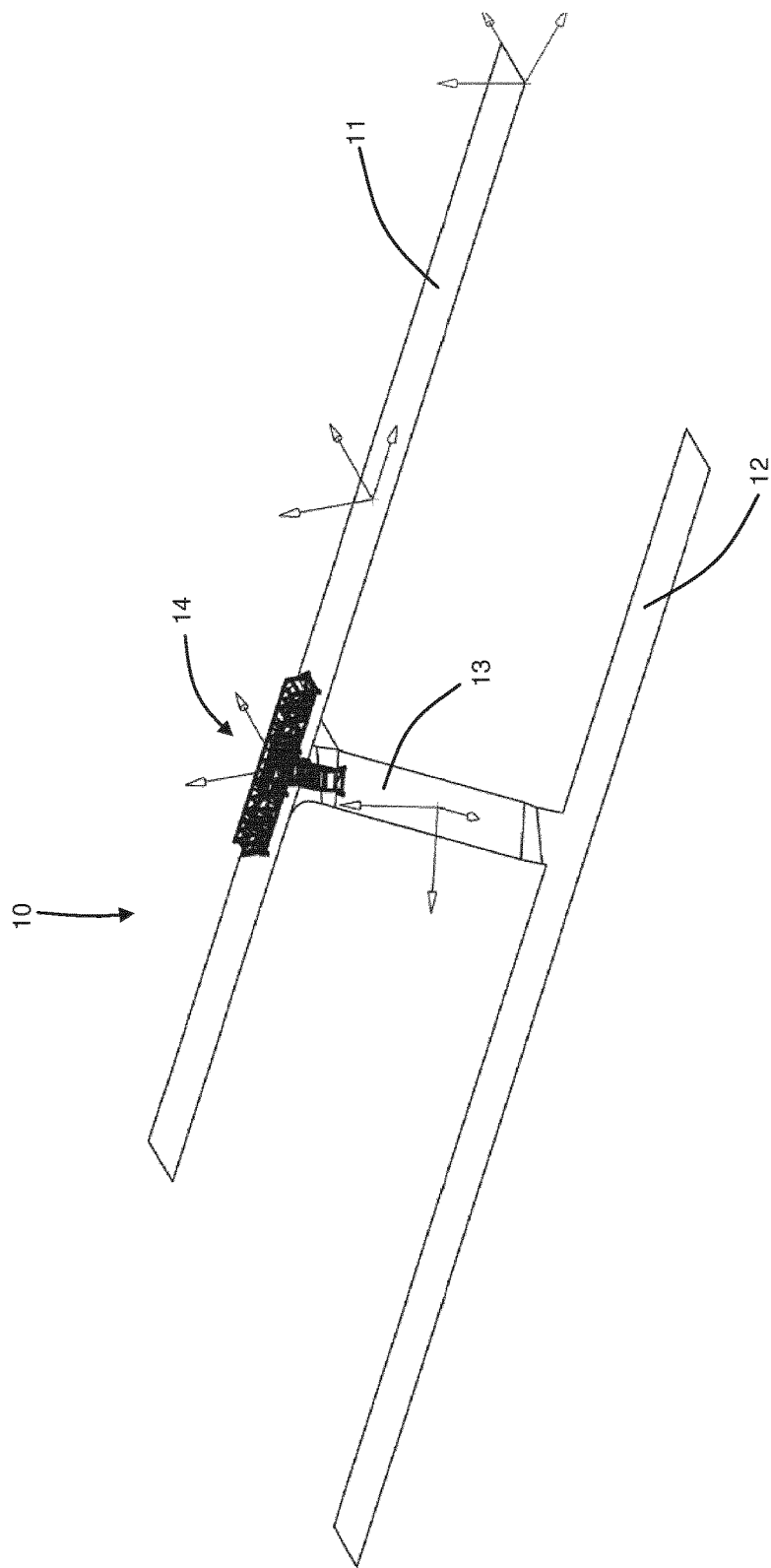

FIGS. 1a-7a, 8 and 21 show an exemplary embodiment of a mountable construction with a certain angle connection module. FIGS. 1b-7b show the mountable construction of FIGS. 1a-7a with a conveyor belt arranged thereon. FIGS. 1c-7c show the conveyor belt arrangement of the mountable construction according to FIGS. 1b-7b. FIG. 9 shows a top view similar to the one of FIG. 1a of a further exemplary embodiment of a mountable construction with a horizontally stepless adjustable connection module. In the figures, identical elements or elements with substantially the same function are indicated with identical reference numerals.

In the FIGS. 1a-7a, 8, and 21 a mountable construction 100 in the form of a deflection device for a belt 500 for continuously conveying material, in particular fragmented material, is shown. The belt 500 preferably is an endless conveyor belt of a continuous haulage system. Material, preferably fragmented material, can be transported in a continuous haulage system, and in particular by the mountable construction 100 in a conveying direction C.

The mountable construction 100 comprises a first support frame 1000 arranged in a first direction 1 and a second support frame 2000 arranged in a second direction 2. The first and second directions 1, 2 of the first and second support frames 1000, 2000 can also be referred to as the longitudinal directions of the support frames 1000, 2000.

The first support frame 1000 has a rear end 1001 and a front end 1002. The terms "rear" and "front" are chosen herein independent from the conveying direction and merely serve to denominate the ends of the first support frame or other items.

Preferably, the mountable construction 100 can be part of a continuous haulage system, wherein preferably the first support frame 1000 forms part of a main conveying strand of such a continuous haulage system. For example, the rear and front ends 1001, 1002 of the first support frame 1000 can be connected to further conveying structures. Preferably, the belt 500 extends not only over the first support frame 1000 but also over the full main strand of a continuous haulage system. A conveyor run 501 of the belt 500 preferably is guided on top or an upper region of the first support frame 1000 via belt guide rollers 400. Alternatively, the conveyor run 501 of the belt may be suspended from the roof. The return run 502 of the belt 500 is preferably guided within the first support frame 1000, wherein the deflection of the belt 500 to the second support frame 2000 also preferably occurs in the return run 502 section of the belt 500 as shown in the figures.

The first support frame 1000 is a modular structure and comprises three frame modules, namely a rear frame module 1100, a center frame module 1200 and a front frame module 1300. The second support frame 2000 also is a modular structure and comprises two frame modules, namely an intermediate frame module 2200 and a take-up frame module 2300. At the take-up end 2002 of the second support frame 2000 on the take-up frame module 2300, a belt or loop belt take-up system (not shown) can be connected to the mountable construction 100, for example.

In order to fix and/or stabilize the mountable construction 100 in its desired position and orientation, to the second support frame 2000 two staying elements 2400 can be fixed comprising hydraulic cylinders. The staying elements 2400 can be extended in a vertical direction such that they can be stayed between the floor and the roof of a mining drift or tunnel.

Further, the mountable construction 100 comprises a plurality of hydraulic stands 300 on the first support frame 1000, the second support frame 2000 and the connection module 2100. These levelling elements in the form of hydraulically extendable stands 300 are adapted to level out an uneven floor.

Preferably, the mountable construction 100 comprises a hydraulic unit (not shown) for activating, in particular extending and retracting, the hydraulic stands 300 and/or the staying elements 2400.

The guiding and deflection of the belt 500 within the mountable construction 100 is described in the following.

The first support frame 1000 comprises two vertically arranged first belt deflectors in the form of first pulleys, or deflection pulleys 121, 122 arranged at and connected to the center frame module 1200 of the first support frame 1000. The first support frame 1000 further comprises at its rear and front frame modules 1100, 1300 two horizontally arranged third belt deflectors respectively, in the form of third pulleys 111, 112, 131, 132. Third pulleys 111 and 131 are carrying pulleys, while third pulleys 112 and 132 are optional adjustment pulleys.

For certain applications, it can be preferred that the belt guide rollers 400 guiding the conveyor run 501 of the belt 500 are arranged in an elevated position or that the conveyor run 501 of the belt 500 is suspended from the roof instead of guided on top of the first support frame.

At the third pulleys 111, 112, 131, 132, the return run 502 of the belt 500 is guided in a horizontal orientation. Between the third pulley 111 and the first pulley 121 and between the third pulley 131 and the first pulley 122, the return run 502 of the belt 500 is twisted to a vertical orientation. This is realized by the provision of the two vertically arranged first belt pulleys 121, 122. The first pulleys 121, 122 are connected to and arranged at an adjustment element 1210 located on the center frame module 1200 of the first support frame 1000, such that the position of the first pulleys 121, 122 can be varied along the first direction 1. The first pulleys 121, 122 are arranged such that a first tangent line is positioned substantially in the middle of the return run 502 of the belt 500 in its horizontal orientation.

Further optional support rollers 125, 126 can be arranged beneath and/above the belt 500. Further optional belt tracking device can be installed at any position needed within the mountable construction 100. Further parallel to the first pulleys 121, 122 optional support rollers 123, 124 can be arranged for preventing the belt 500 from buckling, in particular the return run 502 of the belt 500, when belt tension is low.

In the vertical orientation when wrapped around the first pulley 121, 122 the belt 500, in particular the return run 502 of the belt 500, it can be led off toward the second support frame 2000 basically in any desired direction or angle.

The second support frame 2000 comprises horizontally arranged second pulleys 231, 232, 233, 234, which are arranged at and connected to the take-up frame module 2300 of the second support frame 2000. The return run 502 of the belt 500 is twisted to a horizontal orientation between the first pulleys 121, 122 arranged at the center frame module 1200 of the first support frame 1000 and the second pulleys 232, 231, arranged at the take-up frame module 2300 of the second support frame 2000. Second pulleys 231 and 232 are carrying pulleys, while second pulleys 233 and 234 are optional adjustment pulleys. At the second pulleys 231, 232, 233, 234, the return run 502 is guided in a horizontal orientation.

The mountable construction 100 further comprises a connection module 2100 arranged in a connection direction 3. The connection module 2100 is adapted to couple the first and second support frames 1000, 2000 with each other in a horizontal plane. In particular, the connection module 2100 is adapted such that the second support frame 2000 is coupleable to the first support frame 1000 at a variable or different horizontal angle Z. The horizontal angle Z is the horizontal angle included or confined between the first direction 1 of the first support frame 1000 and the second direction 2 of the second support frame 2000.

According to the embodiment of the mountable construction 100 shown in FIGS. 1a-8, and 21, this variability of the horizontal angle Z is realized as described in the following. The connection module 2100 comprises a first face 2110 for coupling the connection module 2100 with the first support frame 1000 and a second face 2120 for coupling the connection module 2100 with the second support frame 2000. The first face 2110 is adapted or arranged to form a horizontal angle Y with the connection direction 3 of the connection module 2100.

The second face 2120 is curved in a horizontal plane and has the shape of an arc of a circle with a radius R about a (virtual) pivotal point P in a horizontal plane and thus is adapted to couple the second support frame 2000 to the connection module 2100 under different horizontal angles. In the situation shown in FIGS. 1a-8, the second support frame 2000 is coupled via the second face 2120 to the connection module 2100 such that the connection direction 3 and the second direction 2 are identical. However, the curved shape of the second face 2120 allows for the second support frame 2000 to be coupled to the connection module 2100 at different angles, such that the second direction 2 is angled to the connection direction 3, in particular angled by +/−5 degrees.

In this way, while the first face 2110 of the connection module 2100 defines a fixed angle Y, the second face 2120 allows for an adjustment of the second direction 2 in relation to the connection direction 3 and the first direction 1 such that the horizontal angle Z between the second direction 2 and the first direction 1 can be adjusted in a range of +/−5 degrees, for example, based on angle Y.

Of course, the connection module 2100 can be arranged on either side of the first support frame 1000. In this case, preferably also the center frame module 1200 with the first pulleys 121, 122 is rotated by 180 degrees in a horizontal plane.

A further variability of the mountable construction 100 is realized in that the connection module 2100 is exchangeable against another connection module, wherein this other connection module comprises a first face adapted to form a different horizontal angle with the connection direction. Preferably, this other connection module also has a second face with the shape of an arc of a circle in a horizontal plane, such that also the second face of the other connection module allows for connecting the second support frame thereto at different horizontal angles.

By combining the exchangeability of the connection module 2100 against any one of a series of connection modules with first faces adapted for different horizontal angles with the connection direction and curved second faces allowing for an adjustability of the second direction with respect to the connection direction, a modular and variable mountable construction 100 is realized.

In FIG. 9, a further embodiment of the mountable construction 100 is shown. The first and second support frames 1000, 2000 of the mountable construction 100 shown in FIG. 9 correspond to the first and second support frames 1000, 2000 of the mountable construction shown in FIGS. 1a-8. However, the connection module 2100a of the mountable construction 100 of FIG. 9 differs from the connection module 2100 shown in FIGS. 1a-8. The connection module 2100a shown in FIG. 9 comprises a first face 2110a for coupling the connection module 2100a with the first support frame 1000 and a second face 2120a for coupling the connection module 2100a with the second support frame 2000. The first face 2110a and the second face 2120a have the shape of a half-circle in its horizontal plane in the embodiment of FIG. 9. In this way, the second support frame 2000 can be coupled to the connection module 2100a at different horizontal angles without the need to exchange the connection module 2100a. If the first face 2110a and the second face 2120a are realized as sections of spheres (e.g. semi-spheres), for example, the modified second support frame 2000 could be coupled to the modified connection module 2100a at different angles with respect to the three dimensional space.

The modular and variable mountable construction 100 therefore allows for a variable setup and in particular a variable angle of deflection for leading off the belt from a main conveying strand to a belt or loop belt take-up system, for example.

In FIGS. 10a-10f a part of an underground mine 10 is schematically depicted. The underground mine layout has two main mining drifts 11 and 12 which are connected via a connection drift 13, which is angled to the main mining drifts 11, 12 under 45° in the top view of FIG. 10a. However, the geometrical conditions of underground mines require that mountable constructions are able to fit various mine layout conditions. For example, the main mining drifts 11, 12 and the connection drift 13 may be sloping, each by a different degree, which will lead to the need of the various pivoting, twisting and angling operations described herein as the various possibilities of adaptations to different angles by the connection module, possibly combined with the adjustment element, referred to also as slewing, luffing and/or twisting of the second support frame.

Figure 11A:
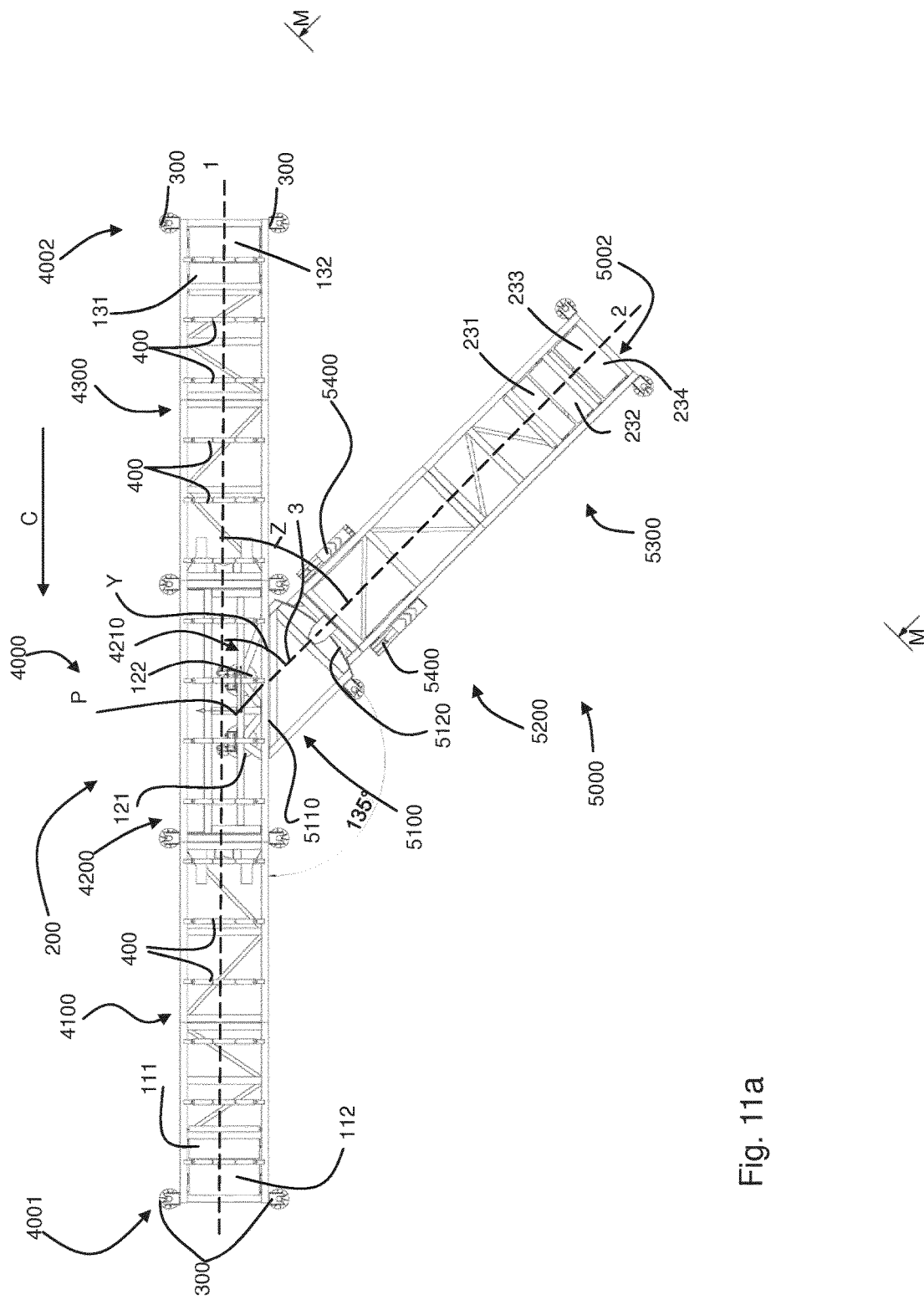
FIG. 11a shows a top view of a second exemplary embodiment of a mountable construction with the connection module at 45° and all other angles at 90°.
Figure 11A:
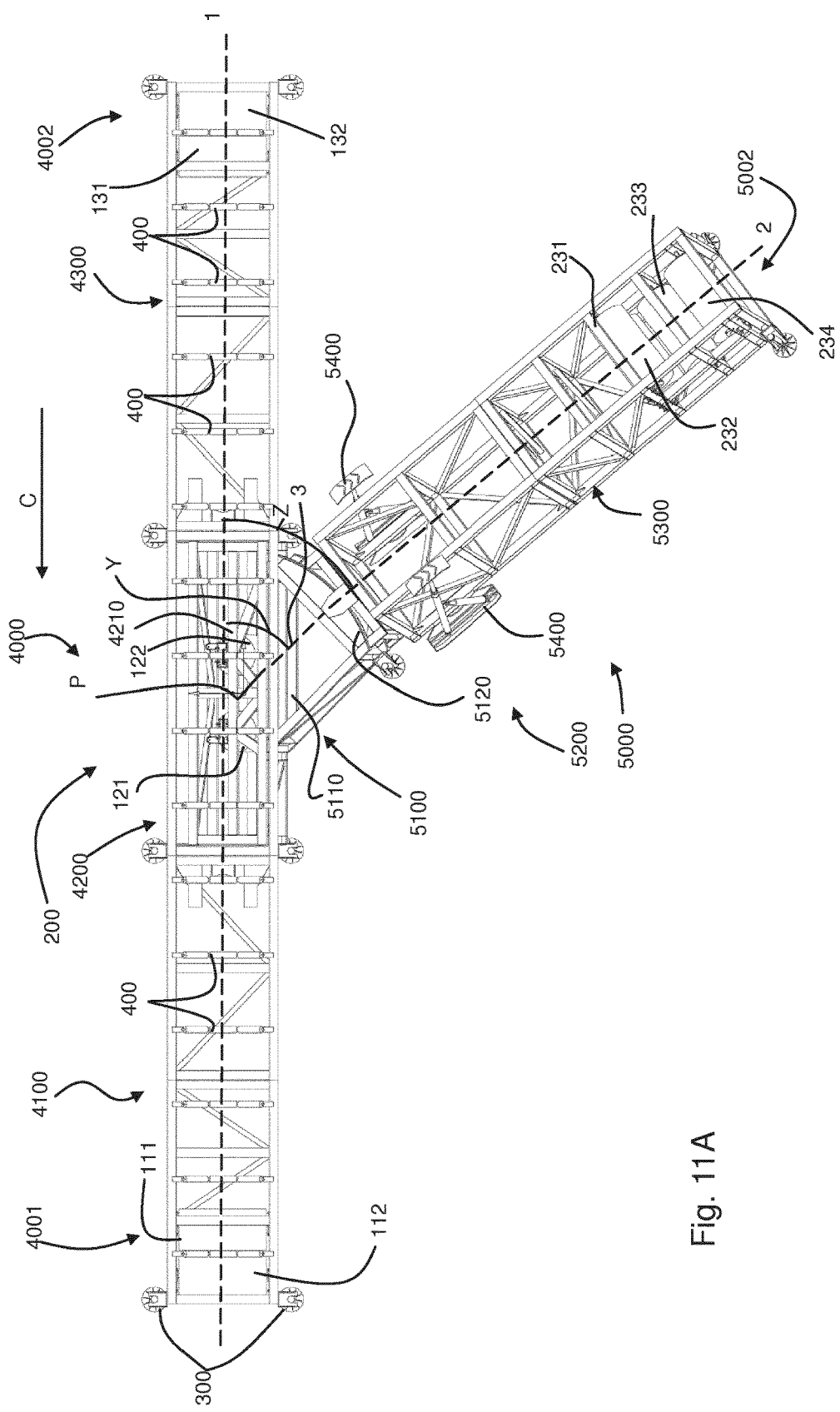
Figure 12:
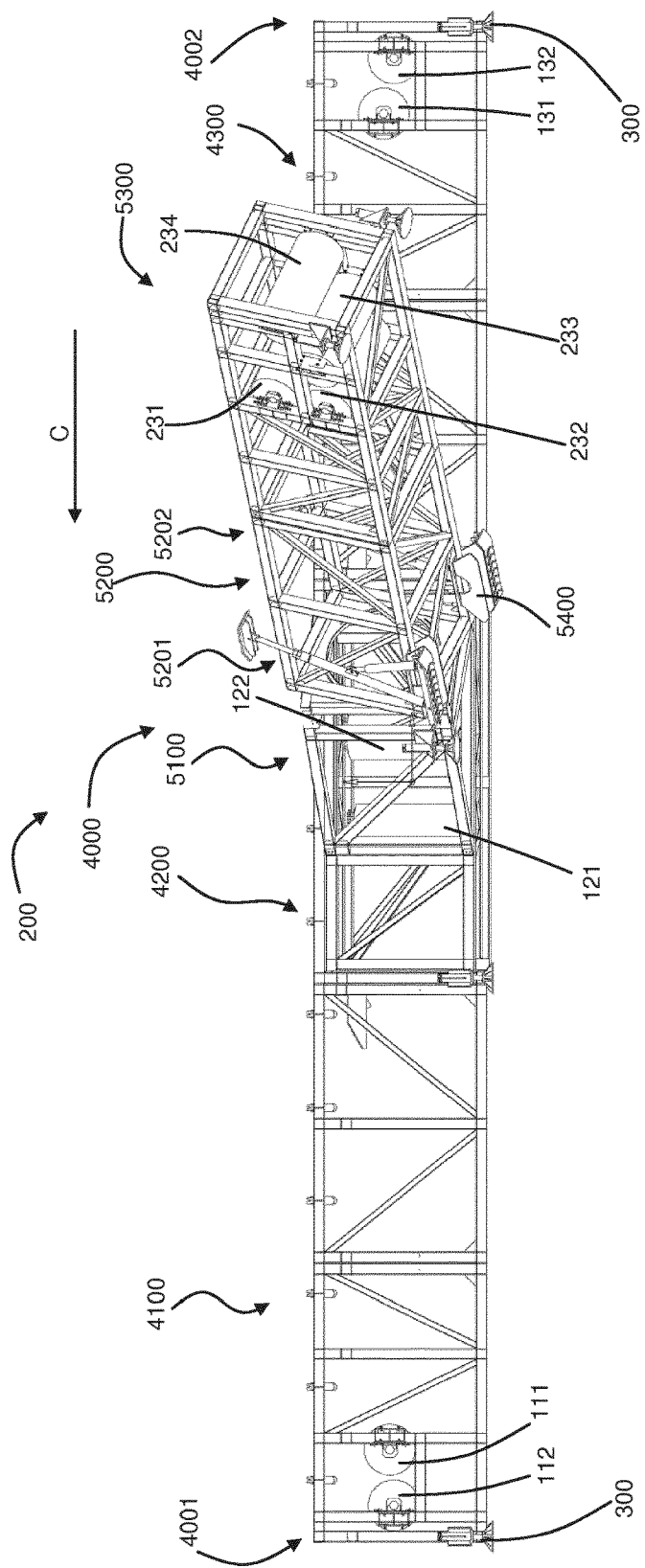
FIG. 12 shows a front view of the mountable construction according to FIG. 11A.
Figure 13:
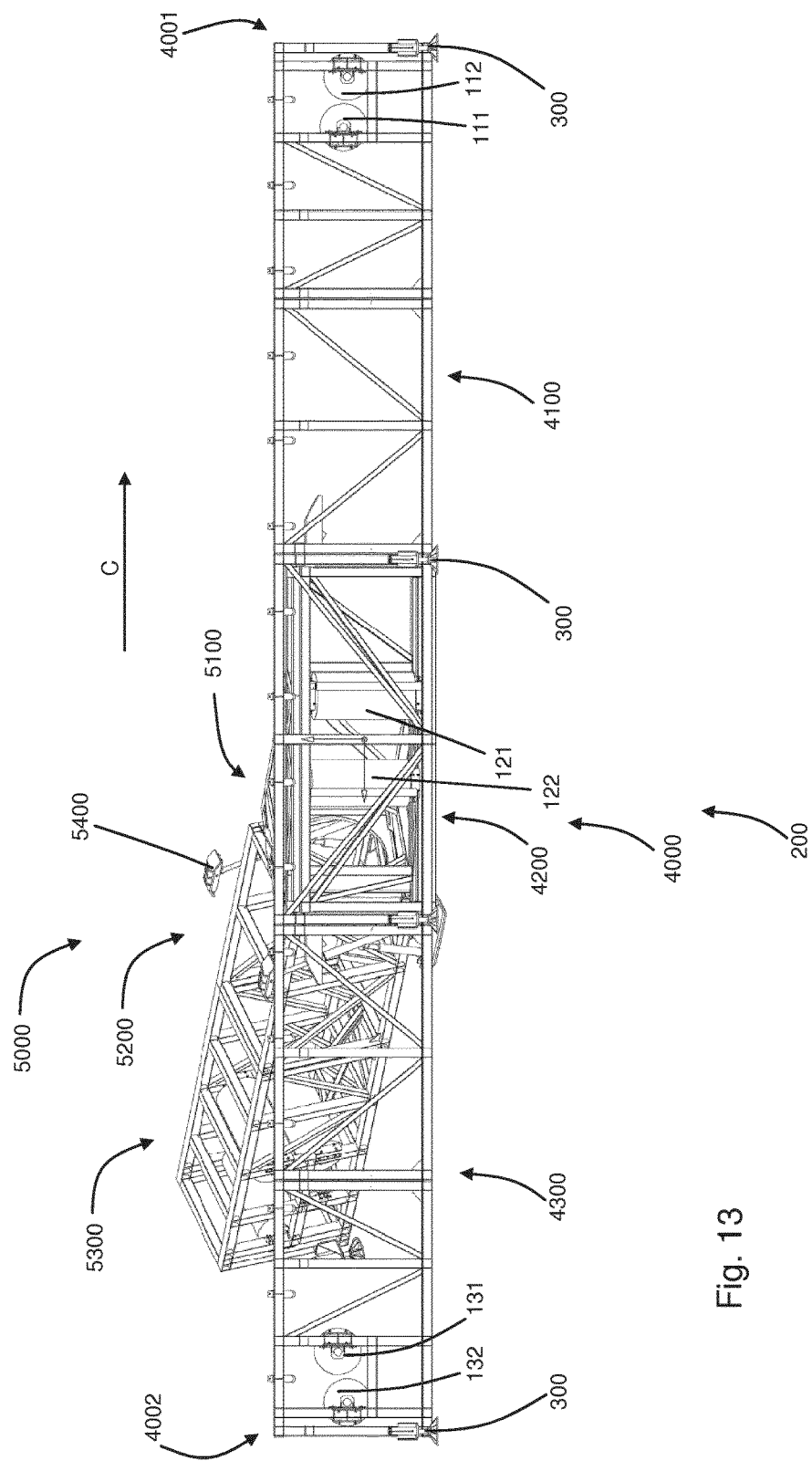
FIG. 13 shows a back view of the mountable construction according to FIG. 11A.
Figure 14:
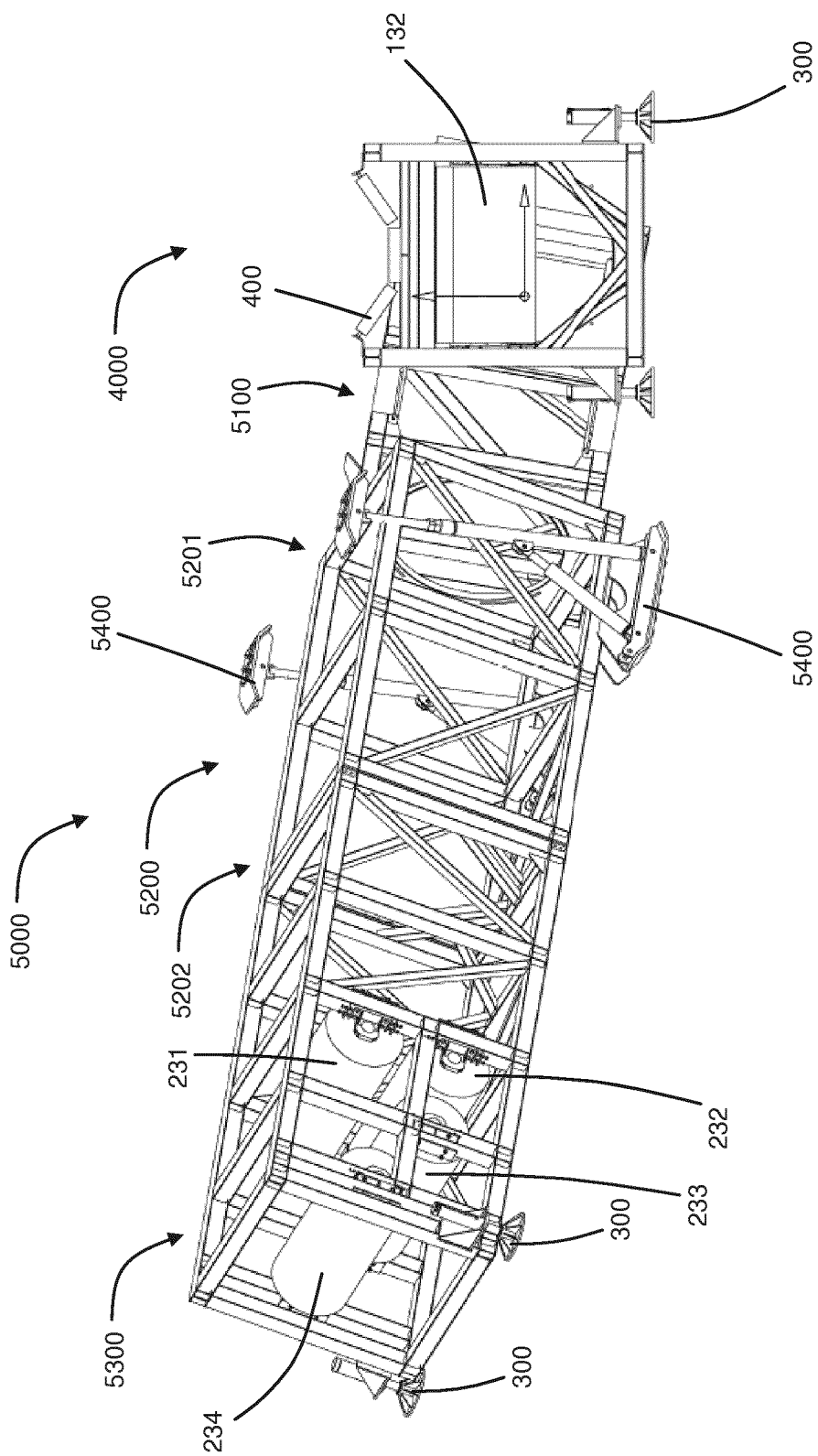
FIG. 14 shows a side view of the mountable construction according to FIG. 11A.
Figure 15:
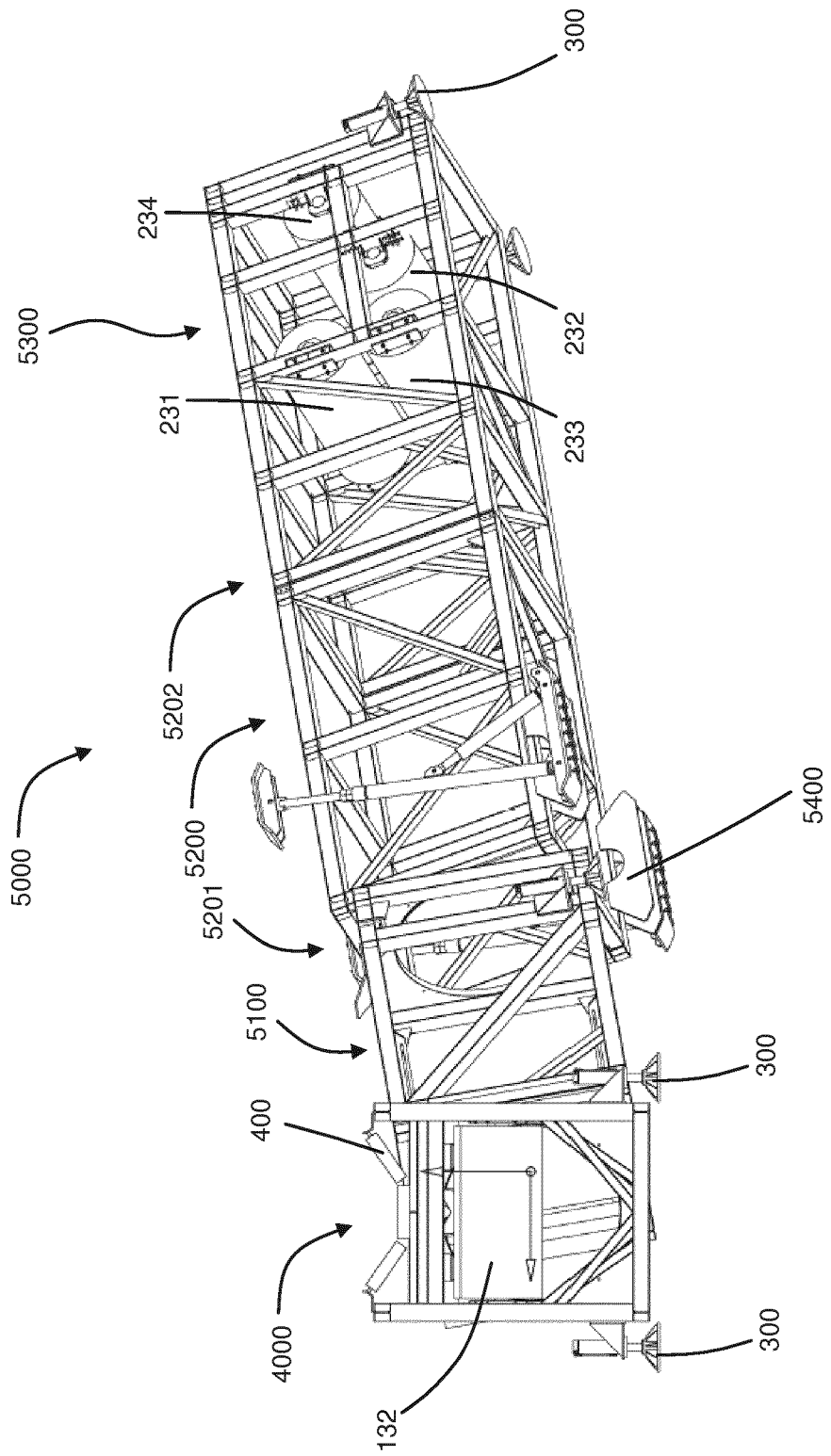
FIG. 15 shows another side view of the mountable construction according to FIG. 11A.
Figure 16:
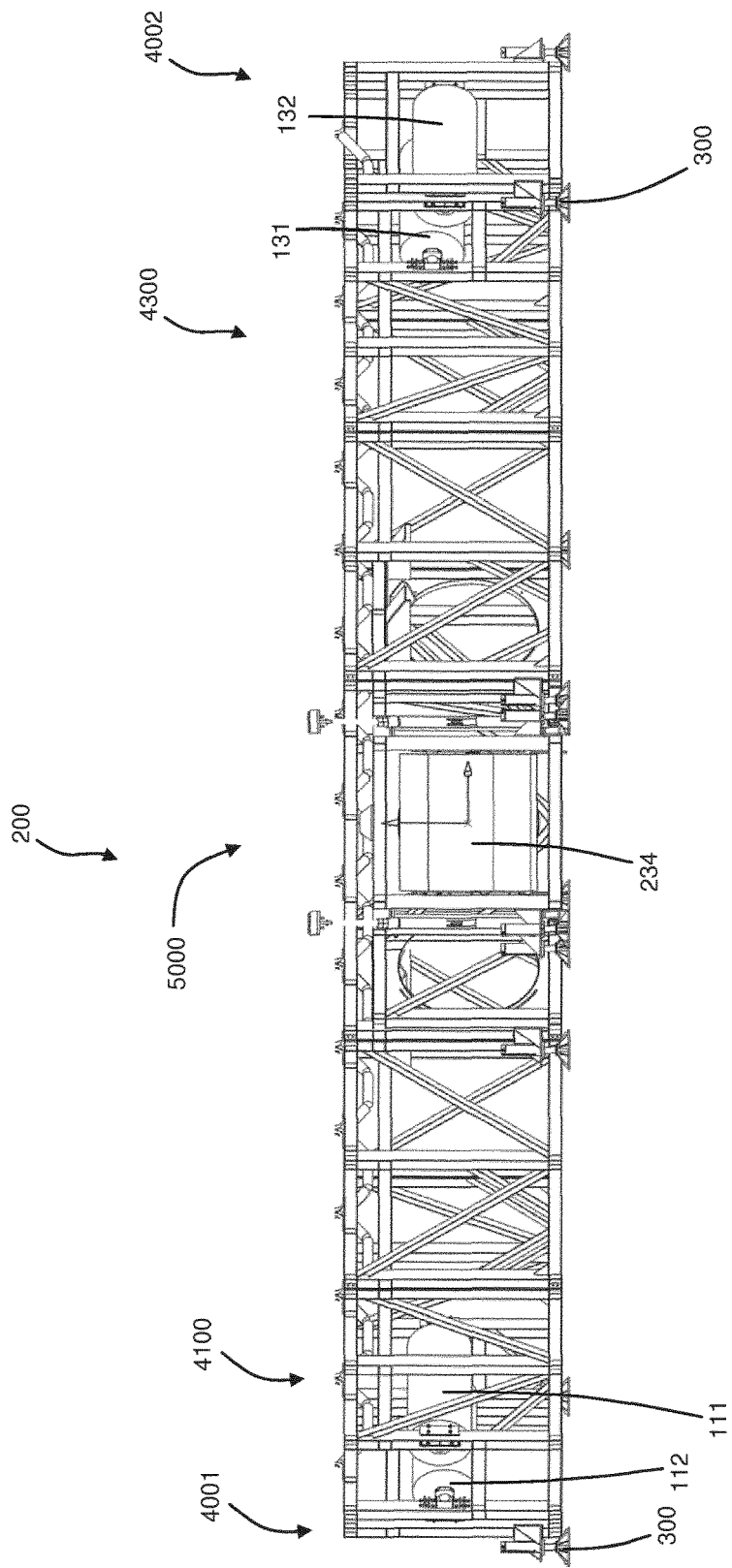
FIG. 16 shows a cross-sectional view of the mountable construction according to FIG. 11a through section M-M.
Figure 17A:
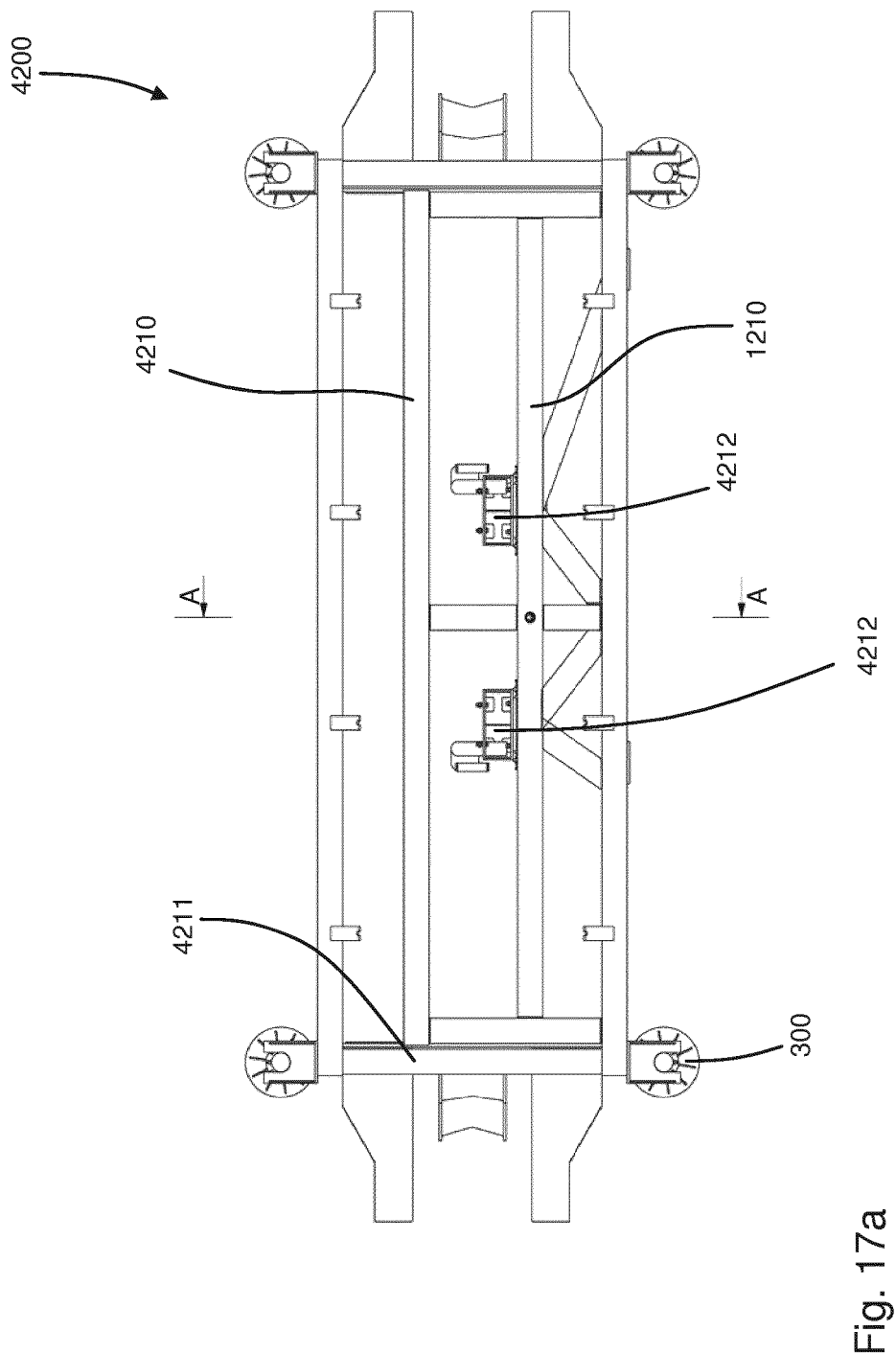
FIG. 17a shows a top view of an exemplary embodiment of a center frame module of a first support frame with a pivotable adjustment element.
Figure 17B:
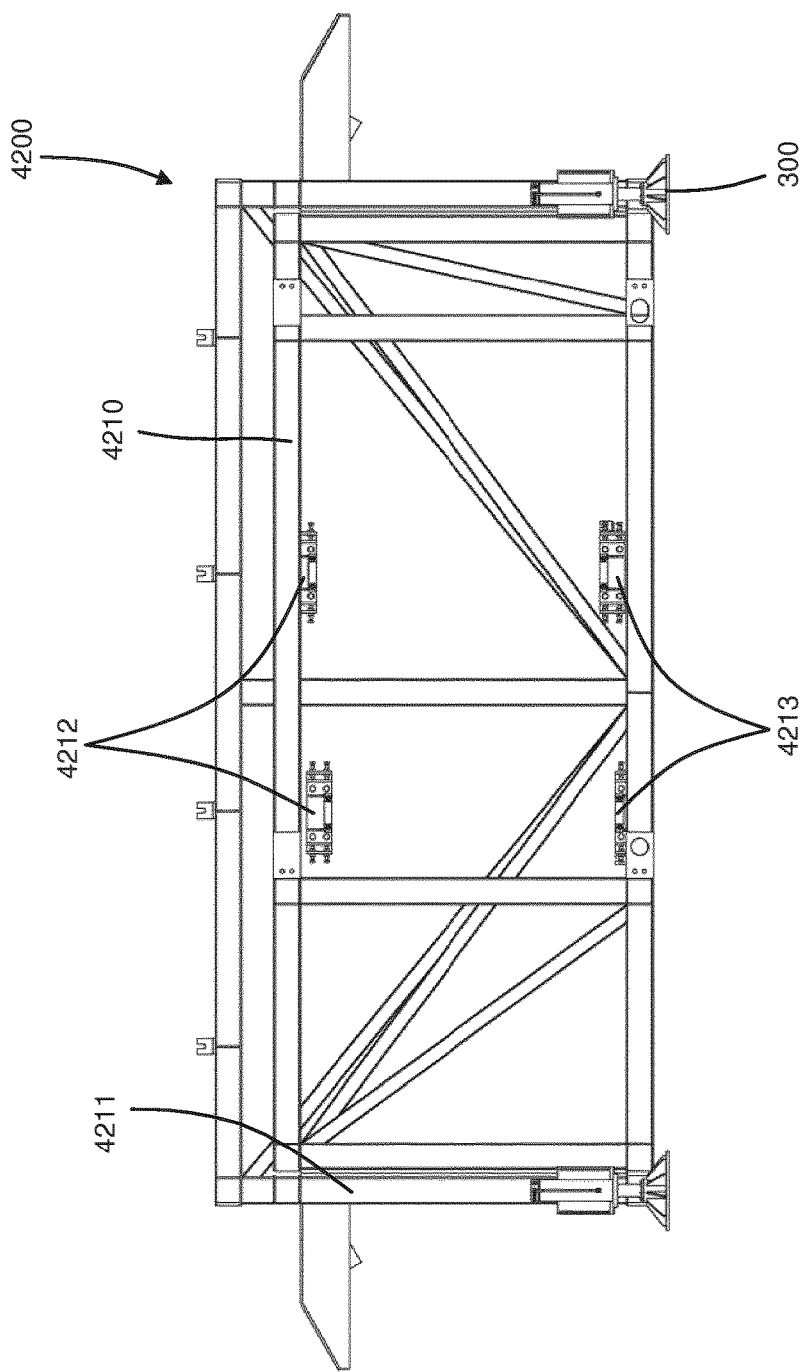
Figure 17D:
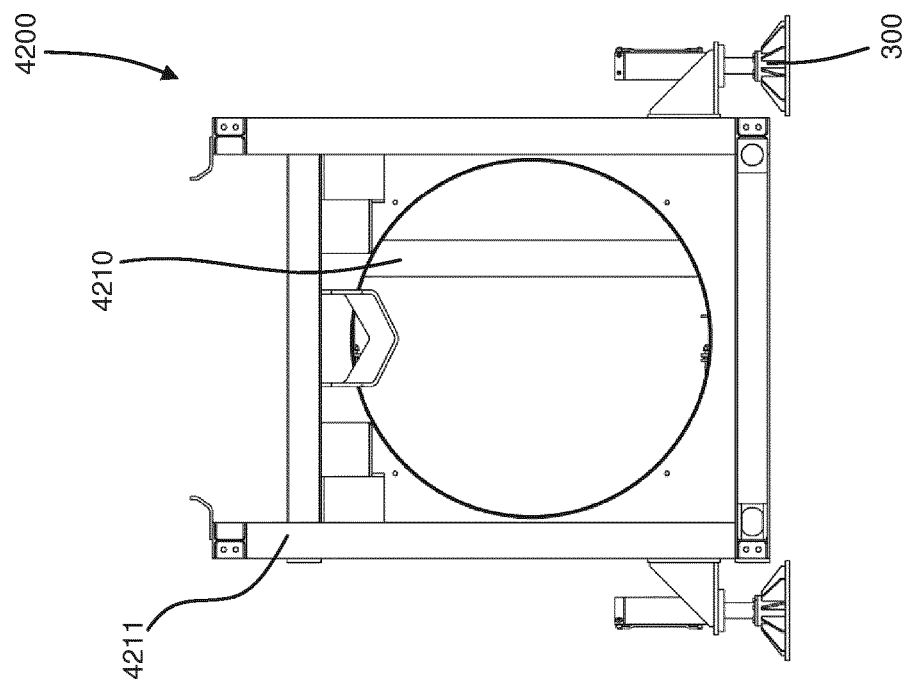
Figure 17E:
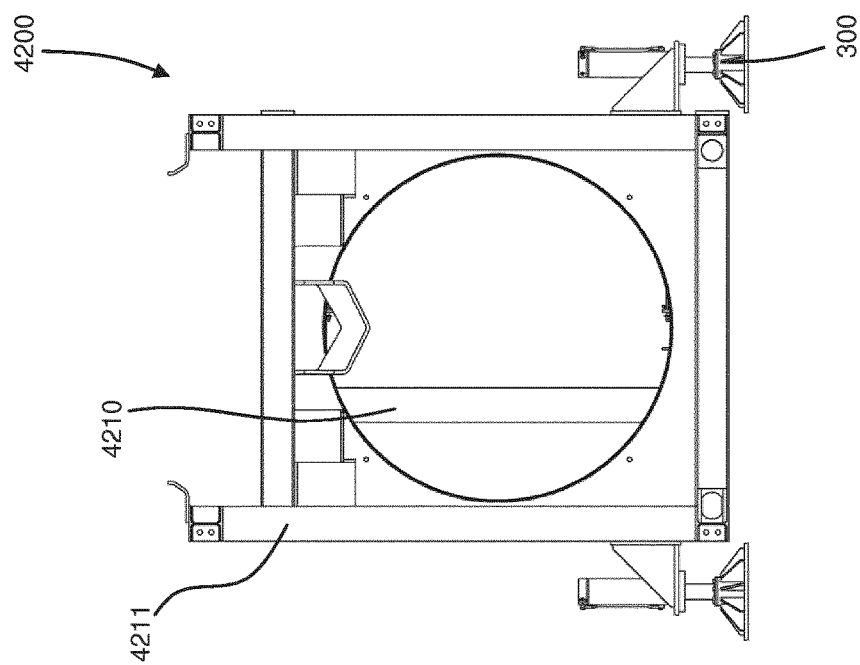
Figure 17F:
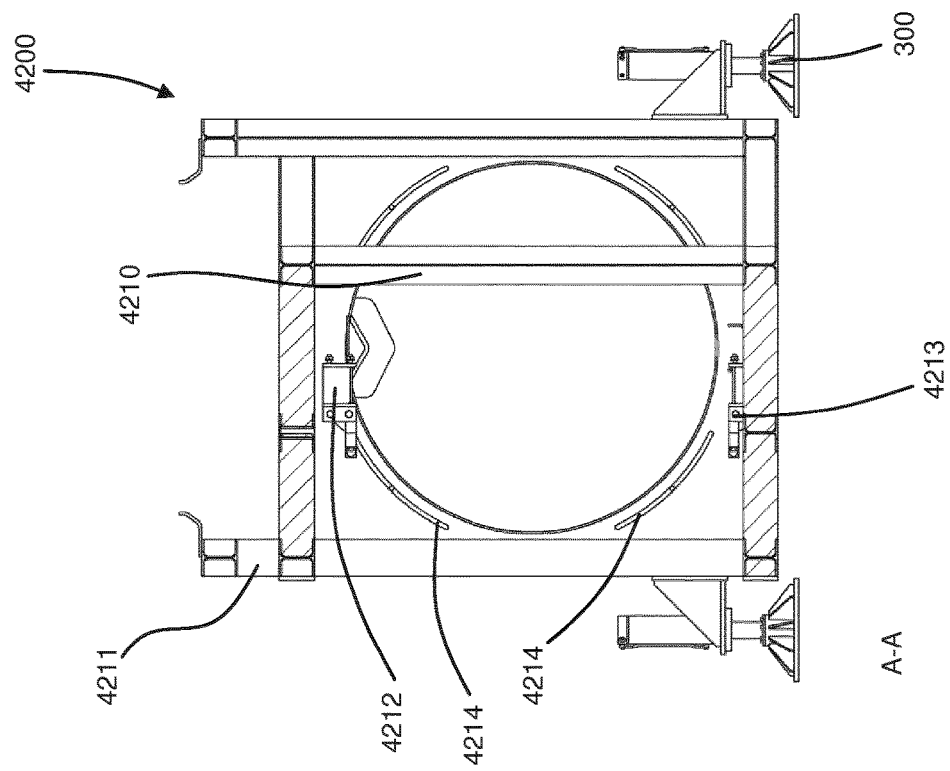
Figure 18A:
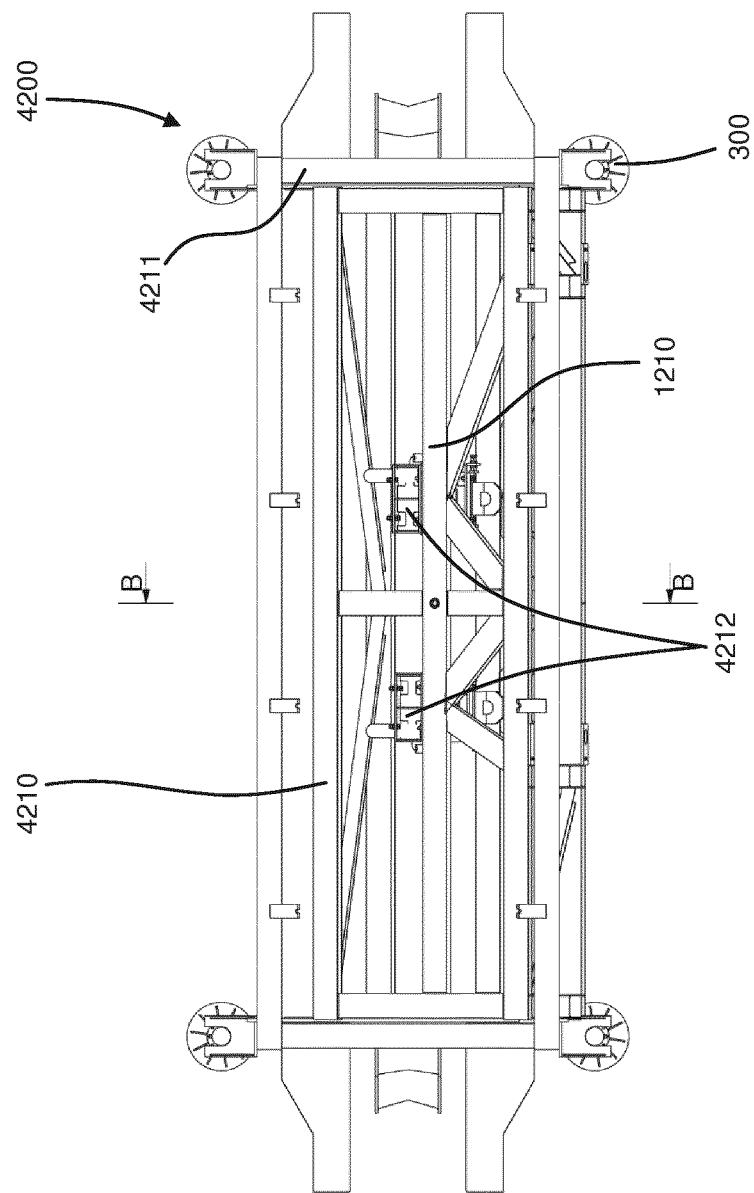
FIG. 18a shows a top view of the center frame module according to FIG. 17a with the adjustment element pivoted by 10°.
Figure 18B:
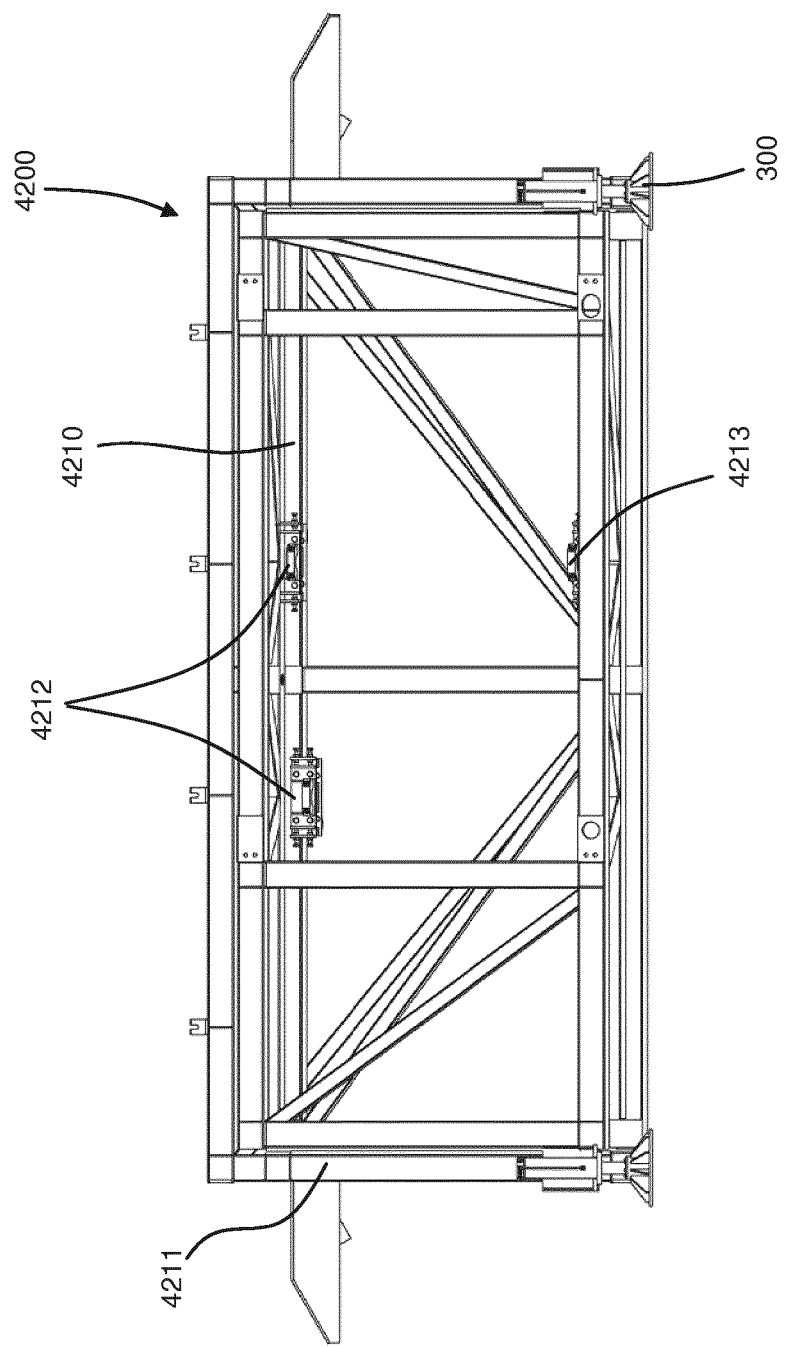
Figure 18C:
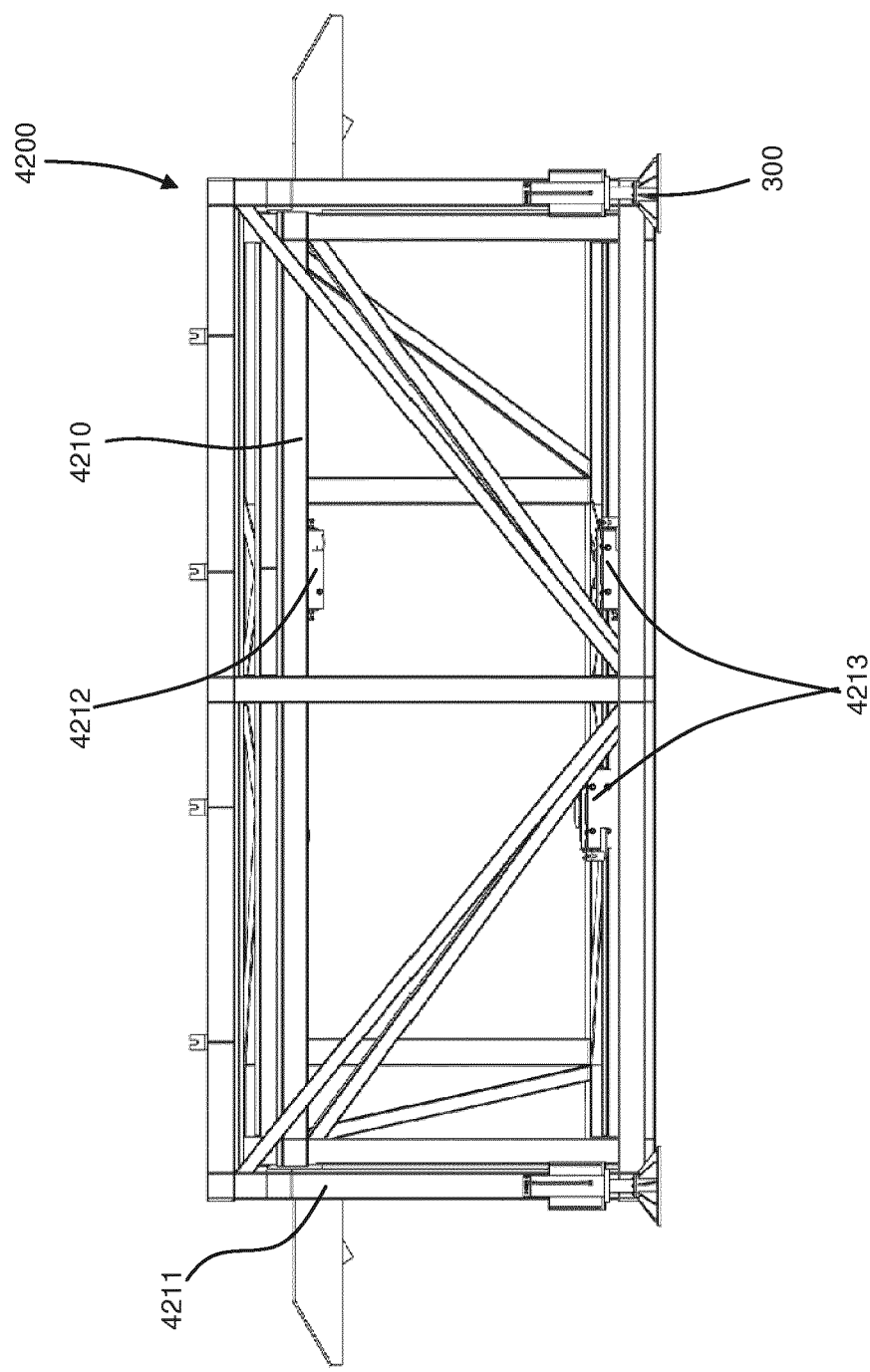
Figure 18D:
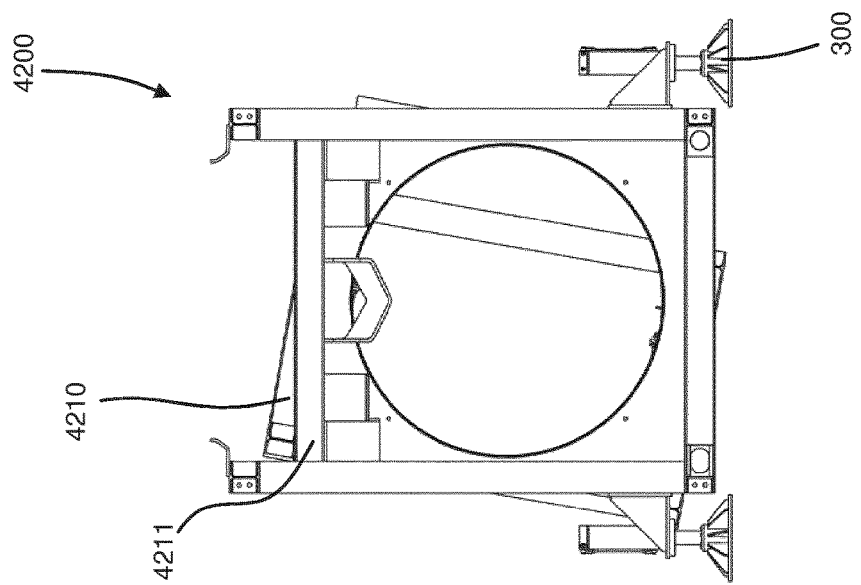
Figure 18E:
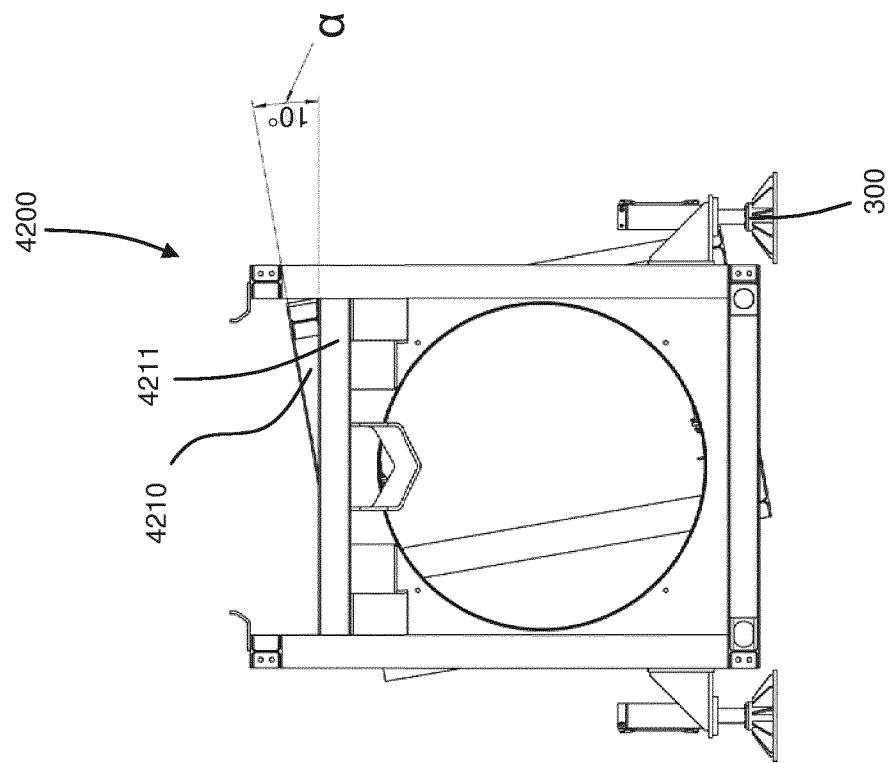
Figure 18F:
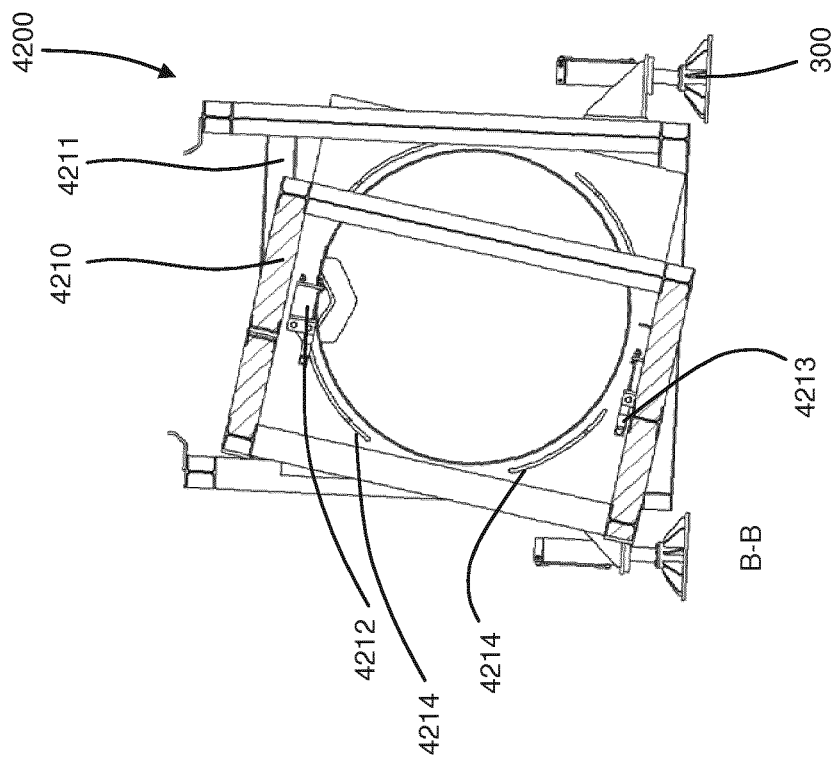
Figure 19:
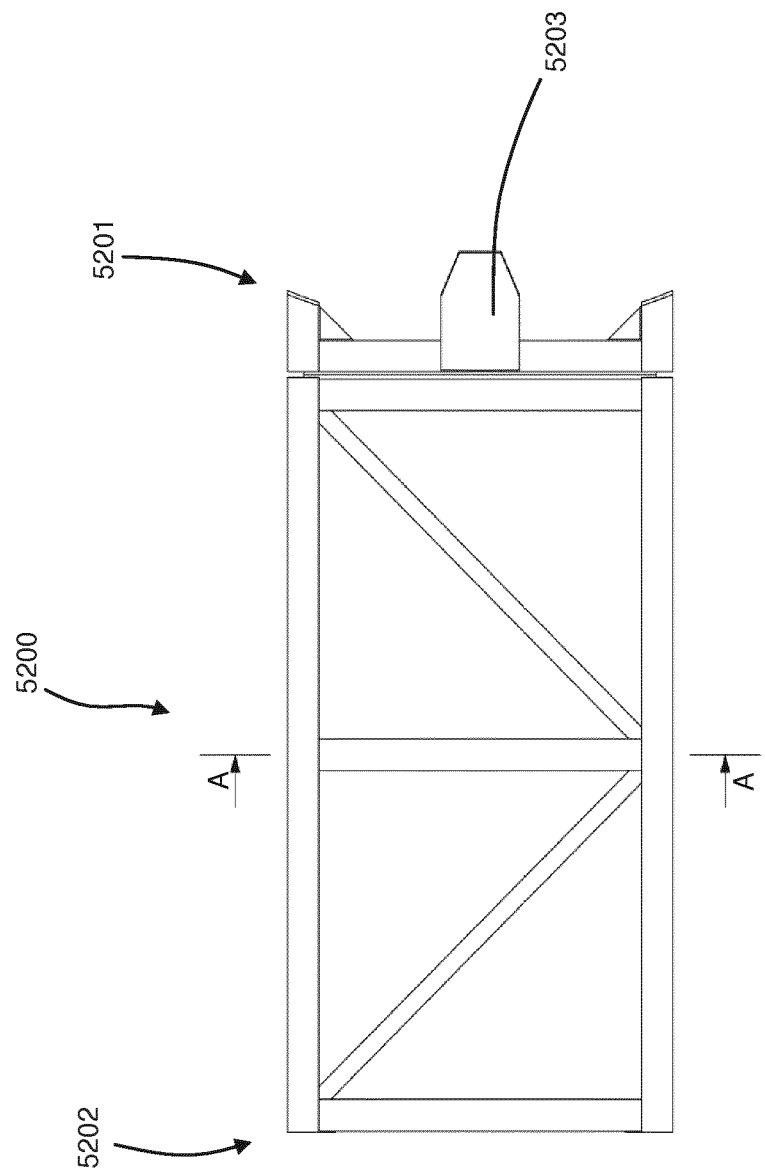
FIG. 19 shows a top view of an exemplary embodiment of an intermediate frame module of a second support frame.

FIGS. 11a-20d show a second exemplary embodiment of a mountable construction. FIGS. 11a and 16 show the steel structure with the various belt deflectors and the connection module arranged under an angle of 45° with the luffing angle of the adjustment element and the twisting angle of the second support module being orthogonal. FIGS. 11A and 12-15 show the mountable construction of FIG. 11a with the luffing angle of the adjustment element and the twisting angle of the second support module angled arbitrarily. FIGS. 17a-18f show the center frame module 4200 of the first support frame 4000 of the mountable construction 200 in more detail. FIGS. 17a-17f show the adjustment element 4210 of the center frame module 4200 in its undeflected or orthogonal position, while FIGS. 18a-18f show the adjustment element 4210 pivoted about the longitudinal axis of the first support frame 4000 by 10°. FIGS. 19 and 20a-20d show the intermediate frame module 5200 of the second support frame 5000 of the mountable construction 200 in more detail. FIG. 19 shows the intermediate frame module 5200 in its undeflected or orthogonal position, while FIGS. 20a-20d show the first end 5201 of the intermediate frame module 5200 twisted relative to its second end 5202 by 9°.

In principle, the second exemplary embodiment of a mountable construction 200 shown in FIGS. 11a-20d corresponds to the exemplary embodiment of a mountable construction 100 shown in FIGS. 1a-8, 9 and 21. Identical elements or elements with basically identical function are indicated with the same reference numerals. In the following, the mountable construction 200 is described and some additional aspects compared to the mountable construction 100 previously described are highlighted.

The guiding and deflection of the belt 500 within the mountable construction 200 basically and in principle works as described above with respect to the guiding and deflection of the belt 500 within the mountable construction 100 shown in FIGS. 1a-7a and 8.

The mountable construction 200 in the form of a deflection device for a belt 500 for continuously conveying material, in particular fragmented material, comprises a first support frame 4000 arranged in a first direction 1 and a second support frame 5000 arranged in a second direction 2. The first and second direction 1, 2 of the first and second support frames 4000, 5000 can also be referred to as the longitudinal directions of the support frames 4000, 5000.

The first support frame 4000 has a rear end 4001 and a front end 4002. A conveyor run 501 of the belt 500 preferably is guided on a top or upper region of the first support frame 4000 via belt guide rollers 400. Alternatively, the conveyor run of the belt may be suspended from the roof. The return run 502 of the belt 500 is preferably guided within the first support frame 4000, wherein the deflection of the belt 500 to the second support frame 5000 also preferably occurs in the return run 502 section of the belt 500 as shown in the figures.

The first support frame 4000 is a modular structure and comprises three frame modules, namely a rear frame module 4100, a center frame module 4200 and a front frame module 4300. The second support frame 5000 also is a modular structure and comprises two frame modules, namely an intermediate frame module 5200 and a take-up frame module 5300. At the take-up end 5002 of the second support frame 5000 on the take-up frame module 5300, a belt or loop belt take-up system (not shown) can be connected to the mountable construction 200, for example.

The mountable construction 200 further comprises a connection module 5100 arranged in a connection direction 3. The connection module 5100 is adapted to couple the first and second support frames 4000, 5000 with each other in a horizontal plane. In particular, the connection module 5100 is adapted such that the second support frame 5000 is coupleable to the first support frame 4000 at a variable or different horizontal angle Z. The horizontal angle Z is the horizontal angle included or confined between the first direction 1 of the first support frame 4000 and the second direction 2 of the second support frame 5000. The connection module 5100 depicted in FIGS. 11a-15 basically corresponds to the connection module 2100 depicted in FIGS. 1a-8, 21 and described above. Correspondingly, the connection module 5100 has a first face 5110 for coupling the connection module 5100 with the first support frame 4000 and a second face 5120 for coupling the connection module 5100 with the second support frame 5000. The first face 5110 is adapted or arranged to form a horizontal angle Y with the connection direction 3 of the connection module 5100.

The second face 5120 is curved in a horizontal plane and has the shape of an arc of a circle with a radius R about a (virtual) pivotable point P in a horizontal plane and thus is adapted to couple the second support frame 5000 to the connection module 5100 under different horizontal angles. The curved shape of the second face 5120 allows for the second support frame 5000 to be coupled to the connection module 5100 at different angles, such that the second direction 2 is angled to the connection direction 3, in particular angled by +/−5°. The connection module 5100 can be arranged on either side of the first support frame 4000. The connection module 5100 is exchangeable against another connection module, wherein this other connection module comprises a first face adapted to form a different horizontal angle with the connection direction.

The variability of the angles Y and Z described so far are also referred herein as slewing of the second support frame. However, a further adaptability of the mountable construction 200 is achieved by the pivotable adjustment element 4210 of the center frame module 4200 of the first support frame 4000 of the mountable construction 200 as can be seen in particular from FIGS. 11A-15. The center frame module 4200 with the pivotable adjustment element 4210 is depicted in particular in FIGS. 17a-18e. The two substantially vertical first belt deflectors 121, 122 preferably are mounted on the adjustment element 4210 of the center frame module 4200 of the first support frame 4000 of the mountable construction 200. The first belt deflectors 121, 122 preferably are mounted to the adjustment element 4210 via upper and lower fastening elements 4212, 4213.

The adjustment element 4210 is connected to the center frame module 4200 such that the adjustment element 4210 can be pivoted about the longitudinal axis or first direction 1 of the first support frame 4000 at a variable or different reasonable angle. In FIGS. 18a-18f, the adjustment element 4210 is exemplarily pivoted about this axis by an adjustment angle or luffing angle α of 10°, as indicated in FIG. 18e. In this way, the first belt deflectors 121, 122, which are in a basic operational position arranged substantially vertical with their longitudinal axis as shown, for example, in FIG. 11a, will be tilted such that their longitudinal axis will be deflected by the adjustment angle or luffing angle α, i.e. in this case by 10° from a substantially vertical orientation.

Preferably, the position of the center of the luffing rotation should be the midpoint between the boundary point between the perimeter of the cross-sectional area bisecting the height of the first belt deflector 121 and between the plane bisecting the third belt deflector 111 and between the boundary point between the perimeter of the cross-sectional area bisecting the height of the first belt deflector 122 and between the plane bisecting the third belt deflector 131.

The adjustment element 4210 can be fixed in its deflected, i.e. non-orthogonal position via fixing elements which can be positioned in slots 4214. As can be seen, for example, in FIG. 18f, the pivoting of the adjustment element 4210 results in a respective deflection of the frame 4211. Since the connection module 5100, and via the connection module also the second support frame 5000, are connected to the adjustment element 4210 of the center frame module 4200, also the second support frame 5000 will be deflected by adjustment or change of the angle α in the same way that adjustment element 4210 is deflected. In this way, by pivoting of the adjustment element 4210, not only the first belt deflectors 121, 122, but also the connection module 5100 and the second support frame 5000 including the second belt deflectors 231, 232, 233, 234, are deflected by a desired luffing angle. In this way, a declining angle of a connecting strand relative to the main mining strand can be accommodated in an underground mining geometry.

In order to fix and/or stabilize the mountable construction 200 in its desired position and orientation, to the second support frame 5000 two staying elements 5400 can be fixed, comprising hydraulic cylinders. The staying elements 5400 can be extended in a vertical direction such that they can be stayed between the floor and the roof of a mining drift or tunnel. In particular, it is preferred to fix and/or stabilize the second support frame 5000 in its desired position and orientation after a desired slewing, luffing and/or twisting angle as described herein has been achieved.

Further, the mountable construction 200 comprises a plurality of hydraulic stands 300 on the first support frame 4000, the second support frame 5000 and the connection module 5100. These levelling elements in the form of hydraulic extendable stands 300 are adapted to level out an uneven ground.

Preferably, the mountable construction 200 comprises a hydraulic unit (not shown) for activating, in particular extending and retracting, the hydraulic stands 300 and/or the staying elements 5400.

Figure 20A:
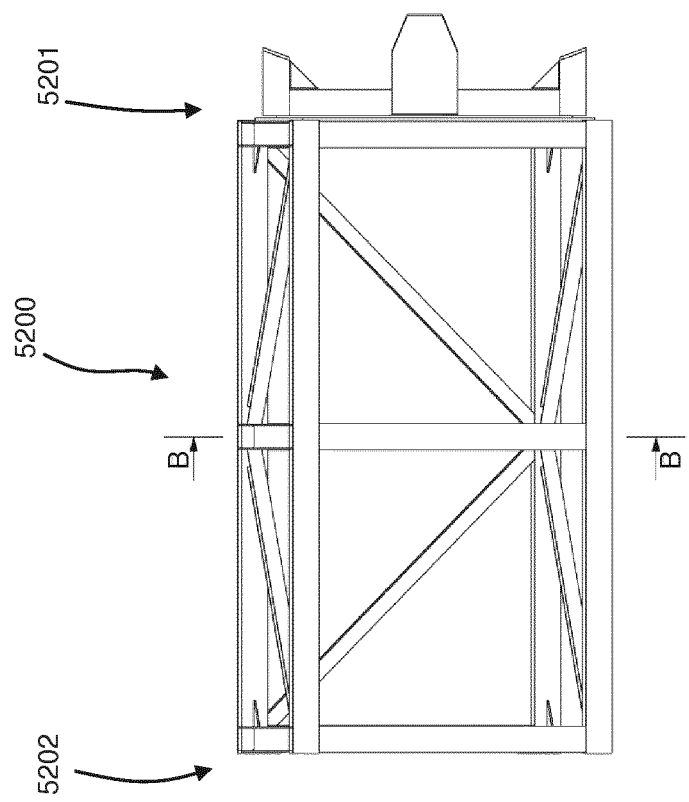
FIG. 20a shows a top view of the intermediate frame module according to FIG. 19 with its first end rotated against its second end by 9°.
Figure 20B:
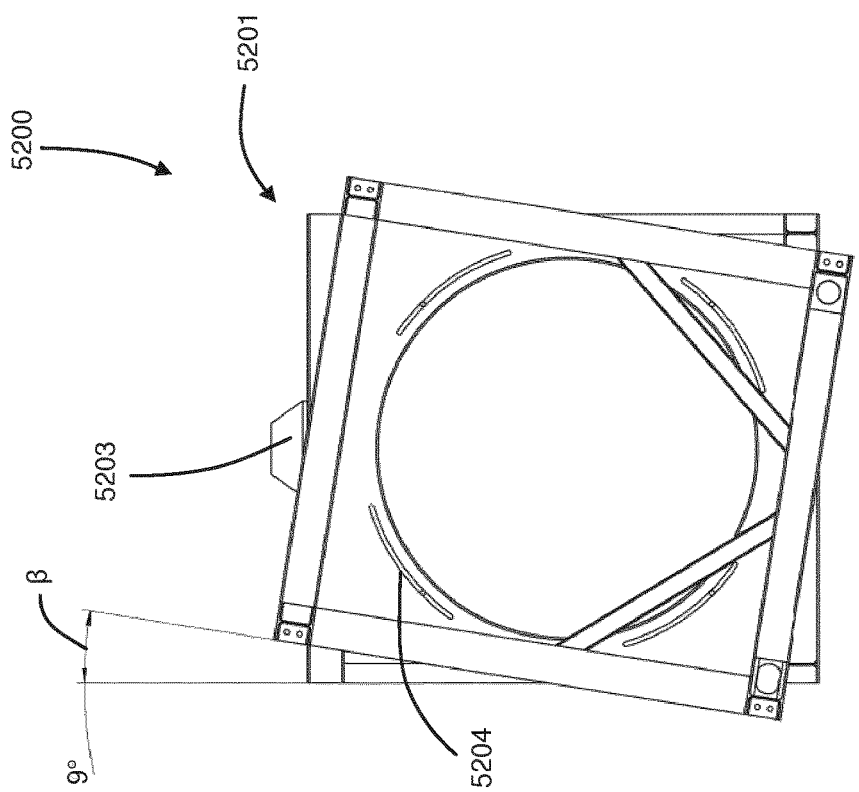
Figure 20C:
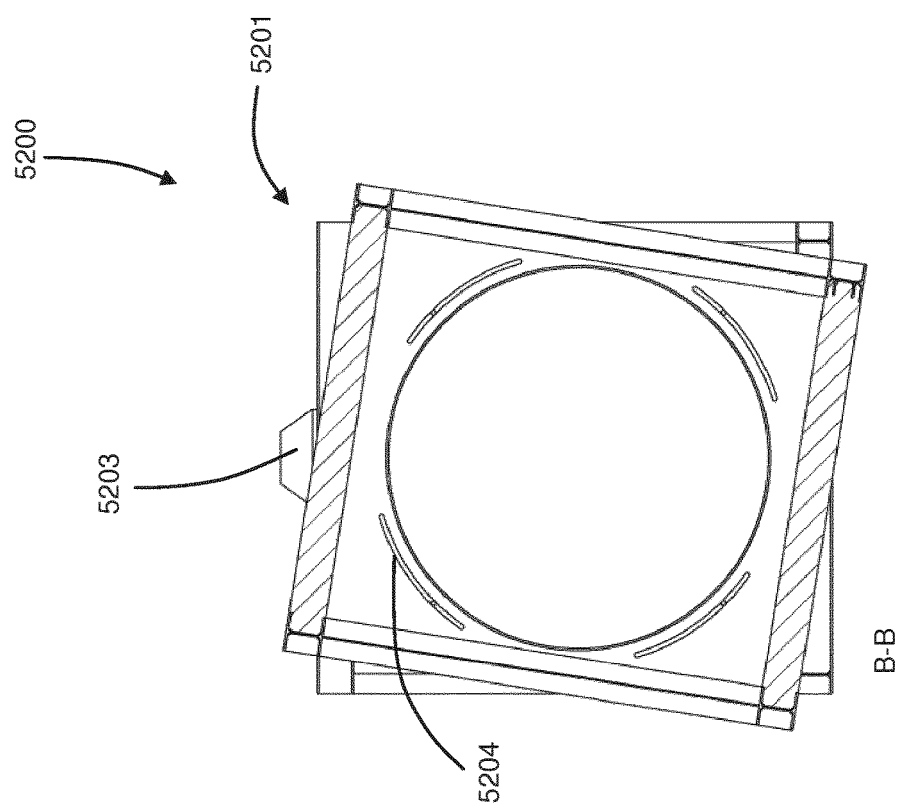
Figure 20D:
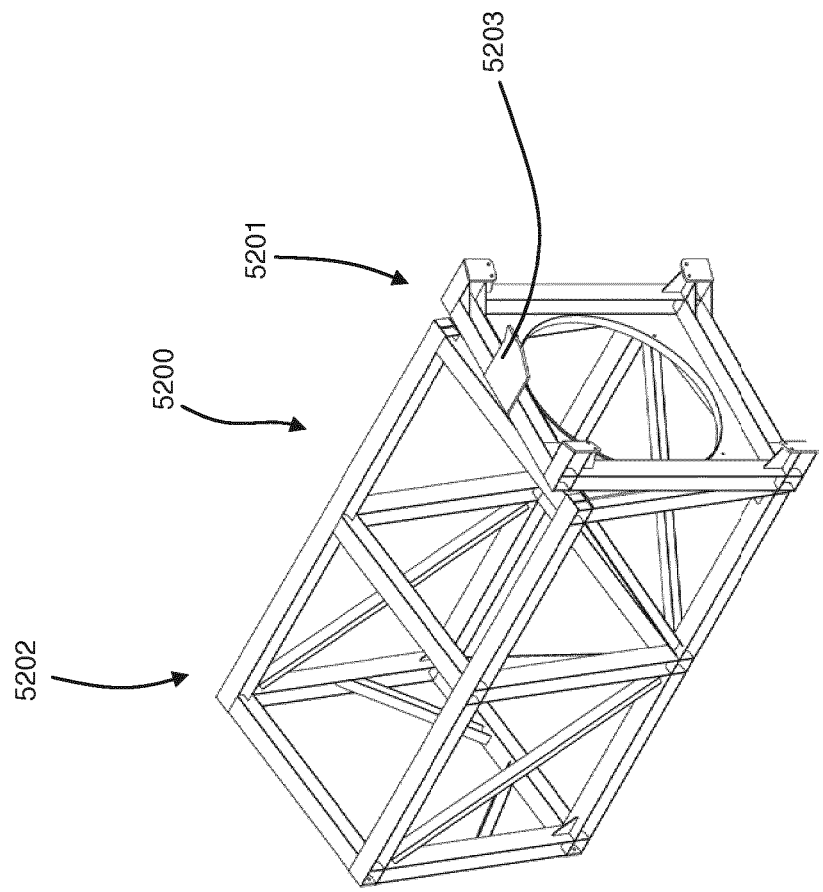
Figure 21:
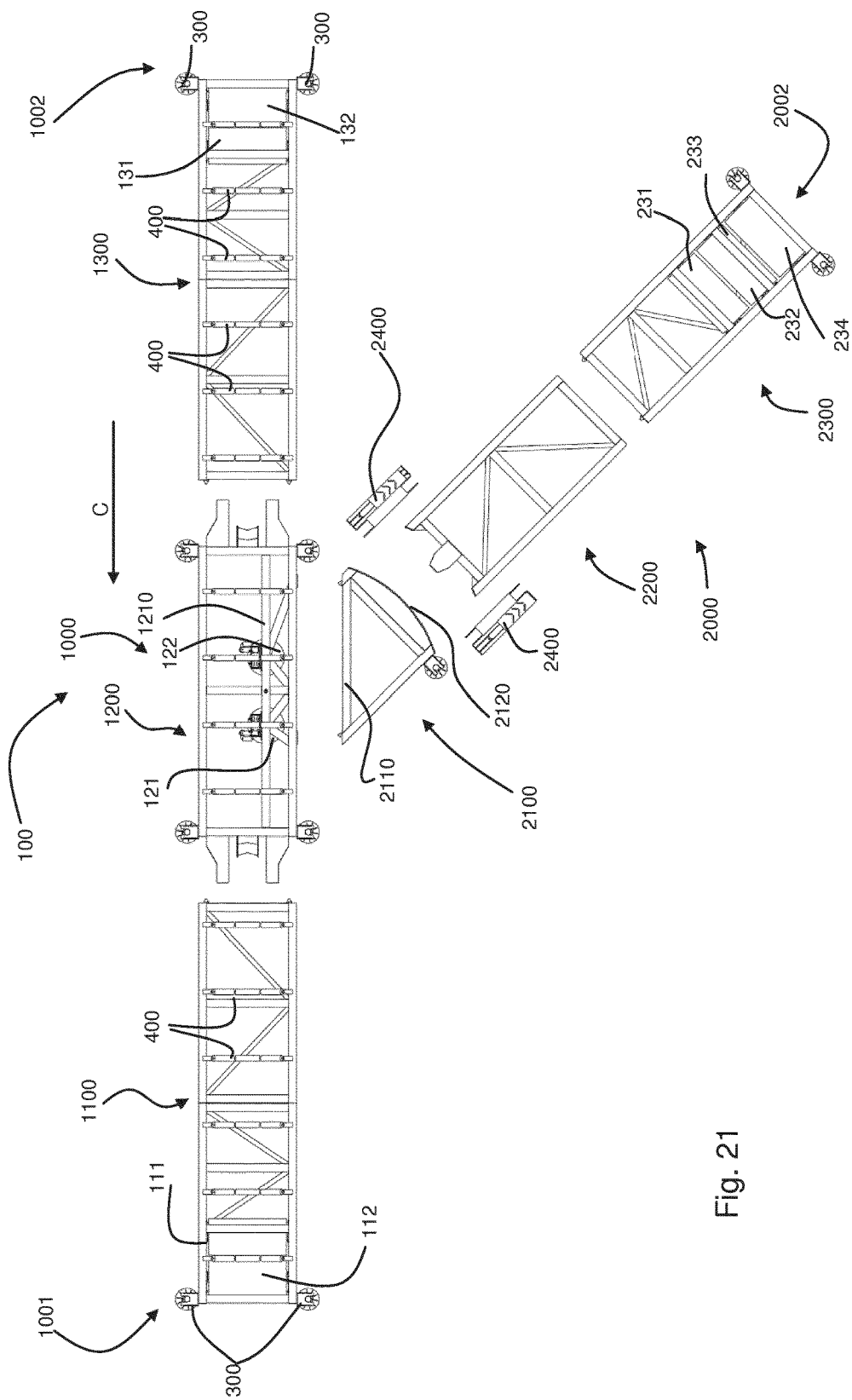
FIG. 21 shows a top view of the mountable construction of FIG. 1a in an exploded view.

A further accommodation of various underground mining geometries can be achieved via a design of the intermediate frame module 5200 of the second support frame 5000 as depicted in FIGS. 19 and 20a-20d, allowing for a twisting of the second support frame 5000 as can be seen for example in FIGS. 11A and 12-15. The intermediate frame module 5200 of the second support frame 5000 is adapted such that its first end 5201, which is connected to the connection module 5100, can be rotated relative to its second end 5202, which is connected to the take-up frame module 5300 of the second support frame 5000. The direction of the rotation axis, about which the two ends 5201, 5202 can be twisted against each other, preferably is the second direction 2 of the second support frame 5000, or the longitudinal direction of the second support frame 5000. Preferably, the twisting angle β, under which the two ends 5201, 5202 are twisted against each other, can be fixed by inserting fixing elements into the slots 5204. In FIGS. 20a-20d, the intermediate frame module 5200 is shown with its first end 5201 twisted against its second end 5202 by a twisting angle β of 9° as indicated in FIG. 20b. Flap 5203 partly overlaps the second face 5120 of the connection module 5100.

Further preferably, the axis of the twist rotation should be in line with the midpoint between the boundary point between the perimeter of the cross-sectional area bisecting the height of the first belt deflector 121 and between the plane bisecting the second belt deflector 232 and between the boundary point between the perimeter of the cross-sectional area bisecting the height of the first belt deflector 122 and the plane bisecting the second belt deflector 231.

The various possibilities to adjust the slewing angle via the connection module described herein have the possibility to provide for a mountable construction allowing for leading off the belt at various angles. The additional possibilities of luffing and twisting angles further allow accommodating various geometries found in underground mining. Therefore, the mountable construction provides the possibility to lead off a belt from a first direction to a second direction, which is arbitrarily angled to the first direction, with respect to the three dimensional space. The provision of the mountable construction as a modular construction enhances the applicability of the mountable construction in various application areas, in particular also in long wall mining, for example. According to this, for example, the mountable construction can be implemented in an underground mining geometry, where one drift branched off from a main drift, whereby both drifts can show different declining angles to each other. This can provide various advantages, for example, for an underground mine, for example, because of additional possibilities and opportunities for mine planning and mine layout.

The invention claimed is:

1. A mountable construction in the form of a deflection device for a belt for continuously conveying material, the mountable construction comprising:
   a first support frame arranged in a first direction and a second support frame arranged in a second direction, the first and second support frames being coupleable with each other;
   first and second belt deflectors connected to the support frames, wherein the first belt deflector is arranged substantially vertical and the second belt deflector is arranged substantially horizontal; and a connection module configured to couple the second support frame with the first support frame, the connection module serving as an interface via which the first and second support frames can be connected to each other, wherein the connection module includes a first face arranged for coupling the connection module with the first support frame and/or the a second face arranged for coupling the connection module with the second support frame, the first face being arranged to form a horizontal angle with a connection direction of the connection module, and/or the second face is arranged to form a further horizontal angle with the connection direction of the connection module, the connection module being arranged such that the second support frame is coupleable to the first support frame at a variable or different horizontal angle.

2. The mountable construction according to claim 1, wherein the connection module being exchangeable with another connection module a first face arranged to form a different horizontal angle with the connection direction of the other connection module.

3. The mountable construction according to claim 1, wherein the first and/or second face is arranged to couple the first and/or second support frame to the connection module at different horizontal angles.

4. The mountable construction according to claim 1, wherein the first and/or second face of the connection module is curved in a horizontal plane.

5. The mountable construction according to claim 1, wherein the first and/or second face of the connection module has a shape of an arc of a circle in a horizontal plane.

6. The mountable construction according to claim 1, wherein the first belt deflector is arranged on the first support frame, the first support frame including a third belt deflector arranged substantially horizontally, and/or the second belt deflector being arranged on the second support frame.

7. The mountable construction according to claim 1, wherein the first belt deflector is mounted on an adjustment element pivotably connected to the first support frame, the adjustment element having a connection face for connecting the first face of the connection module thereto.

8. The mountable construction according to claim 1, wherein the first belt deflector is mounted on the first support frame such that a position of the first belt deflector relative to the first support frame and/or relative to another first belt deflector is adjustable along the first direction of the first support frame.

9. The mountable construction according to claim 1, wherein the first support frame is a modular structure and includes at least two frame modules.

10. The mountable construction according to claim 1, wherein the second support frame is arranged such that its first and second ends can be twisted relative to each other about a longitudinal axis of the second support frame.

11. The mountable construction according to claim 1, wherein the first and second support frames are coupled with each other such that forces can be transmitted from the first support frame to the second support frame and/or vice versa via a form fit connection.

12. The mountable construction according to claim 1, wherein the connection module has a polygonal form in its horizontal plane, such as a trapezoidal or triangular form, wherein one side of the polygonal form has a shape of an arc of a circle in a horizontal plane.

13. The mountable construction according to claim 1, wherein in connection to and parallel to the belt deflectors support rollers are arranged and/or a further guiding element for support of the belt is arranged from beneath and/or above the belt.

14. A method for deflecting a belt for continuously conveying material, the method comprising:

providing a mountable construction, the mountable construction including a first support frame arranged in a first direction and a second support frame arranged in a second direction, the first and second support frames being coupleable with each other, first and second belt deflectors connected to the support frames, wherein the first belt deflector is arranged substantially vertical and the second belt deflector is arranged substantially horizontal, and a connection module configured to couple the second support frame with the first support frame, the connection module serving as an interface via which the first and second support frames can be connected to each other, wherein the connection module includes a first face arranged for coupling the connection module with the first support frame and/or the a second face arranged for coupling the connection module with the second support frame, the first face being arranged to form a horizontal angle with a connection direction of the connection module, and/or the second face is arranged to form a further horizontal angle with the connection direction of the connection module, the connection module being arranged such that the second support frame is coupleable to the first support frame at a variable or different horizontal angle; and coupling the second support frame to the first support frame via the connection module in a variable or different angle in three-dimensional space, such as a variable or different horizontal and/or vertical angle and/or angle of rotation.

15. The mountable construction according to claim 3, wherein the first and/or second face is arranged to couple the first and/or second support frame to the connection at a variable horizontal angle.

16. The mountable construction according to claim 1, wherein the first and/or second face of the connection module has a shape of a section of a spherical surface.

17. The mountable construction according to claim 9, wherein the second support frame is a modular structure and includes at least two frame modules.

18. The mountable construction according to claim 10, wherein the connection module is arranged such that the second support frame can be twisted relative to the connection module about a longitudinal axis of the second support frame, and wherein the second belt deflector is pivotably and/or tiltable connected to the second support frame.

19. The mountable construction according to claim 18, wherein the second belt deflector is pivotably and/or tiltable connected relative to the first belt deflector.

* * * * *